(12) United States Patent
Inoue et al.

(10) Patent No.: US 12,407,166 B2
(45) Date of Patent: Sep. 2, 2025

(54) DISTRIBUTED POWER SUPPLY MANAGEMENT DEVICE

(71) Applicant: Mitsubishi Electric Corporation, Tokyo (JP)

(72) Inventors: Sadayuki Inoue, Tokyo (JP); Koki Matsumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 338 days.

(21) Appl. No.: 18/014,747

(22) PCT Filed: Aug. 5, 2020

(86) PCT No.: PCT/JP2020/029998
§ 371 (c)(1),
(2) Date: Jan. 6, 2023

(87) PCT Pub. No.: WO2022/029924
PCT Pub. Date: Feb. 10, 2022

(65) Prior Publication Data
US 2023/0283076 A1    Sep. 7, 2023

(51) Int. Cl.
*H02J 3/24* (2006.01)
*G05B 19/042* (2006.01)
*H02J 3/38* (2006.01)

(52) U.S. Cl.
CPC .............. *H02J 3/24* (2013.01); *G05B 19/042* (2013.01); *H02J 3/381* (2013.01); *G05B 2219/2639* (2013.01)

(58) Field of Classification Search
CPC ...... H02J 3/24; H02J 3/381; H02J 3/06; H02J 3/46; H02J 3/38; H02J 3/466; H02J 3/48; G05B 19/042
See application file for complete search history.

(56) References Cited

U.S. PATENT DOCUMENTS 10,389,119 B2 *   8/2019   Nishita ..................... H02J 3/38
10,727,784 B2 *   7/2020   Kobayashi ........ H02J 13/00001
(Continued)

FOREIGN PATENT DOCUMENTS

CN   107910958 A   *   4/2018
CN   108199413 A       6/2018
(Continued)

OTHER PUBLICATIONS

International Search Report and Written Opinion mailed on Oct. 13, 2020, received for PCT Application PCT/JP2020/029998, filed on Aug. 5, 2020, 8 pages including English Translation.
(Continued)

*Primary Examiner* — Mong-Shune Chung
(74) *Attorney, Agent, or Firm* — XSENSUS LLP

(57) ABSTRACT

An operation plan creation circuit creates a power target value of each of a plurality of distributed power supplies on the basis of information received by a communication circuit and capacities of the plurality of distributed power supplies a control parameter generation circuit generates a control parameter of the virtual synchronous generator control implemented in a static inverter of each of the distributed power supplies or information necessary for generating the control parameter. The communication circuit receives measurement information of each of the distributed power supplies, and transmits a control command to each of the distributed power supplies. The control parameter generation circuit generates the control parameter or the information necessary for generating the control parameter on the basis of the information received by the communication circuit, the capacities of the plurality of distributed power supplies, and the power target value of each of the distributed power supplies.

9 Claims, 45 Drawing Sheets

(56) References Cited

U.S. PATENT DOCUMENTS

| | | | | |
|---|---|---|---|---|
| 2014/0371942 A1* | 12/2014 | Matsuyama | ............... | G05F 1/66 |
| | | | | 700/297 |
| 2017/0017251 A1* | 1/2017 | Forbes, Jr. | ................ | H02J 3/00 |
| 2018/0275708 A1* | 9/2018 | Forbes, Jr. | ................ | H02J 3/00 |
| 2018/0358812 A1* | 12/2018 | Anderson | ............... | H02J 3/381 |
| 2020/0212823 A1 | 7/2020 | Gong | | |

FOREIGN PATENT DOCUMENTS

| | | | | | |
|---|---|---|---|---|---|
| CN | 108879766 A | * | 11/2018 | | |
| EP | 3780310 A1 | | 2/2021 | | |
| JP | 2016220396 A | * | 12/2016 | | |
| JP | 6070076 B2 | * | 2/2017 | | |
| JP | 2019080476 A | * | 5/2019 | ............. | G03C 5/268 |
| JP | 2019-176584 A | | 10/2019 | | |

OTHER PUBLICATIONS

Office Action mailed on Jan. 4, 2022, received for Taiwan Application 110126917, 8 pages including English Translation.
The First Office Action mailed May 19, 2025, in Chinese Application No. 202080104426.5, 16 pages including English translation.

* cited by examiner

DISTRIBUTED POWER SUPPLY MANAGEMENT DEVICE

CROSS-REFERENCE TO RELATED APPLICATION

The present application is based on PCT filing PCT/JP2020/029998, filed Aug. 5, 2020, the entire contents of which are incorporated herein by reference.

TECHNICAL FIELD

The present disclosure relates to a distributed power supply management device.

BACKGROUND ART

In recent years, the introduction of an energy creation apparatus (hereinafter, also referred to as "energy creation equipment") using renewable energy such as solar cells has been accelerated in order to reduce a load on the environment. Further, in order to cope with power shortage after the Great East Japan Earthquake, commercialization of a system including an energy storage apparatus (hereinafter, also referred to as "energy storage equipment") such as a storage battery, a system including a combination of energy creation equipment and energy storage equipment, or the like is in progress. In such systems, a static inverter is used to connect the energy creation equipment and the energy storage equipment to an AC system.

On the other hand, for a power system, it is predicted that thermal power plants serving as a power generation output buffer against fluctuations in demand will be closed in the future from the viewpoint of reducing a power generation cost including a management cost as the amount of power generated by the renewable energy increases. A synchronous generator in such a thermal power plant, however, potentially has an effect (inertial force, synchronizing force, and the like) of suppressing fluctuations when a system frequency fluctuates. For this reason, when thermal power plants are further closed, the number of synchronous generators is reduced, which may make it difficult to keep the power system stable.

In order to solve the above-described problems, development of a control technology for a virtual synchronous generator corresponding to a static inverter having a function of a synchronous generator is in progress. For example, Japanese Patent Laying-Open No. 2019-176584 (PTL 1) discloses a method for setting a control parameter of a distributed power supply (static inverter) having virtual synchronous generator control implemented. Specifically, PTL 1 discloses a method for generating a control parameter for setting virtual inertia for a distributed power supply on the basis of any one of a required inertia value required from a system operator or a virtual inertia value calculated on the basis of a specification and an operation state of the distributed power supply.

CITATION LIST

Patent Literature

PTL 1: Japanese Patent Laying-Open No. 2019-176584

SUMMARY OF INVENTION

Technical Problem

Under the method for generating a control parameter disclosed in PTL 1, the inertial force of the system intended by a system administrator is secured, but it is not possible to secure proportion division of power shared by each distributed power supply due to fluctuations in load or changes in the amount of power generated by the energy creation equipment.

For example, considering a case where two storage batteries each having virtual synchronous generator control implemented as distributed power supplies are connected to a system. It is assumed that the storage batteries and the static inverter are identical in capacity to each other, and a ratio of state of charge (SOC) at this time is 2:1. In this case, in an operation plan (charge and discharge plan) of the storage batteries, a ratio of a discharge power target value of each storage battery is assumed to be 2:1, which is the same as the ratio of the SOC.

Here, when the load on the entire system increases, the virtual synchronous generator control is performed on each storage battery, and the two storage batteries proportionally output the increased power. At this time, when the control parameters of the virtual synchronous generator control of the two storage batteries are the same, each storage battery additionally outputs the same amount of power.

In the operation plan of the storage batteries described above, however, the two storage batteries output power in accordance with their respective ratios of SOC, and it is desirable that the increased power be also proportionally divided at the ratio of this operation plan.

In PTL 1 described above, since the control parameter is determined only on the basis of the inertial force of the system requested by the system operator, in a case where excess and deficient power when a load fluctuates or power generated by the energy creation equipment fluctuates is proportionally divided among a plurality of distributed power supplies, the excess and deficient power is proportionally divided on the basis of virtual inertia of each distributed power supply. Therefore, there is a problem that excess and deficient power is proportionally divided at a ratio different from the proportional division ratio intended in the original operation plan.

In general, the power target value (operation plan) to be allocated to the plurality of distributed power supplies (for the sake of simplicity of the description, it is assumed that the virtual synchronous generator control is implemented in the static inverter of the system storage battery system) is proportionally divided on the basis of the capacity and SOC of each storage battery, the capacity of the static inverter, and the like. Specifically, in a case of discharging, when the storage battery capacity and the static inverter capacity are the same among the plurality of storage batteries, a large amount of power is allocated to a storage battery having higher SOC. This is because, for example, when the charge power of one of the two storage batteries becomes zero (SOC=0), the inertial force of the system is maintained by the remaining one storage battery, so that pseudo inertial force by the static inverter is substantially halved. Therefore, in a case of determining the power proportion division of the plurality of storage batteries, it is necessary to proportionally divide the power so as to make the SOC of each storage battery become zero (fully charged in a case of charging) at almost the same time.

In particular, in a case where a microgrid or the like is constructed using a plurality of distributed power supplies such as a storage battery having virtual synchronous generator control implemented, there is a problem that when power supplied to a system suddenly changes due to a sudden change in load or a sudden change in solar radiation amount, it is difficult to make proportional division of power among distributed power supplies as planned.

The present disclosure has been made to solve the above-described problems, and it is therefore an object of the present disclosure to generate, in a power system in which a plurality of distributed power supplies are connected, each distributed power supply including a static inverter having virtual synchronous generator control implemented, a control parameter of the virtual synchronous generator control that allows excess and deficient power to be proportionally divided so as to make each distributed power supply equal to a ratio of a power target value even when power consumed by a load or power generated by energy creation equipment fluctuates.

Solution to Problem

According to one aspect of the present disclosure, a distributed power supply device manages a plurality of distributed power supplies connected to a distribution system. Each of the plurality of distributed power supplies includes a static inverter having virtual synchronous generator control implemented. The distributed power supply management device includes a communication circuit that communicates with a system management device that manages the distribution system and a plurality of distributed power supplies, an operation plan creation circuit that creates a power target value of each of the plurality of distributed power supplies on the basis of information received by the communication circuit and capacities of the plurality of distributed power supplies, and a control parameter generation circuit that generates a control parameter of the virtual synchronous generator control in each of the distributed power supplies or information necessary for generating the control parameter. The communication circuit is configured to receive at least one of measurement information of each of the distributed power supplies or a command value from the system management device, and to transmit a control command to each of the distributed power supplies. The control parameter generation circuit generates the control parameter or the information necessary for generating the control parameter on the basis of the information received by the communication circuit, the capacities of the plurality of distributed power supplies, and the power target value of each of the distributed power supplies, and outputs the control parameter generated or the information necessary for generating the control parameter to each of the distributed power supplies via the communication circuit.

Advantageous Effects of Invention

According to the present disclosure, even when power consumed by a load or power generated by energy creation equipment fluctuates, it is possible to make proportional division of power among the plurality of distributed power supplies as planned. Specifically, excess and deficient power can be proportionally divided at a ratio equivalent to the ratio of the power target value at the time of creating the operation plan of the distributed power supplies.

DESCRIPTION OF EMBODIMENTS

Figure 1:
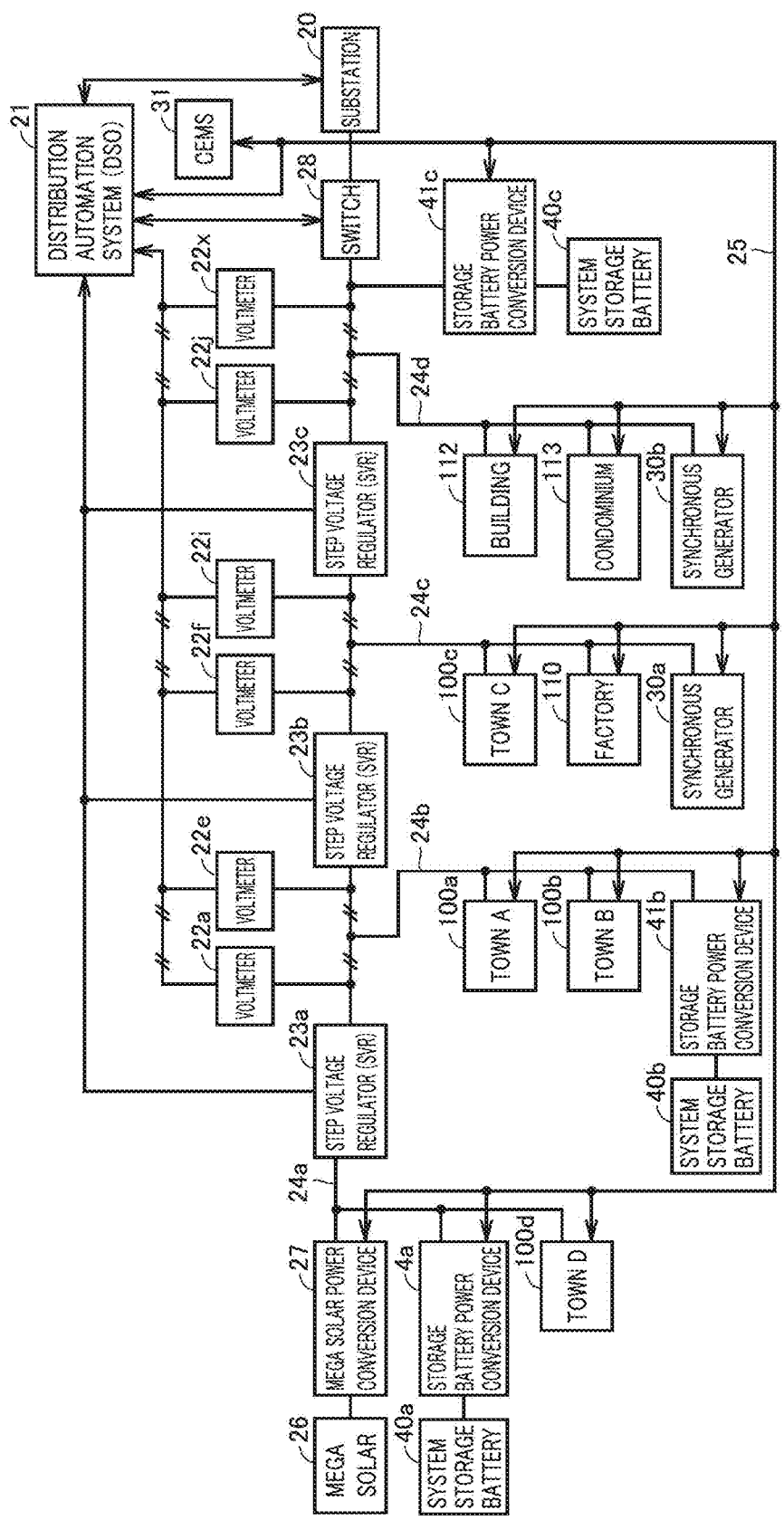
FIG. 1 is a block diagram illustrating a configuration of a distribution system according to a first embodiment.

Hereinafter, embodiments of the present disclosure will be described in detail with reference to the drawings. Note that, in the following description, the same or corresponding parts in the drawings are denoted by the same reference numerals, and no redundant description will be given of such parts in principle.

First Embodiment (Configuration Example of Distribution System)

First, a configuration example of a distribution system to which a distributed power supply management device according to a first embodiment is applied will be described. Note that a three-phase system will be given as an example in the first embodiment, but the distribution system may be a single-phase system.

FIG. 1 is a block diagram illustrating a configuration example of a distribution system 24 according to the first embodiment. As illustrated in FIG. 1, distribution system 24 receives power from a substation 20. Distribution system 24 is provided with a plurality of step voltage regulators (SVR) 23a to 23c. The plurality of SVRs 23a to 23c are connected in series along a flow of power. To the plurality of SVRs 23a to 23c, a building 112, a condominium 113, a town A 100a to a town D 100d, a factory 110, a mega solar power conversion device 27, system storage battery power conversion devices 41a to 41c, and synchronous generators 30a, 30b are connected. In the following description, SVRs 23a to 23c are also collectively referred to as "SVR 23". Further, power conversion devices 41a to 41c are also collectively referred to as "power conversion device 41".

In distribution system 24, a plurality of voltmeters 22a, 22e, 22f, 22i, 22j, 22x are installed. Hereinafter, voltmeters 22a, 22e, 22f, 22i, 22j, 22x are also collectively referred to as "voltmeter 22". A measurement value of each voltmeter 22 is transmitted to a distribution automation system 21 (hereinafter, also referred to as "DSO 21") at predetermined intervals. DSO 21 corresponds to an example of a "system management device" that manages distribution system 24.

Information on a tap position of the SVR 23, information on a primary-side voltage and secondary-side voltage are transmitted to DSO 21. In the first embodiment, SVR 23 provides, at predetermined intervals, notification of the information on the tap position, and the information on the primary-side voltage and the secondary-side voltage, and provides, at irregular intervals, notification of the information on the tap position, and the information on the primary-side voltage and the secondary-side voltage when a tap is changed.

A community energy management system (CEMS) 31 collects information such as various measurement values from each consumer (towns 100a to 100d, factory 110, building 112, and condominium 113), power conversion device 27, synchronous generators 30a, 30b, and power conversion devices 41a to 41c at predetermined intervals. CEMS 31 notifies DSO 21 of the collected data in response to a request from DSO 21. Note that power consumed by each consumer in towns 100a to 100d and power generated by energy creation equipment are measured by a smart meter (not illustrated) installed for each consumer. CEMS 31 collects the measurement values of the smart meter at predetermined intervals (for example, at intervals of 30 minutes). CEMS 31 corresponds to an example of the "distributed power supply management device".

A mega solar 26 is connected to power conversion device 27. System storage batteries 40a to 40c are connected to power conversion devices 41a to 41c, respectively. Storage batteries 40a to 40c are large-capacity storage batteries that are connectable to distribution system 24. In the following description, storage batteries 40a to 40c are also collectively referred to as "storage battery 40".

Figure 2:
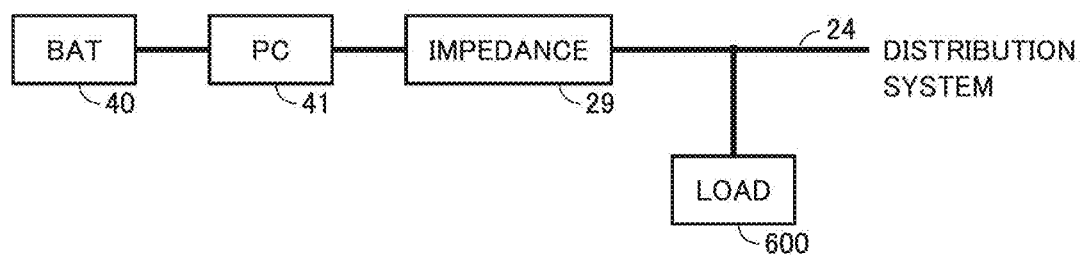
FIG. 2 is a block diagram for further describing a configuration of some devices including a storage battery connected to the distribution system and the distribution system according to the first embodiment.

FIG. 2 is a block diagram for further describing the configuration of distribution system 24 illustrated in FIG. 1.

As illustrated in FIG. 2, a load 600, power conversion device 41, and storage battery 40 are connected to distribution system 24. Note that, for the sake of simplicity of the description, an impedance 29 of distribution system 24 is represented by a centralized system in FIG. 2. Impedance 29 of distribution system 24 includes a reactor component and a resistance component.

(1) CEMS 31

Figure 3:
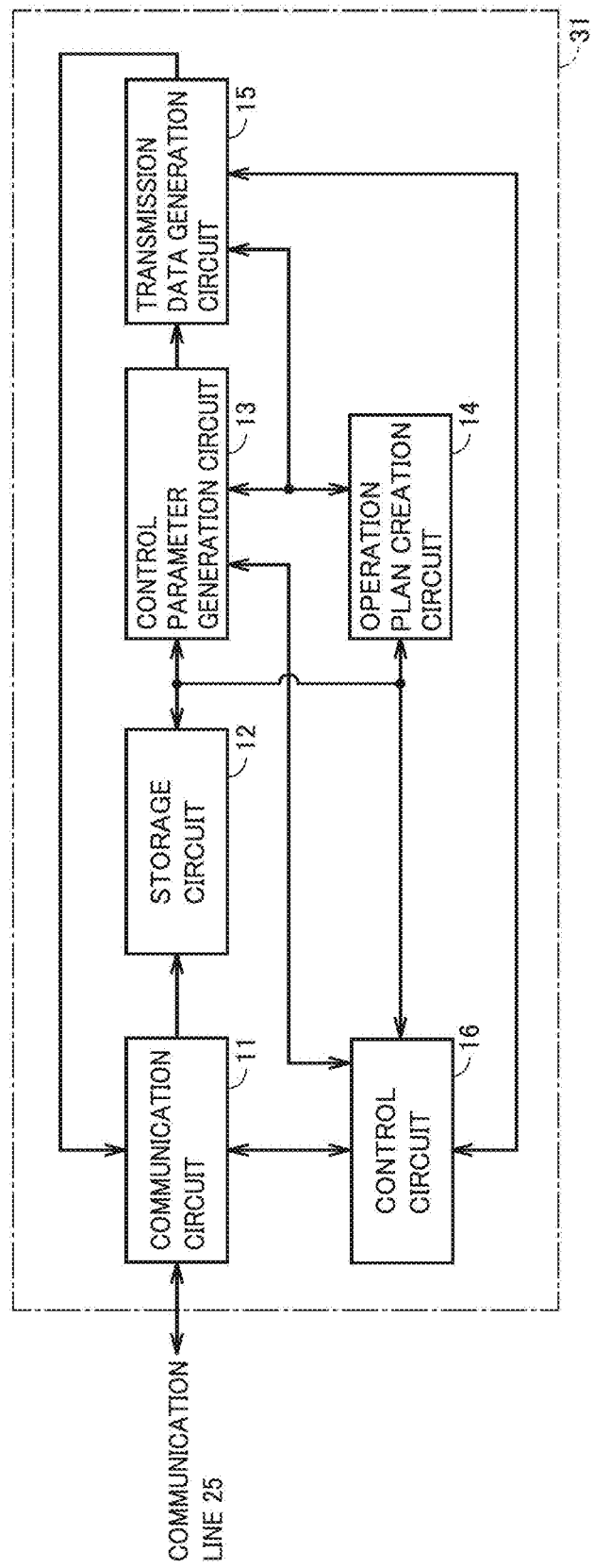
FIG. 3 is a block diagram of a CEMS according to the first embodiment.

FIG. 3 is a block diagram illustrating a configuration of CEMS 31 illustrated in FIG. 1.

As illustrated in FIG. 3, CEMS 31 includes a communication circuit 11, a storage circuit 12, a control parameter generation circuit 13, an operation plan creation circuit 14, a transmission data generation circuit 15, and a control circuit 16.

Communication circuit 11 communicates with DSO 21, each consumer (towns 100a to 100d, factory 110, building 112, and condominium 113), power conversion device 27, synchronous generators 30a, 30b, and power conversion devices 41a to 41c over a communication line 25.

Storage circuit 12 stores various types of information acquired over communication circuit 11. The various types of information include a measurement result, status information of each distributed power supply, and the like.

Control parameter generation circuit 13 generates a control parameter of virtual synchronous generator control implemented in each of power conversion devices 41a to 41c.

Operation plan creation circuit 14 creates an operation plan of power conversion devices 41a to 41c on the basis of a control command from DSO 21. The operation plan of power conversion devices 41a to 41c includes a charge and discharge plan (power target value) of a corresponding one of storage batteries 40a to 40c. In the first embodiment, operation plan creation circuit 14 creates a 24-hour operation plan at intervals of 30 minutes.

Furthermore, operation plan creation circuit 14 determines whether or not it is necessary to correct the operation plan on the basis of the measurement results of power conversion devices 41a to 41c collected at intervals of 5 minutes, SOC information of storage batteries 40a to 40c, and the like. When it is determined that the operation plan needs to be corrected, operation plan creation circuit 14 corrects the operation plan for a period until the next control command is received from DSO 21.

Transmission data generation circuit 15 stores the control parameter of the virtual synchronous generator control generated by control parameter generation circuit 13 and the operation plan output from operation plan creation circuit 14. In response to a transmission command from control circuit 16, transmission data generation circuit outputs the stored data to communication circuit 11. Communication circuit 11 transmits the data output from transmission data generation circuit 15 to communication line 25 in accordance with a control signal output from control circuit 16.

Control circuit 16 is a control circuit for managing a distributed power supply connected to distribution system 24. Control circuit 16 manages how communication circuit 11, storage circuit 12, control parameter generation circuit 13, operation plan creation circuit 14, and transmission data generation circuit 15 operate.

(1-1) Operation Plan Creation Circuit 14

Figure 4:
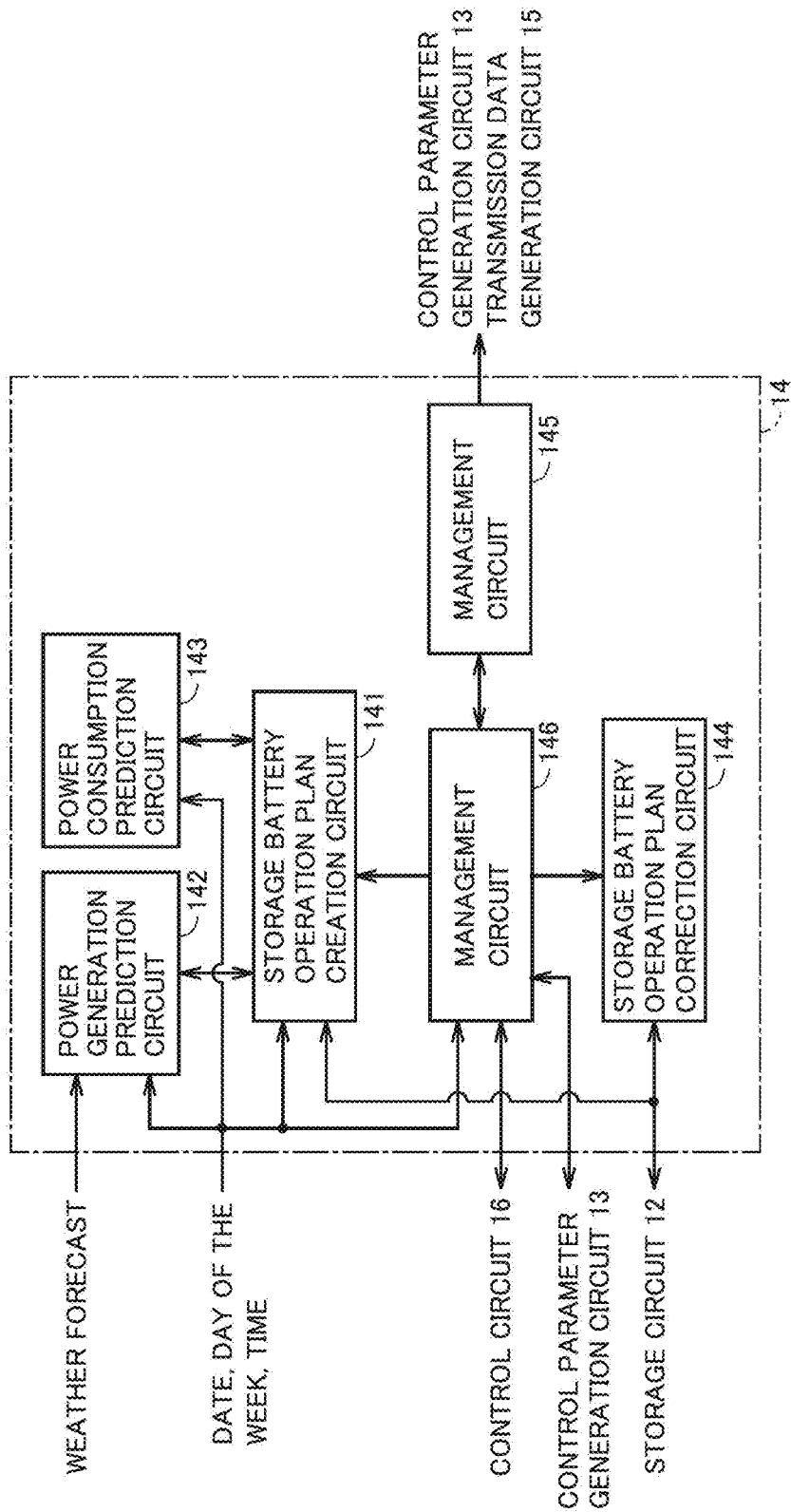
FIG. 4 is a block diagram of an operation plan creation circuit in the CEMS according to the first embodiment.

FIG. 4 is a block diagram illustrating a configuration of operation plan creation circuit 14 illustrated in FIG. 3.

As illustrated in FIG. 4, operation plan creation circuit 14 includes a storage battery operation plan creation circuit 141, a power generation prediction circuit 142, a power consumption prediction circuit 143, a storage battery operation plan correction circuit 144, a management circuit 145, and a management circuit 146.

Storage battery operation plan creation circuit 141 creates the operation plan (power target value) of power conversion devices 41a, 41b, 41c on the basis of information on the control command notified from DSO 21, a prediction result of predicting, by power generation prediction circuit 142, the amount of power to be generated by mega solar 26, and a prediction result of predicting, by power consumption prediction circuit 143, the amount of power to be consumed by each consumer. Note that the control command notified from DSO 21 to storage battery operation plan creation circuit 141 includes a planned value of power to be consumed on the downstream side of substation 20 (power to be supplied to distribution system 24). The planned value of power to be supplied includes a planned value for 24 hours determined at intervals of 30 minutes.

Power generation prediction circuit 142 acquires 24-hour weather forecast information from a weather forecast server (not illustrated) via communication circuit 11. Power generation prediction circuit 142 predicts the power to be generated by mega solar 26 on the basis of the acquired weather forecast information and information stored in a database (not illustrated) prepared for predicting the power generation.

Power consumption prediction circuit 143 predicts the sum of power to be consumed by each consumer on the basis of clock information (date, day of the week, time) in CEMS 31 and information stored in a database (not illustrated) prepared for predicting the power consumption.

Storage battery operation plan correction circuit 144 determines whether or not it is necessary to correct the operation plan on the basis of the amount of charge and discharge power of power conversion devices 41a to 41c and power target value information over communication circuit 11. When it is determined that correction is necessary, storage battery operation plan correction circuit 144 generates a correction value of the operation plan.

Management circuit 145 manages how the operation plan of the distributed power supply connected to the distribution system 24 is created. Management circuit 145 stores the power target value (charge power target value and discharge power target value) of each of storage batteries 40 generated by storage battery operation plan creation circuit 141 and storage battery operation plan correction circuit 144. Management circuit 145 outputs the power target value to control parameter generation circuit 13 and transmission data generation circuit 15 on the basis of a control signal output from management circuit 146.

Management circuit 146 manages how storage battery operation plan creation circuit 141, power generation prediction circuit 142, power consumption prediction circuit 143, storage battery operation plan correction circuit 144, and management circuit 145 operate.

(1-2) Control Parameter Generation Circuit 13

Figure 5:
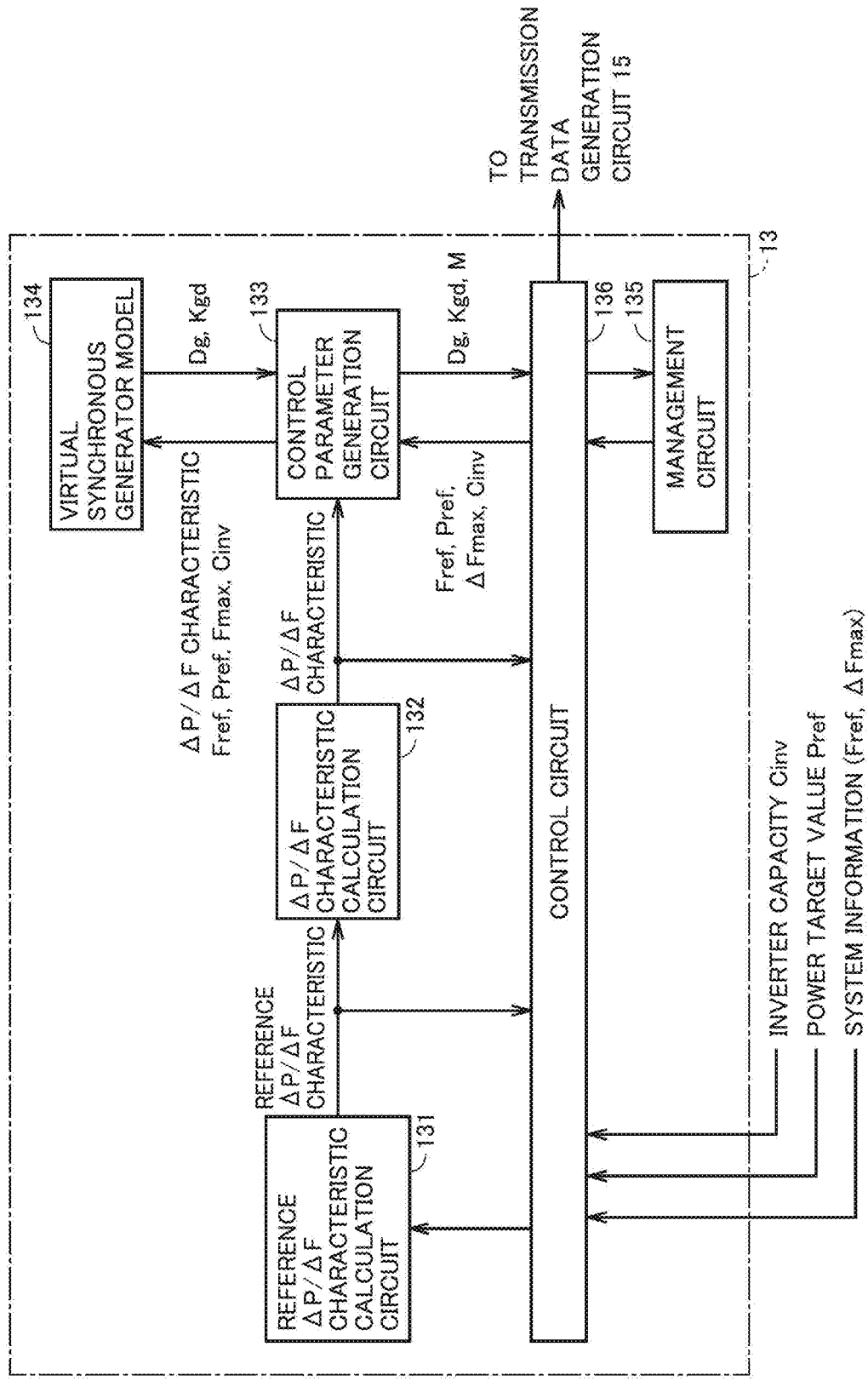
FIG. 5 is a block diagram of a control parameter generation circuit in the CEMS according to the first embodiment.

FIG. 5 is a block diagram illustrating a configuration of control parameter generation circuit 13 illustrated in FIG. 3.

As illustrated in FIG. 5, control parameter generation circuit 13 includes a reference ΔP/ΔF characteristic calculation circuit 131, a ΔP/ΔF characteristic calculation circuit 132, a control parameter generation circuit 133, a virtual synchronous generator model 134, a management circuit 135, and a control circuit 136.

Reference ΔP/ΔF characteristic calculation circuit 131 calculates a reference ΔP/ΔF characteristic on the basis of information on capacities of static inverters (second DC/AC converters 408) of power conversion devices 41a to 41c.

ΔP/ΔF characteristic calculation circuit 132 calculates a ΔP/ΔF characteristic on the basis of the reference ΔP/ΔF characteristic and the power target value information created by operation plan creation circuit 14 (FIG. 4).

Control parameter generation circuit 133 generates the control parameter of virtual synchronous generator control using virtual synchronous generator model 134 on the basis of the ΔP/ΔF characteristic, the information on distribution system 24 (system frequency (reference frequency Fref), ΔFmax, and the like) notified from DSO 21, and the capacity of the static inverter (second DC/AC converter 408).

Virtual synchronous generator model 134 calculates a speed adjustment rate Kgd and a damping factor Dg using the information input from control parameter generation circuit 133. Control parameter generation circuit 133 calculates an inertia constant M using damping factor Dg.

Management circuit 135 manages the control parameter of the virtual synchronous generator control. Management circuit 135 stores, in a memory (not illustrated), and manages information such as the control parameter output from control parameter generation circuit 133, the ΔP/ΔF characteristic calculated by ΔP/ΔF characteristic calculation circuit 132, and the power target value Pref.

Control circuit 136 manages how reference ΔP/ΔF characteristic calculation circuit 131, ΔP/ΔF characteristic calculation circuit 132, control parameter generation circuit 133, virtual synchronous generator model 134, and management circuit 135 operate.

(2) Power Conversion Device 27

Figure 6:
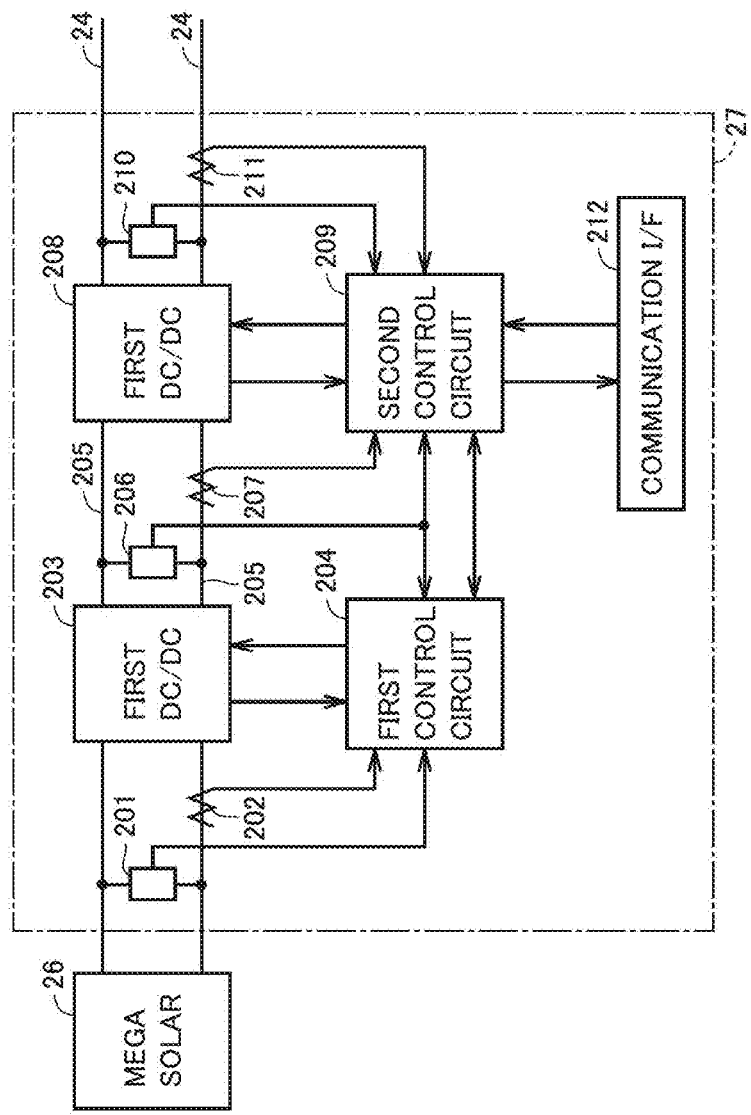
FIG. 6 is a block configuration diagram of a mega solar power conversion device illustrated in FIG. 1.

FIG. 6 is a block diagram illustrating a configuration of power conversion device 27 illustrated in FIG. 1.

As illustrated in FIG. 6, power conversion device 27 includes voltmeters 201, 206, 210, ammeters 202, 207, 211, a first DC/DC converter 203, a first control circuit 204, a DC bus 205, a first DC/AC converter 208, a second control circuit 209, and a communication interface (I/F) 212.

Voltmeter 201 measures a DC voltage output from mega solar 26. Ammeter 202 measures a direct current output from mega solar 26.

First DC/DC converter 203 converts a first DC voltage output from mega solar 26 into a second DC voltage. First control circuit 204 controls first DC/DC converter 203.

DC bus 205 transfers the second DC voltage output from first DC/DC converter 203 to first DC/AC converter 208. Voltmeter 206 measures a voltage of DC bus 205. Ammeter 207 measures a direct current output from first DC/DC converter 203.

First DC/AC converter 208 converts DC power output from first DC/DC converter 203 into AC power. Second control circuit 209 controls first DC/AC converter 208.

Voltmeter 210 measures an AC voltage output from first DC/AC converter 208. Ammeter 211 measures an alternating current output from first DC/AC converter 208. Communication I/F 212 communicates with power conversion device 27 and CEMS 31.

(3) Power Conversion Device 41

Figure 7:
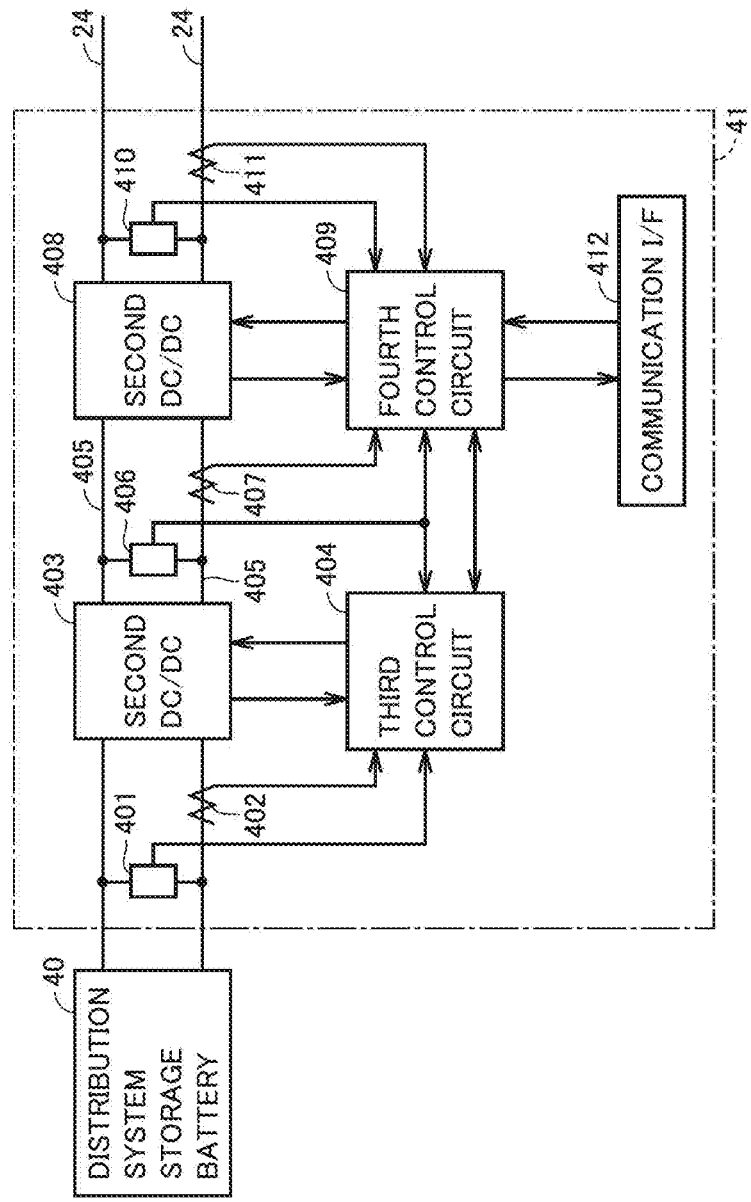
FIG. 7 is a block configuration diagram of a system storage battery power conversion device illustrated in FIG. 1.

FIG. 7 is a block diagram illustrating a configuration of power conversion device 41 illustrated in FIG. 1.

As illustrated in FIG. 7, power conversion device 41 includes voltmeters 401, 406, 410, ammeters 402, 407, 411, a second DC/DC converter 403, a third control circuit 404, a DC bus 405, second DC/AC converter 408, a fourth control circuit 409, and a communication I/F 412.

Voltmeter 401 measures a DC voltage output from storage battery 40. Ammeter 402 measures a direct current output from storage battery 40.

Second DC/DC converter 403 converts a third DC voltage output from storage battery 40 into a fourth DC voltage. Third control circuit 404 controls second DC/DC converter 403.

DC bus 405 transfers the DC voltage output from second DC/DC converter 403 to second DC/AC converter 408. Voltmeter 406 measures a voltage of DC bus 405. Ammeter 407 measures a direct current output from second DC/DC converter 403.

Second DC/AC converter 408 converts DC power output from second DC/DC converter 403 into AC power. Fourth control circuit 409 controls second DC/AC converter 408.

Voltmeter 410 measures an AC voltage output from second DC/AC converter 408. Ammeter 411 measures an alternating current output from second DC/AC converter 408. Communication I/F 412 communicates with power conversion device 41 and CEMS 31.

Note that a known DC/DC converter can be used as first DC/DC converter 203 (FIG. 6) and second DC/DC converter 403 (FIG. 7) as needed. A known inverter can be used as first DC/AC converter 208 (FIG. 6) and second DC/AC converter 408 (FIG. 7). First DC/AC converter 208 and second DC/AC converter 408 each correspond to an example of a "static inverter". Second control circuit 209 and fourth control circuit 409 each correspond to an example of a "static inverter controller".

(2-1) First Control Circuit 204

Figure 8:
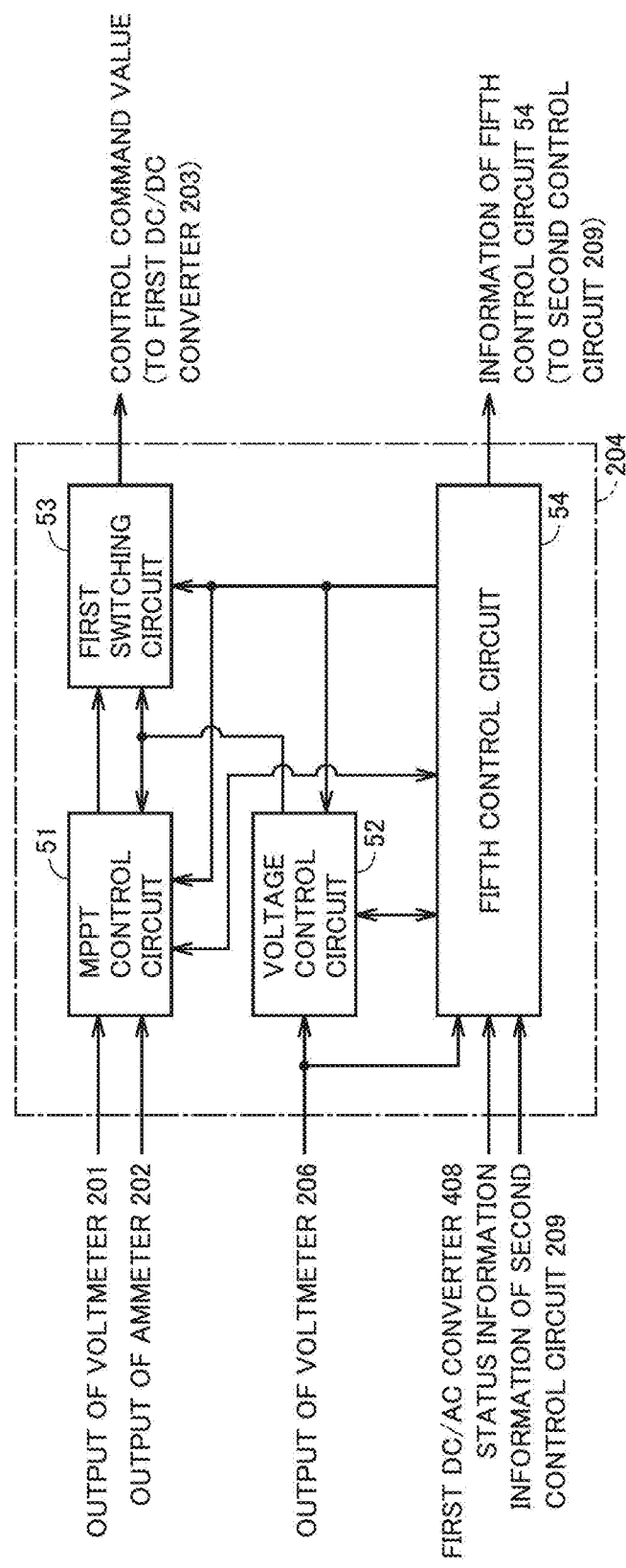
FIG. 8 is a block diagram for describing a configuration of a first control circuit that controls a first DC/DC converter of the mega solar power conversion device.

FIG. 8 is a block diagram illustrating a configuration of first control circuit 204 illustrated in FIG. 6.

As illustrated in FIG. 8, first control circuit 204 includes a maximum power point tracking (MPPT) control circuit 51, a voltage control circuit 52, a first switching circuit 53, and a fifth control circuit 54.

MPPT control circuit 51 performs so-called maximum power point tracking (MPPT) control on the basis of the measurement values of voltmeter 201 and ammeter 202. MPPT control circuit 51 searches for a maximum power point of mega solar 26 to maximize the power generated by mega solar 26. Specifically, MPPT control circuit 51 generates a control command value of first DC/DC converter 203 so as to make the DC voltage measured by voltmeter 201 equal to a voltage corresponding to the maximum power point.

Voltage control circuit 52 generates, on the basis of the measurement value of voltmeter 206, a control command value of first DC/DC converter 203 for maintaining the DC voltage (second DC voltage) of DC bus 205 at a predetermined target voltage.

Fifth control circuit 54 outputs control parameters, control target values, and the like of MPPT control circuit 51 and voltage control circuit 52, and manages a power generation state and the like of mega solar 26. Fifth control circuit 54 further outputs a control signal of first switching circuit 53.

First switching circuit 53 selectively outputs either one of the output of MPPT control circuit 51 and the output of voltage control circuit 52 as the control command value of first DC/DC converter 203 in accordance with a control signal from fifth control circuit 54.

First DC/DC converter 203 is controlled in an MPPT mode or a voltage control mode. In the MPPT mode, first switching circuit 53 outputs the control command value generated by MPPT control circuit 51. In the voltage control mode, first switching circuit 53 outputs the control command value generated by voltage control circuit 52.

(2-2) Second Control Circuit 209

Figure 9:
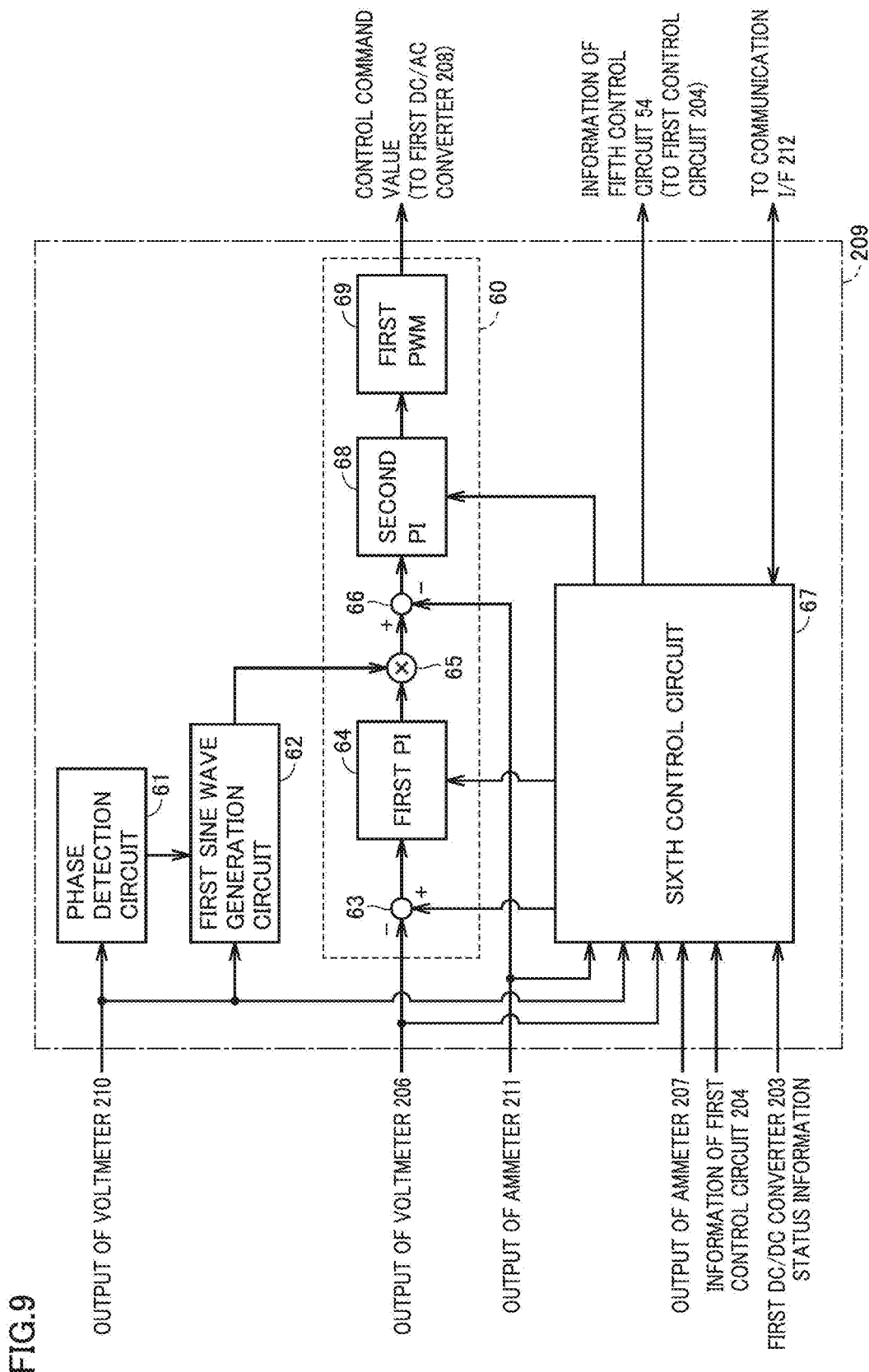
FIG. 9 is a block diagram for describing a configuration of a second control circuit that controls a first DC/AC converter of the mega solar power conversion device.

FIG. 9 is a block diagram illustrating a configuration of second control circuit 209 illustrated in FIG. 6.

As illustrated in FIG. 9, second control circuit 209 includes a phase detection circuit 61, a first sine wave generation circuit 62, a current control circuit 60, and a sixth control circuit 67.

Current control circuit 60 includes a subtractor 63, a first PI control circuit 64, a multiplier 65, a subtractor 66, a second PI control circuit 68, and a first PWM converter 69. Current control circuit 60 enables a control mode in which power is output in synchronization with a system voltage. This control mode is a control method applied to a general power converter for photovoltaic generation installed at a home.

Phase detection circuit 61 detects a phase of the AC voltage from a waveform of the AC voltage measured by voltmeter 210 (FIG. 6).

First sine wave generation circuit 62 generates a sine wave synchronized with the waveform of the AC voltage on the basis of amplitude of the AC voltage measured by voltmeter 210 and information on the phase detected by phase detection circuit 61. Note that, in the first embodiment, phase detection circuit 61 detects a zero-cross point of the waveform of the AC voltage, and detects a frequency of the AC voltage from the result of detecting the zero-cross point. Phase detection circuit 61 outputs the detected frequency of the AC voltage to first sine wave generation circuit 62 together with the zero-cross point information.

Current control circuit 60 generates a control command value for controlling first DC/DC converter 208 on the basis of the DC voltage of DC bus 205 measured by voltmeter 206 (FIG. 6). Subtractor 63 subtracts the DC voltage of DC bus 205 measured by voltmeter 206 from a target value of a DC bus voltage output from sixth control circuit 67. A value obtained as a result of subtraction by subtractor 63 is input to first PI control circuit 64.

Multiplier 65 generates a current command value by multiplying a control command value output from first PI control circuit 64 by the sine wave output from first sine wave generation circuit 62.

Subtractor 66 calculates a deviation between the current command value output from multiplier 65 and the current value of the AC system measured by ammeter 211 (FIG. 6), and outputs the calculated deviation to second PI control circuit 68.

Second PI control circuit 68 generates, on the basis of control parameters (proportional gain and integration time) provided from sixth control circuit 67, a control command value so as to make the deviation output from the subtractor 66 become zero. Second PI control circuit 68 outputs the generated control command value to first PWM converter 69.

First PWM converter 69 performs PWM control on the control command value input from second PI control circuit 68 to generate a control command value, and outputs the generated control command value to first DC/AC converter 208.

Sixth control circuit 67 collects measurement results regarding DC bus 205 output from voltmeter 206 and ammeter 207, measurement results regarding the AC system output from voltmeter 210 and ammeter 211, status information of first DC/DC converter 203 output from first control circuit 204, and the like, and notifies CEMS 31 and the like of the collected information via communication I/F 212.

Further, sixth control circuit 67 notifies first PI control circuit 64 and second PI control circuit 68 of the control parameter. Sixth control circuit 67 notifies CEMS 31 of information on active power and reactive power measured by an effective voltage measurement unit (not illustrated) of the AC system via communication I/F 212. Sixth control circuit 67 notifies fifth control circuit 54 of measurement values such as an effective voltage and active power of the AC system. For example, in a case where the effective value of the system voltage exceeds a predetermined value, fifth control circuit 54 switches the control of mega solar 26 from MPPT control to voltage control to suppress an increase in the system voltage.

(3-1) Third Control Circuit 404

Figure 10:
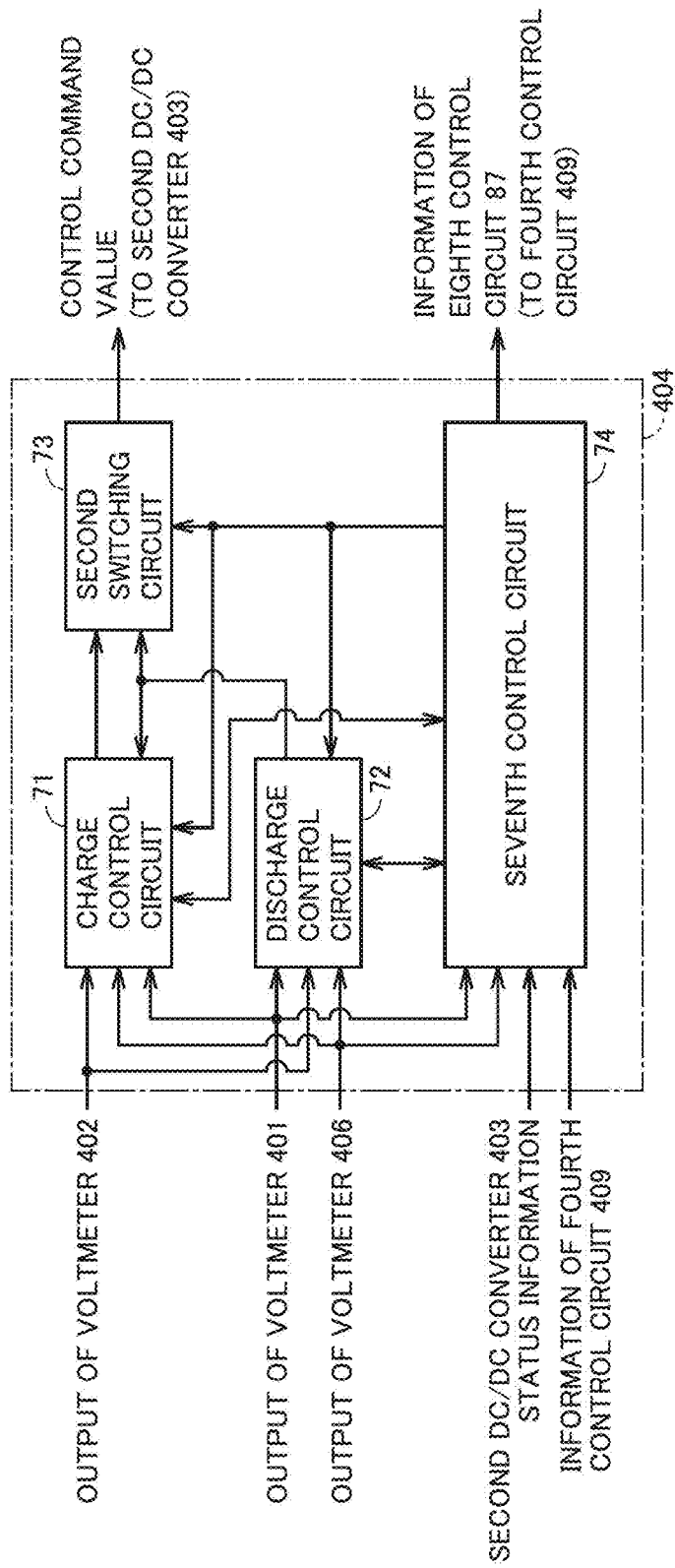
FIG. 10 is a block diagram for describing a configuration of a third control circuit that controls a second DC/DC converter of the storage battery power conversion device.

FIG. 10 is a block diagram illustrating a configuration of third control circuit 404 illustrated in FIG. 7.

As illustrated in FIG. 10, third control circuit 404 includes a charge control circuit 71, a discharge control circuit 72, a second switching circuit 73, and a seventh control circuit 74.

Charge control circuit 71 generates a control command value of second DC/DC converter 403 when performing charge control of storage battery 40.

Discharge control circuit 72 generates a control command value of second DC/DC converter 403 when performing discharge control of storage battery 40.

Seventh control circuit 74 outputs a control parameter, a control target value, and the like to charge control circuit 71 and discharge control circuit 72. Seventh control circuit 74 manages a state of charge (SOC), charge power (charge current), discharge power (discharge current), and the like of storage battery 40. Seventh control circuit 74 outputs a control signal of second switching circuit 73.

Second switching circuit 73 selectively outputs either one of the output of charge control circuit 71 and the output of discharge control circuit 72 as a control command value of second DC/DC converter 403 in accordance with the control signal from seventh control circuit 74. Specifically, second switching circuit 73 outputs, upon receipt of an instruction for charging storage battery 40, the control command value generated by charge control circuit 71. On the other hand, second switching circuit 73 outputs, upon receipt of an instruction for discharging storage battery 40, the control command value generated by discharge control circuit 72.

(3-2) Fourth Control Circuit 409

Figure 11:
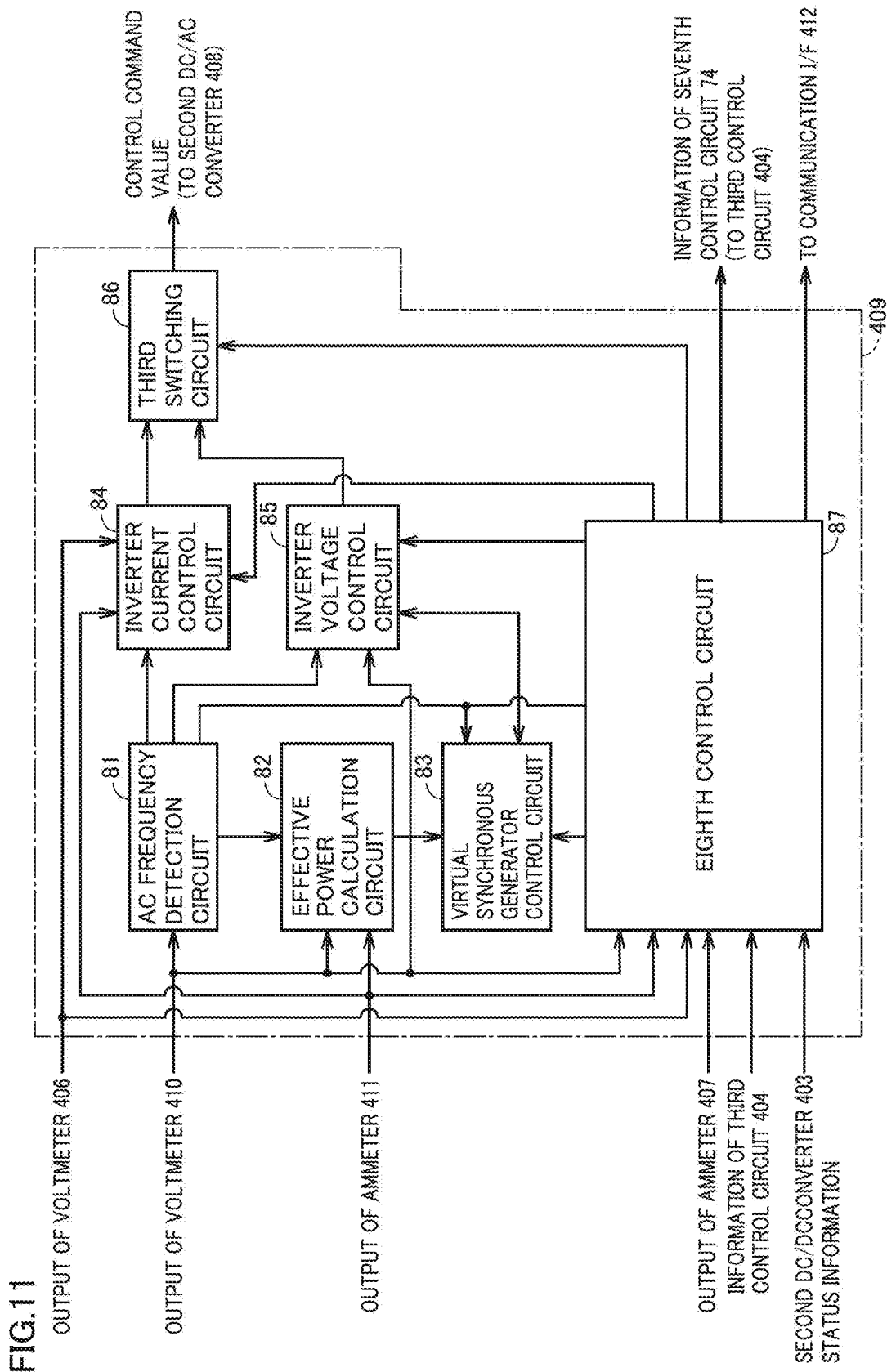
FIG. 11 is a block diagram for describing a configuration of a fourth control circuit that controls a second DC/AC converter of the storage battery power conversion device.

FIG. 11 is a block diagram illustrating a configuration of fourth control circuit 409 illustrated in FIG. 7.

As illustrated in FIG. 11, fourth control circuit 409 includes an AC frequency detection circuit 81, an effective power calculation circuit 82, a virtual synchronous generator control circuit 83, an inverter current control circuit 84, an inverter voltage control circuit 85, a third switching circuit 86, and an eighth control circuit 87.

AC frequency detection circuit 81 detects the phase of the AC voltage from the waveform of the AC voltage measured by voltmeter 410 (FIG. 7). In the first embodiment, the zero-cross point is detected from the waveform of the AC voltage, and the frequency is detected from a time interval of the detected zero-cross point. Note that the method for detecting the frequency of the AC voltage is not limited to the method using the result of detecting the zero-cross point.

Effective power calculation circuit 82 calculates the effective power using the information on the AC voltage and the alternating current measured by voltmeter 410 and ammeter 411 (FIG. 7). In the first embodiment, the effective power is calculated by integrating power for one period of the AC voltage waveform on the basis of the zero-cross point detection information and the AC frequency information output from AC frequency detection circuit 81. Note that the method for calculating the effective power is not limited to the above-described method, and, for example, in a case where the AC system is a three-phase AC, the effective power may be calculated using DQ transformation or the like.

Virtual synchronous generator control circuit 83 imparts, on the basis of the AC voltage frequency information output from AC frequency detection circuit 81 and the AC effective power information output from effective power calculation circuit 82, inertial force, synchronizing force, and damping force of a synchronous generator to second DC/AC converter 408 (static inverter).

[Virtual Synchronous Generator Control Technology]

Hereinafter, a virtual synchronous generator control technology will be briefly described.

A synchronous generator typically used for thermal power generation has a function of regulating output power in accordance with a frequency (governor function), a function of maintaining an angular velocity (inertial force), a function of synchronizing with a system voltage (synchronizing force), a function of regulating a voltage of a trunk system (automatic voltage regulation function (AVR function)), a function of continuing operation even when an AC system voltage instantaneously drops in the event of a system fault, and the like.

In the virtual synchronous generator control technology, a transient response of the static inverter is controlled to cause the static inverter to mimic the function of the synchronous generator. Specifically, three functions, the governor function, a function mimicking a point mass system model (dynamic characteristics of a rotary machine) based on a swing equation, and the AVR function, are mimicked.

Figure 45:
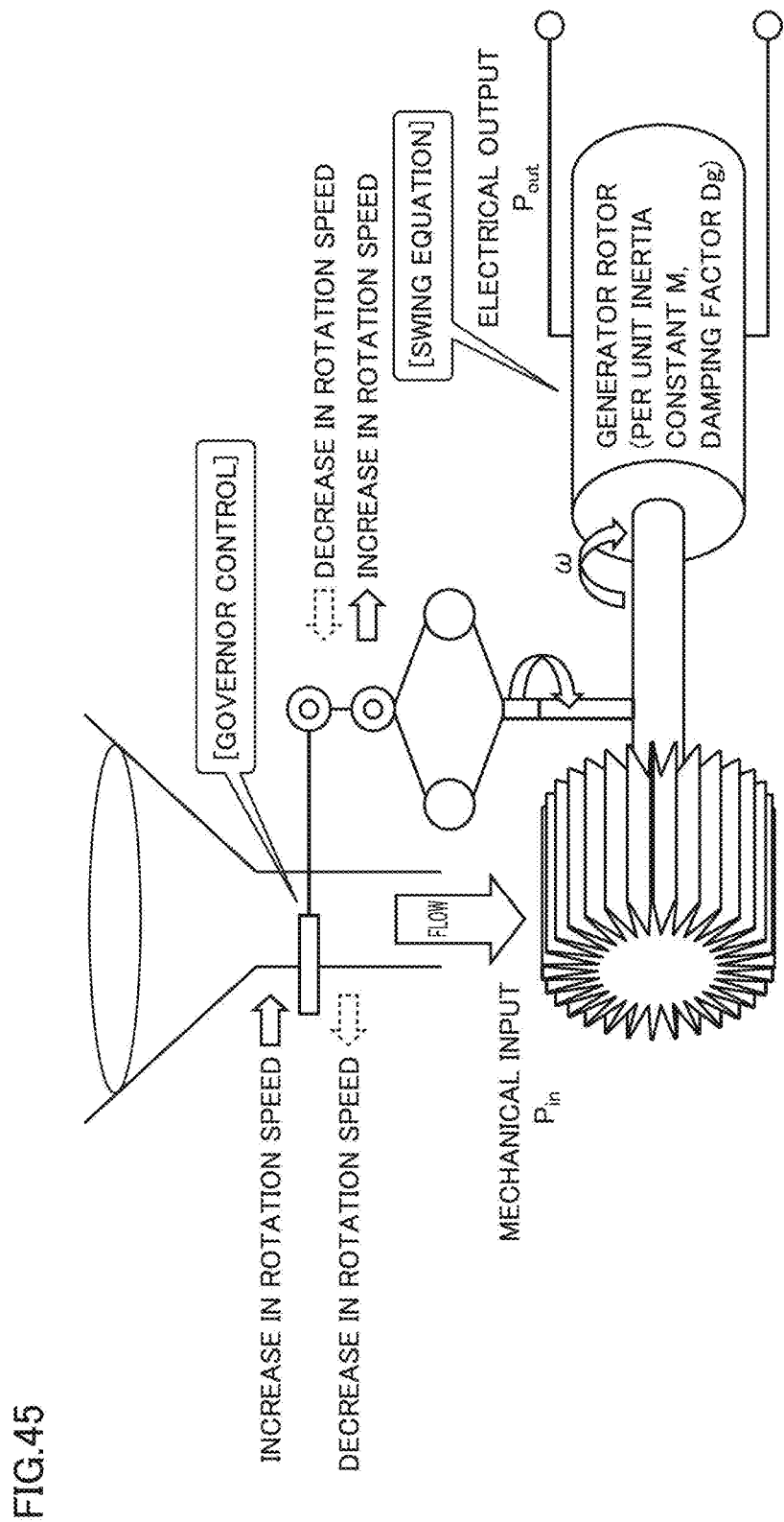
FIG. 45 is a diagram for describing a concept of a virtual synchronous generator control technology.

In the first embodiment, in particular, a case where the governor function and the function mimicking a point mass system model based on a swing equation are implemented in second DC/AC converter 408 will be described. FIG. 45 is a conceptual diagram for describing the virtual synchronous generator control technology. Note that the AVR function of the synchronous generator is a function controlled mainly on the basis of an output voltage command or a reactive power command value notified from a host system (CEMS 31 in the first embodiment), and is thus not implemented in the first embodiment. Hereinafter, the governor function and the function mimicking a point mass system model based on a swing equation will be described in detail.

First, the governor function will be described.

A governor in a power plant has a function of controlling output power of a generator by controlling output of a gas turbine or a steam turbine used for thermal power generation and nuclear power generation, guide vanes of a waterwheel used for hydraulic power generation, and the like. When demand power exceeds supply power in the AC power system, the frequency of the system voltage decreases. For a thermal power generator or a hydraulic power generator capable of performing output control, a droop characteristic is imparted to the governor, so that the generator is controlled to increase the power generation when the frequency of the system voltage decreases. On the other hand, when the frequency of the system voltage increases due to the supply power exceeding the demand power, the generator is controlled to reduce the power generation.

FIG. 45 is a diagram schematically illustrating the governor function. As illustrated in FIG. 45, when an angular velocity ω of the synchronous generator increases, a valve that regulates the inflow of energy moves to the right side, so as to reduce the energy supplied to the synchronous generator. On the other hand, when the angular velocity ω of the synchronous generator decreases, the valve moves to the left side, so as to increase the energy supplied to the synchronous generator. This allows the energy output from the synchronous generator to be controlled only by the frequency of the system voltage of its own terminal (that is, the angular velocity ω of the synchronous generator). Even when the synchronous generator separately perform the above-described operation, the operation is managed on the basis of the frequency of the system voltage, so that it is possible to share a load among a plurality of synchronous generators. For example, the Institute of Electrical Engineers of Japan provides a model constituted of a first-order lag system as a standard model.

In the first embodiment, an operation in a case where a governor is approximated by a model constituted of the above-described first-order lag system as shown by the following expression (1) will be described.

$$-1/\{Kgd \times (1 + s \times Tg)\} \quad (1)$$

where, $-1/Kgd$ in the expression (1) represents a proportional gain (Kgd: speed adjustment rate) of the governor, and Tg represents a time constant of the first-order lag system (Tg: governor time constant).

Next, the function mimicking a point mass system model based on a swing equation will be described.

As illustrated in FIG. 45, the synchronous generator includes a rotor having a per unit inertia constant M. For example, when the power generated by mega solar 26 suddenly decreases due to a sudden change in solar radiation amount, the shortage of power cannot be instantaneously covered by the above-described governor control. The synchronous generator converts rotational energy accumulated in the rotor into power and outputs the power to the AC system. At this time, when the angular velocity (rotation speed) of the rotor decreases, the energy supplied under the governor control increases, so as to balance the demand power and the supply power. The following expression (2) shows a swing equation mimicking a point mass system model (generator rotor). The swing equation is obtained by dividing energy P by the angular velocity ω to convert energy P into torque T.

$$Tin - Tout = M \times d\omega/dt + Dg \times \omega \quad (2)$$

where Dg represents a damping factor and M represents an inertia constant.

In the first embodiment, a case where inertial force, synchronizing force, and damping force of the synchronous generator are mimicked with the expressions (1) and (2)

incorporated into the control of the static inverter (second DC/AC converter 408) will be described.

Referring back to FIG. 11, inverter current control circuit 84 generates a control command value for controlling the current of second DC/AC converter 408. Note that inverter current control circuit 84 is different from current control circuit 60 illustrated in FIG. 9 only in control parameter, but has the same circuit configuration and operation, and thus no detailed description will be given below of inverter current control circuit 84.

Inverter voltage control circuit 85 generates a control command value for controlling the voltage of second DC/AC converter 408.

Third switching circuit 86 switches between the control command value from inverter current control circuit 84 and the control command value from inverter voltage control circuit 85 on the basis of the output of eighth control circuit 87.

Eighth control circuit 87 collects the measurement results regarding DC bus 405 from voltmeter 406 and ammeter 407, the status information of second DC/DC converter 403 output from third control circuit 404, and the like, and notifies CEMS 31 and the like of the collected information via communication I/F 412.

Further, eighth control circuit 87 notifies virtual synchronous generator control circuit 83, inverter current control circuit 84, and inverter voltage control circuit 85 of their respective control parameters.

Further, eighth control circuit 87 notifies CEMS 31 of information on the effective voltage of the AC system measured by the effective voltage measurement unit of the AC system (not illustrated) or information on the active power and the reactive power measured by an active and reactive power measurement unit of the AC system (not illustrated) via the communication I/F 412. Eighth control circuit 87 notifies seventh control circuit 74 of the measurement results such as the effective voltage and the active power of the AC system.

(3-2-1) AC Frequency Detection Circuit 81

Figure 12:
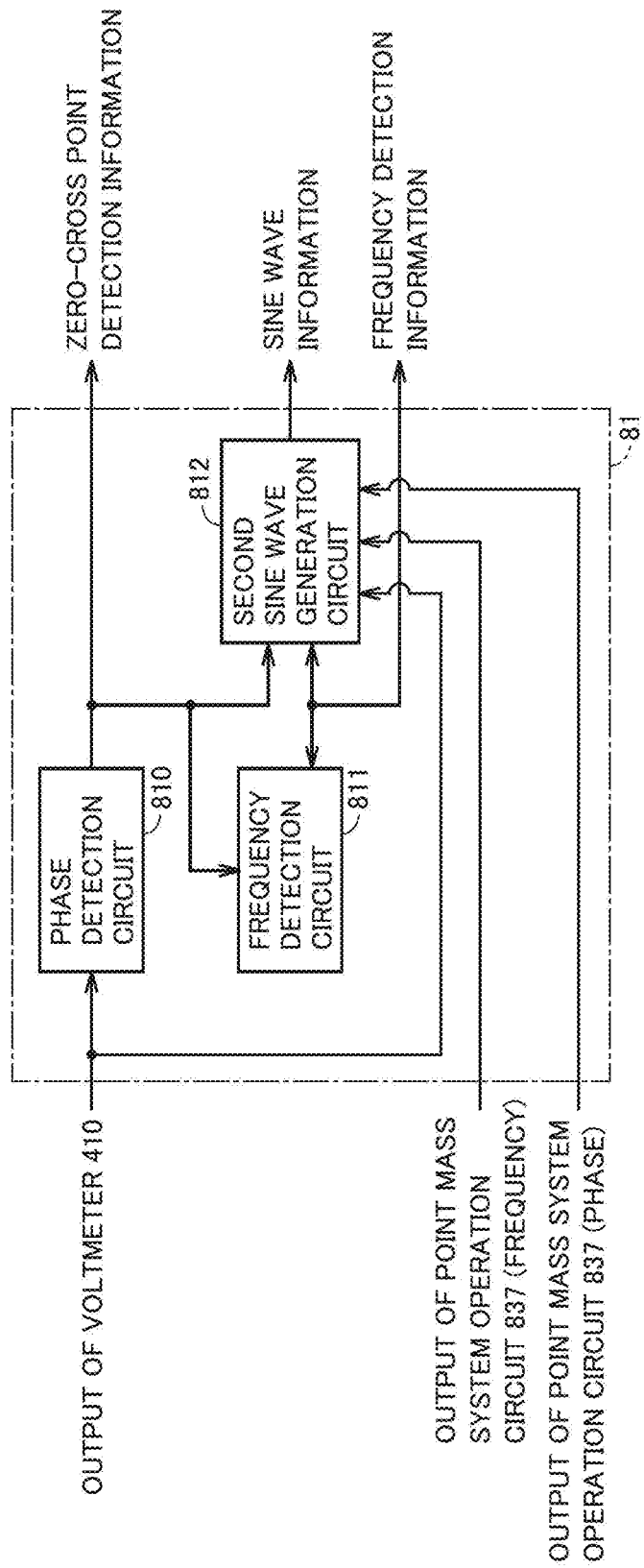
FIG. 12 is a block diagram for describing a configuration of an AC frequency detection circuit illustrated in FIG. 11.

FIG. 12 is a block diagram illustrating a configuration of AC frequency detection circuit 81 illustrated in FIG. 11.

As illustrated in FIG. 12, AC frequency detection circuit 81 includes a phase detection circuit 810, a frequency detection circuit 811, and a second sine wave generation circuit 812.

Phase detection circuit 810 detects a zero-cross point from the waveform of the system voltage output from voltmeter 410. A method for detecting a phase in phase detection circuit 810 is not limited to the detection of the zero-cross point. For detection of the zero-cross point in an actual machine, an error occurs due to an error in detection of the zero-cross point by voltmeter 410 (mainly an offset error), an error in detection of amplitude by voltmeter 410 (mainly a linearity error), an error in sampling rate when the system voltage waveform is sampled, or the like. Note that, when sampling is performed using a microcomputer or the like, an error in sampling rate may occur due to a variation in time from carrier interrupt to actual sampling.

Frequency detection circuit 811 detects a system frequency from the period of the zero-cross point output from phase detection circuit 810. Note that the method for detecting the system frequency is not limited to the method for detecting the system frequency from the period of the zero-cross point.

Second sine wave generation circuit 812 generates a sine wave synchronized with the system voltage on the basis of the result of detecting the zero-cross point by phase detection circuit 810, the result of detecting the frequency by frequency detection circuit 811, and the amplitude of the system voltage output from CEMS 31. AC frequency detection circuit 81 outputs the result of detecting the zero-cross point (time when the zero-cross point is detected), the result of detecting the frequency, and the sine wave information.

(3-2-2) Inverter Voltage Control Circuit 85

Figure 13:
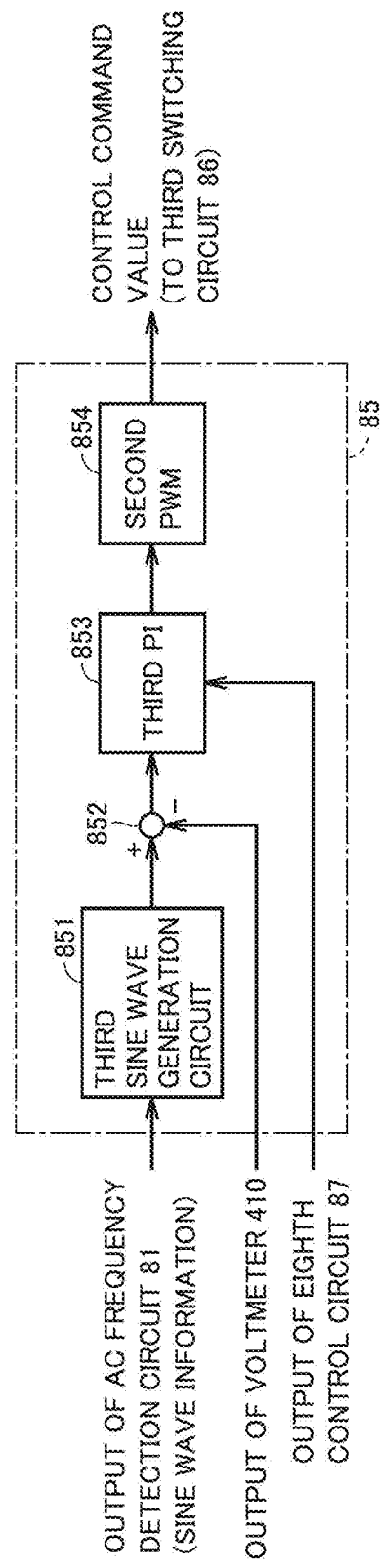
FIG. 13 is a block diagram for describing a configuration of an inverter voltage control circuit illustrated in FIG. 11.

FIG. 13 is a block diagram illustrating a configuration of inverter voltage control circuit 85 illustrated in FIG. 11.

As illustrated in FIG. 13, inverter voltage control circuit 85 includes a third sine wave generation circuit 851, a subtractor 852, a third PI control circuit 853, and a second PWM converter 854.

Inverter voltage control circuit 85 generates a control command value for controlling second DC/AC converter 408 on the basis of the information on the frequency and phase output from virtual synchronous generator control circuit 83 (FIG. 11) and the information on the amplitude of the system voltage output from eighth control circuit 87 (FIG. 11). Note that the information on the amplitude of the system voltage from eighth control circuit 87 is input to inverter voltage control circuit 85 via second sine wave generation circuit 812.

The sine wave information (information on the frequency, phase, and amplitude) from AC frequency detection circuit 81 (FIG. 11) is input to third sine wave generation circuit 851. Third sine wave generation circuit 851 generates a target value of the AC voltage output from second DC/AC converter 408 on the basis of the input sine wave information.

Subtractor 852 calculates a deviation between the target value of the AC voltage from third sine wave generation circuit 851 and the voltage measured by voltmeter 410, and outputs the calculated deviation to third PI control circuit 853.

Third PI control circuit 853 generates a voltage command value by performing a proportional integral (PI) operation so as to make the input deviation become zero. Third PI control circuit 853 outputs the generated voltage command value to second PWM converter 854. Note that it is assumed that control parameters (control gain and integration time) for third PI control circuit 853 are provided from eighth control circuit 87.

Second PWM converter 854 performs pulse width modulation (PWM) control using the voltage command value output from third PI control circuit 853 to generate a control signal. Second PWM converter 854 outputs the generated control signal to second DC/AC converter 408.

(3-2-3) Virtual Synchronous Generator Control Circuit 83

Figure 14:
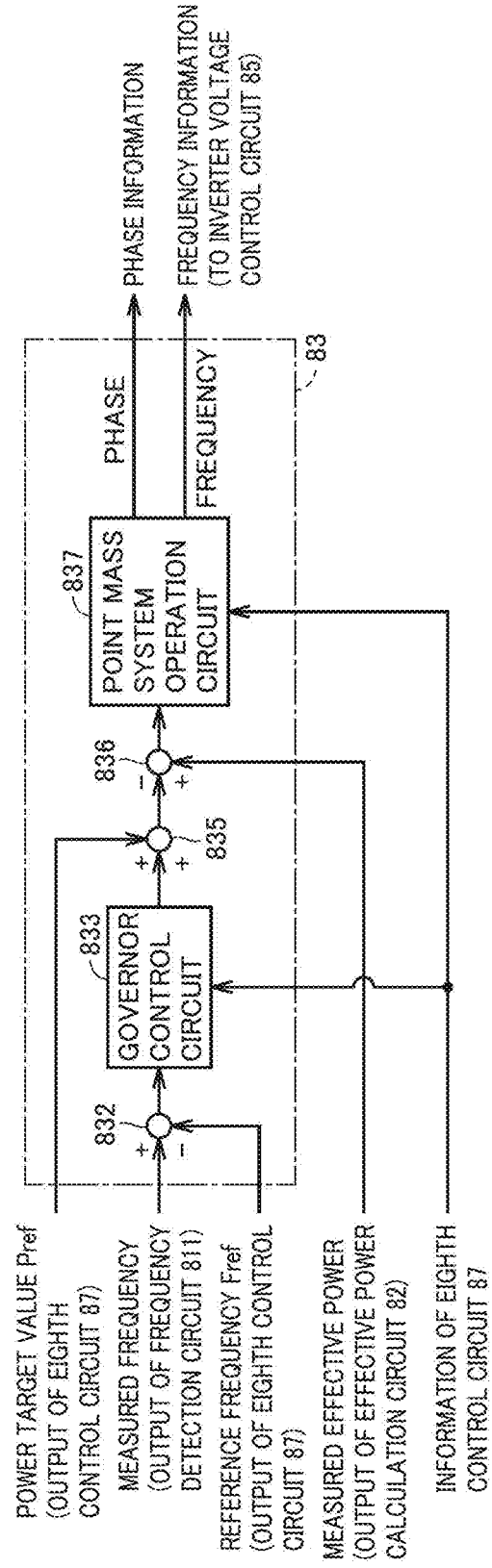
FIG. 14 is a block diagram for describing a configuration example of a virtual synchronous generator control circuit illustrated in FIG. 11.

FIG. 14 is a block diagram illustrating a configuration of virtual synchronous generator control circuit 83 illustrated in FIG. 11.

As illustrated in FIG. 14, virtual synchronous generator control circuit 83 includes a subtractor 832, a governor control circuit 833, an adder 835, a subtractor 836, and a point mass system operation circuit 837.

Subtractor 832 calculates a deviation between the result of actually measuring the frequency and the reference frequency Fref output from eighth control circuit 87.

The output of subtractor 832 is input to governor control circuit 833. Governor control circuit 833 generates an offset value to be added to the power target value on the basis of the output of subtractor 832. Details of the operation of governor control circuit 833 will be described later.

Adder 835 adds up the offset value output from governor control circuit 833 and the power target value Pref input from eighth control circuit 87 to generate a control power target value of point mass system operation circuit 837.

Subtractor 836 calculates a deviation between the effective power input from effective power calculation circuit 82 and the control power target value input from adder 835. The output of subtractor 836 is input to point mass system operation circuit 837.

Point mass system operation circuit 837 calculates the frequency and phase of the system voltage output from power conversion device 41 so as to make the deviation output from subtractor 836 become zero. Note that, in the first embodiment, the control parameters (speed adjustment rate Kgd, governor time constant Tg, inertia constant M, and damping factor Dg) of governor control circuit 833 and point mass system operation circuit 837 are notified from CEMS 31 via eighth control circuit 87.

(3-2-3-1) Governor Control Circuit 833

Figure 15:
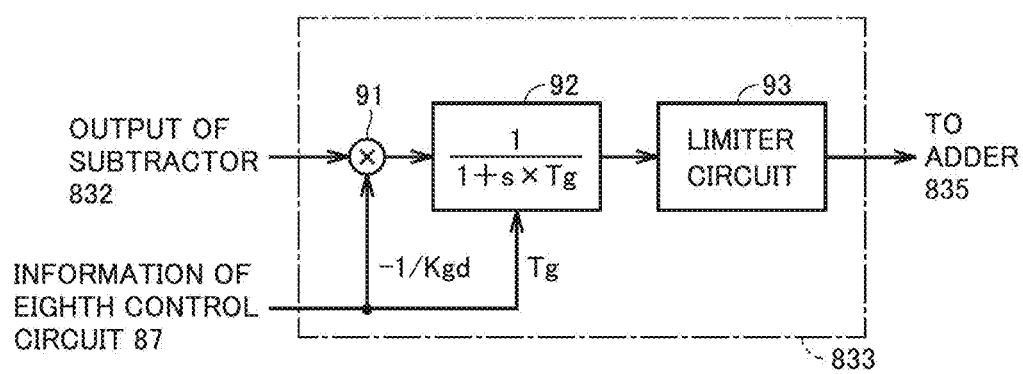
FIG. 15 is a block diagram for describing a configuration of a governor control circuit illustrated in FIG. 14.

FIG. 15 is a block diagram illustrating a configuration of governor control circuit 833 illustrated in FIG. 14.

As illustrated in FIG. 15, governor control circuit 833 includes a multiplier 91, a first-order lag system model 92, and a limiter circuit 93.

Multiplier 91 multiplies the output of subtractor 832 by the proportional gain (−1/Kgd) output from eighth control circuit 87. The output of multiplier 91 is input to first-order lag system model 92. In the first embodiment, first-order lag system model 92 includes a standard model (1/(1+s×Tg)) of the first-order lag system presented by the Institute of Electrical Engineers of Japan. Limiter circuit 93 performs limiter processing on the output of first-order lag system model 92.

(3-2-3-2) Point Mass System Operation Circuit 837

Figure 16:
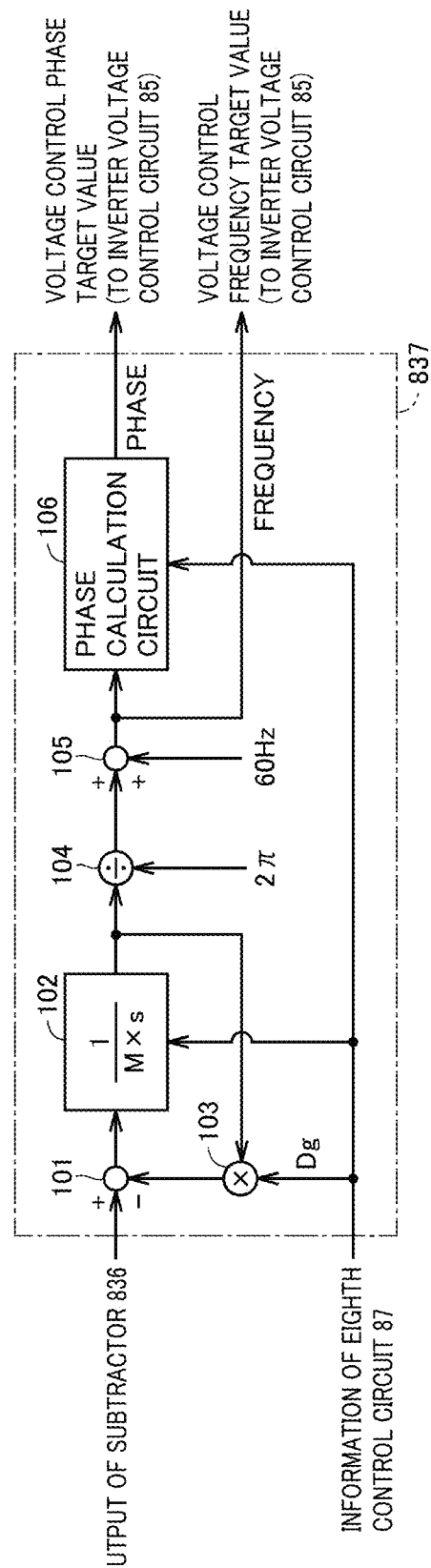
FIG. 16 is a block diagram for describing a configuration of a point mass system operation circuit illustrated in FIG. 14.

FIG. 16 is a block diagram illustrating a configuration of point mass system operation circuit 837 illustrated in FIG. 14.

As illustrated in FIG. 16, point mass system operation circuit 837 includes a subtractor 101, an integrator 102, a multiplier 103, a divider 104, an adder 105, and a phase calculation circuit 106.

Subtractor 101 calculates a deviation between the output of subtractor 836 and the output of multiplier 103. The output of subtractor 101 is input to integrator 102.

Integrator 102 divides the output of subtractor 101 by inertia constant M and integrates the output of subtractor 101 to generate a difference value $\Delta\omega$ between the target angular velocity ($2\times\pi\times$target frequency (for example, 60 Hz)) of the generator rotor illustrated in FIG. 45 and the angular velocity of the generator rotor. The output of integrator 102 is input to multiplier 103.

Multiplier 103 multiplies the output of integrator 102 by the damping factor Dg input from eighth control circuit 87.

Point mass system operation circuit 837 is to mimic the damping force of the synchronous generator under the control of second DC/AC converter 408 on the basis of the deviation between the output of subtractor 836 and the output of multiplier 103.

Divider 104 divides the output $\Delta\omega$ of integrator 102 by $2\times\pi$ to convert the output $\Delta\omega$ into a frequency difference value $\Delta f$. Adder 105 converts the frequency difference information $\Delta f$ into the frequency (rotational frequency) of the generator rotor by adding the target frequency (60 Hz) to frequency difference information $\Delta f$. The output of adder 105 is input to phase calculation circuit 106. Phase calculation circuit 106 calculates the phase of the generator rotor.

Next, a transfer function of the swing equation of point mass system operation circuit 837 will be described. The transfer function of the swing equation can be expressed using the proportional gain (1/Dg) and the time constant (M/Dg) of the first-order lag system as shown in the following expression (3).

$$(1/M\times s)/\{1+Dg/M\times(1/s)\}=(1/Dg)\times[1/\{1+(M/Dg)\times s\}] \quad (3)$$

Note that the governor time constant Tg and the time constant M/Dg of the point mass system operation unit under the virtual synchronous generator control are determined on the basis of a response speed required for the system.

(Outline of Operation of Distributed Power Supply Management Device)

Next, an outline of operation of the distributed power supply management device according to the first embodiment will be described.

Figure 17:
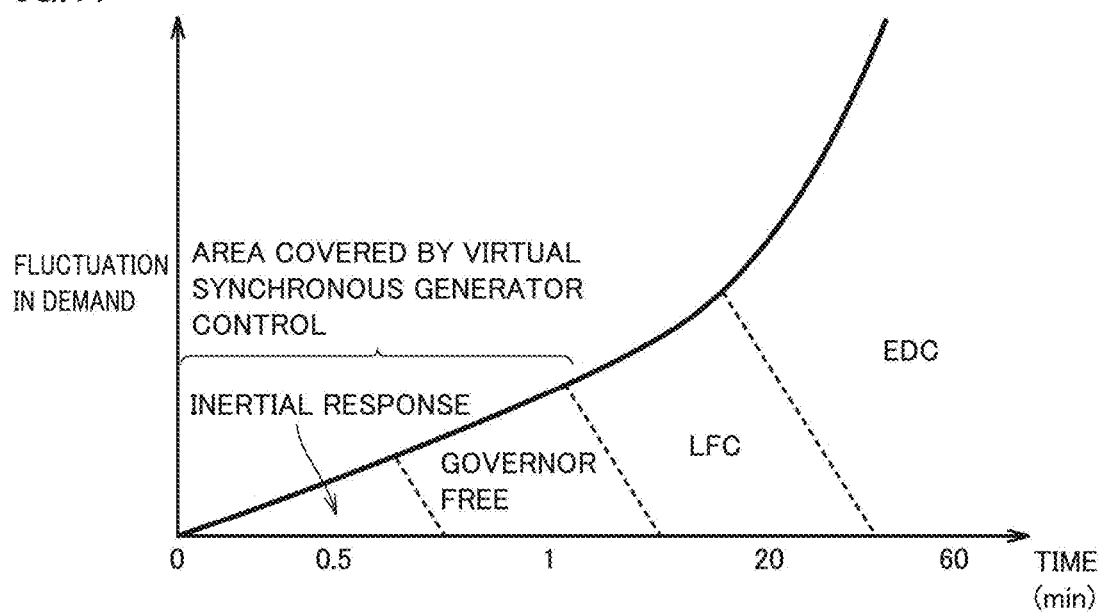
FIG. 17 is a diagram for describing an area covered by virtual synchronous generator control implemented in the storage battery power conversion device according to the first embodiment.

FIG. 17 is a diagram illustrating an area covered by the virtual synchronous generator control implemented in power conversion device 41. In FIG. 17, the horizontal axis represents a response time, and the vertical axis represents a range of fluctuation in demand.

As illustrated in FIG. 17, the virtual synchronous generator control implemented in the static inverter covers minute fluctuations and short-period fluctuations of the order of about several tens of milliseconds to several minutes. Fluctuations of the order of several minutes or more can be dealt with by load frequency control (LFC) or economic load distribution control (EDC). Therefore, in the first embodiment, the description will be given on the assumption that the response performance of the virtual synchronous generator control is less than or equal to 1 second.

In the following description, a model including storage battery 40, power conversion device 41, impedance 29 of distribution system 24, and load 600 connected to distribution system 24 illustrated in FIG. 2 is used. For the sake of simplicity of the description, the inverter capacity of power conversion device 41 is set to 4 kW, and the maximum capacity of load 600 is set to 4 kW.

Figure 18:
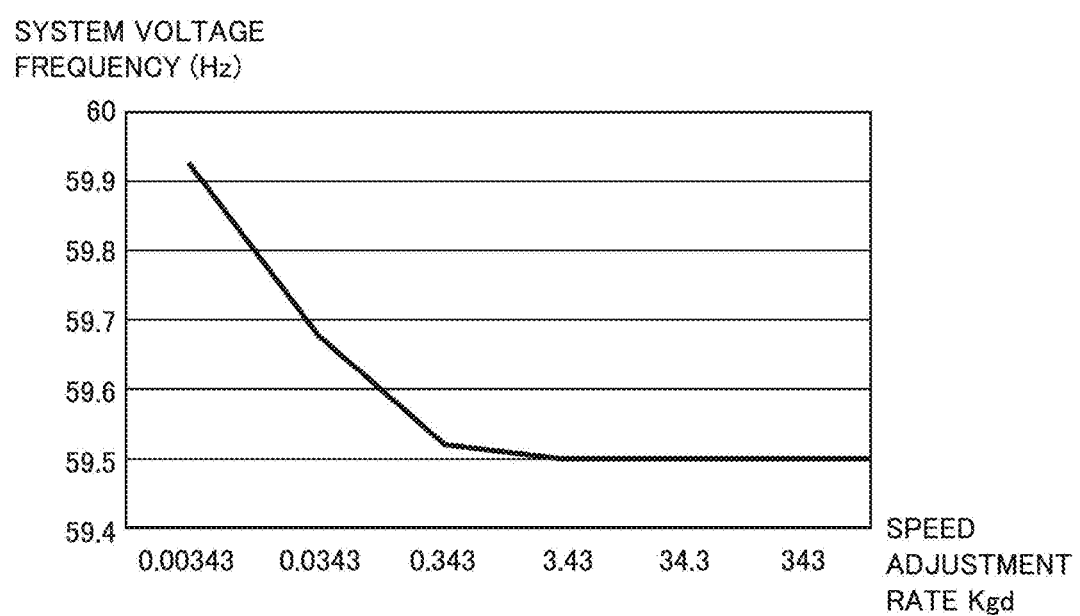
FIG. 18 is a diagram illustrating an example of a relationship between a speed adjustment rate and a system frequency when a load is suddenly changed under the virtual synchronous generator control implemented in the storage battery power conversion device according to the first embodiment.

FIG. 18 is a diagram for describing the virtual synchronous generator control implemented in power conversion device 41 according to the first embodiment. FIG. 18 illustrates an example of a relationship between the speed adjustment rate Kgd and the system frequency when the power consumed by load 600 is changed without changing the power target value. FIG. 18 illustrates a system frequency at each speed adjustment rate Kgd in a steady state when load 600 fluctuates from 2 kW to 4 kW in a state where the power target value of 2 kW is notified from CEMS 31 in FIG. 2. Note that the governor time constant Tg, the inertia constant M, and the damping factor Dg are each kept constant.

In the example of FIG. 18, until Kgd becomes 0.343, the system frequency decreases as the numerical value of Kgd increases. On the other hand, it is confirmed that the system frequency converges when Kgd exceeds 0.343.

Figure 19:
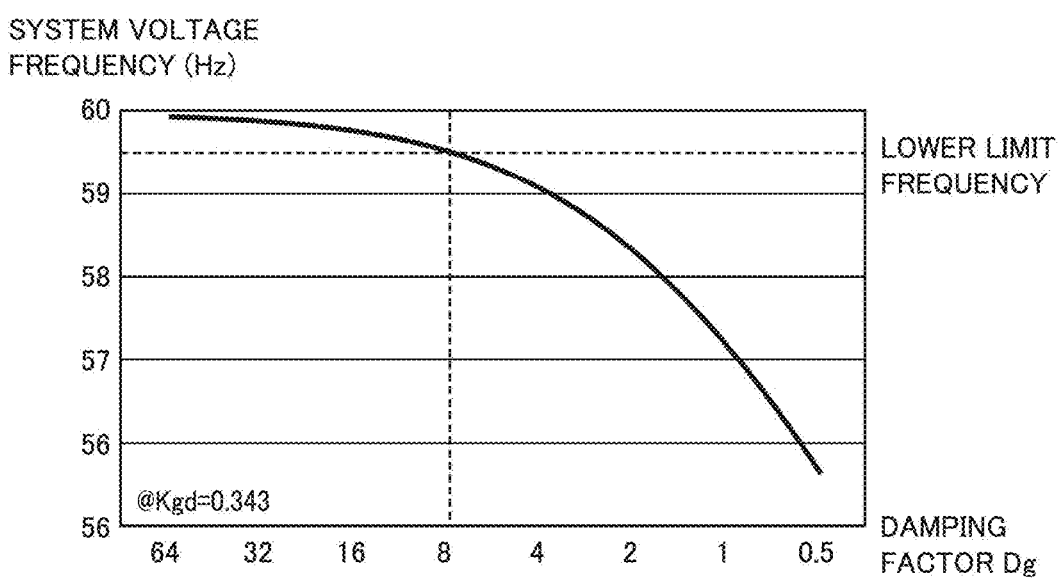
FIG. 19 is a diagram illustrating an example of a relationship between a damping factor and a system frequency when a load is suddenly changed under the virtual synchronous generator control implemented in the storage battery power conversion device according to the first embodiment.

FIG. 19 is a diagram for describing the virtual synchronous generator control implemented in power conversion device 41 according to the first embodiment. FIG. 19 illustrates an example of a relationship between the damping factor Dg and the system frequency when the load is suddenly changed. FIG. 19 illustrates a system frequency at each damping factor Dg when the load is changed from 2 kW to 4 kW in a state where the power target value of 2 kW is notified from CEMS 31 in FIG. 2. Note that the governor time constant Tg, the inertia constant M, and the speed adjustment rate Kgd (=0.343) are each kept constant. In the example of FIG. 19, it is confirmed that the system frequency becomes lower and lower as damping factor Dg decreases.

In general, a limit (upper limit and lower limit) of the system frequency is about the reference frequency (hereinafter, also referred to as Fref)±1 to 2%. Therefore, when the reference frequency Fref is 60 Hz, the upper limit of the system frequency is about 61.2 to 60.6 Hz, and the lower limit of the system frequency is about 59.4 to 58.8 Hz. It is therefore necessary to set the speed adjustment rate Kgd and the damping factor Dg of the governor control so as to cause the system frequency to fall within the frequency range determined by the above-described limit.

Next, the ΔP/ΔF characteristic will be described.

Figure 20:
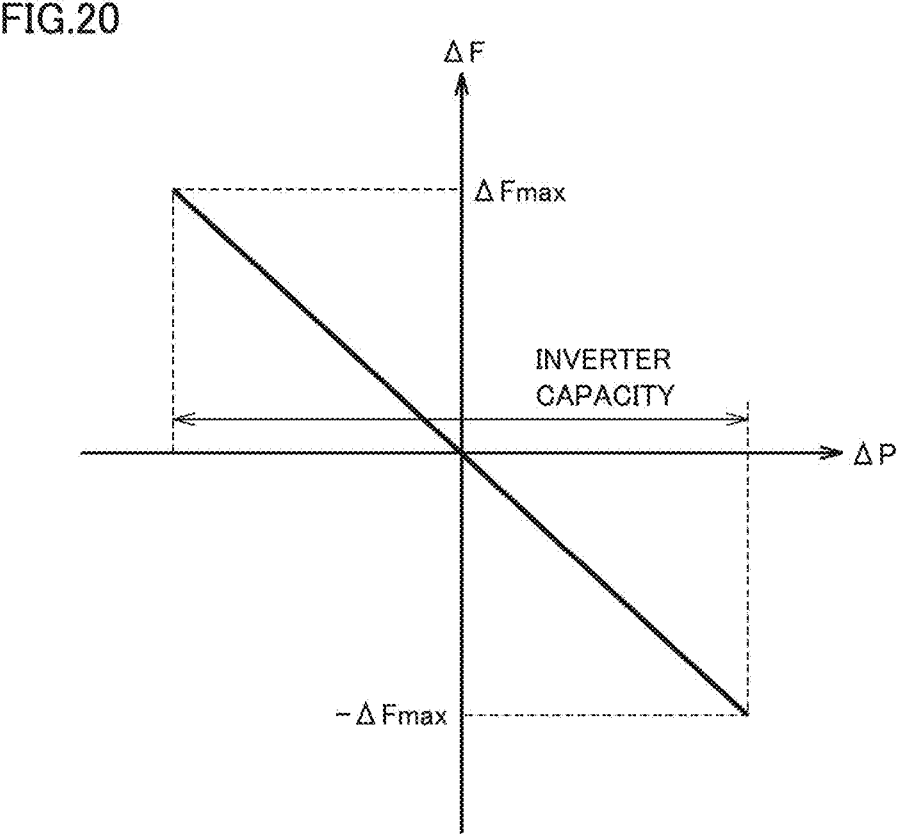
FIG. 20 is a diagram illustrating an example of a ΔP/ΔF characteristic of the virtual synchronous generator control implemented in the storage battery power conversion device according to the first embodiment.

FIG. 20 is a diagram illustrating an example of the ΔP/ΔF characteristic. In FIG. 20, the horizontal axis represents difference power ΔP that is a deviation between the power target value and the actual output power of power conversion device 41. The difference power ΔP is positive when the output power of power conversion device 41 is greater than the power target value.

In FIG. 20, the vertical axis represents a difference frequency ΔF that is a deviation between the reference frequency Fref (for example, 60 Hz) of the AC system and the frequency of the AC voltage output from power conversion device 41. The difference frequency ΔF is positive when the frequency of the AC voltage output from the power conversion device 41 is higher than the reference frequency Fref. ΔFmax denotes a maximum value of the difference frequency ΔF.

In virtual synchronous generator control circuit 83 (FIG. 11) according to the first embodiment, the ΔP/ΔF characteristic illustrated in FIG. 20 is determined on the basis of the capacity of the static inverter (second DC/AC converter 408), the speed adjustment rate Kgd, and the damping factor Dg. In FIG. 20, the power target value is set to half of the capacity of the static inverter (second DC/AC converter 408) without the charge of storage battery 40 taken into account. FIG. 20 illustrates a ΔP/ΔF characteristic in a case where the system frequency when the power consumed by load 600 becomes the same as the capacity of the static inverter (second DC/AC converter 408) in FIG. 2 is the upper limit (Fref+ΔFmax) and the system frequency when the power consumption of load 600 becomes zero is the lower limit (Fref−ΔFmax).

In the first embodiment, the ΔP/ΔF characteristic illustrated in FIG. 20 is referred to as "reference ΔP/ΔF characteristic". As described above, the reference ΔP/ΔF characteristic is a ΔP/ΔF characteristic under the condition that half of the capacity of the static inverter is set as the power target value in a discharge mode of storage battery 40, the system frequency becomes the upper limit (Fref+ΔFmax) when the output of the static inverter coincides with the capacity, and the system frequency becomes the lower limit (Fref−ΔFmax) when the output of the static inverter becomes zero. Note that details of the discharge mode will be described later.

Figure 21:
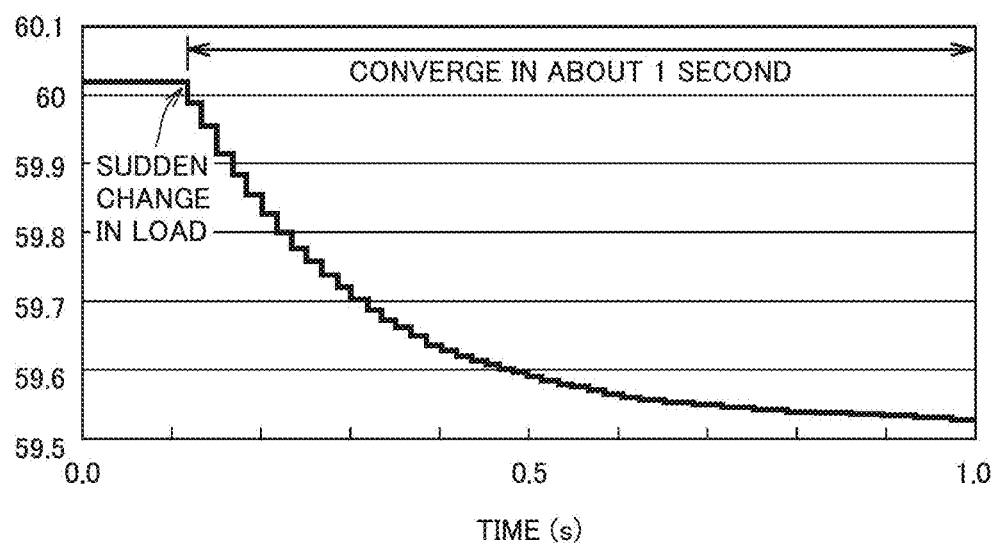
FIG. 21 is a diagram illustrating a response waveform of a frequency of a system voltage output from a static inverter when a load is suddenly changed under the virtual synchronous generator control implemented in the storage battery power conversion device according to the first embodiment.

FIG. 21 is a diagram illustrating a response waveform of the frequency of the AC voltage output from the static inverter when the load is suddenly changed under the virtual synchronous generator control implemented in power conversion device 41 according to the first embodiment.

As described with reference to FIG. 17, the virtual synchronous generator control implemented in the static inverter covers minute vibrations and short-period fluctuations of the order of about several tens of milliseconds to several minutes. Therefore, response performance of 1 second or less is required for the virtual synchronous generator control. In general, a decrease in the time constant increases the response performance, but causes the response waveform to fluctuate. Further, in a case where a plurality of distributed power supplies operates in cooperation with each other, a problem such as unnecessary cross current may occur. Therefore, in the first embodiment, as illustrated in FIG. 21, a time constant for governor control circuit 833 (FIG. 15) and point mass system operation circuit 837 (FIG. 16) is determined so as to cause the system frequency to converge in about 1 second.

(Conventional Virtual Synchronous Generator Control and Problems Thereof)

Next, a problem in a case where two power conversion devices 41 having a conventional virtual synchronous generator control implemented are installed in distribution system 24 will be described.

Figure 22:
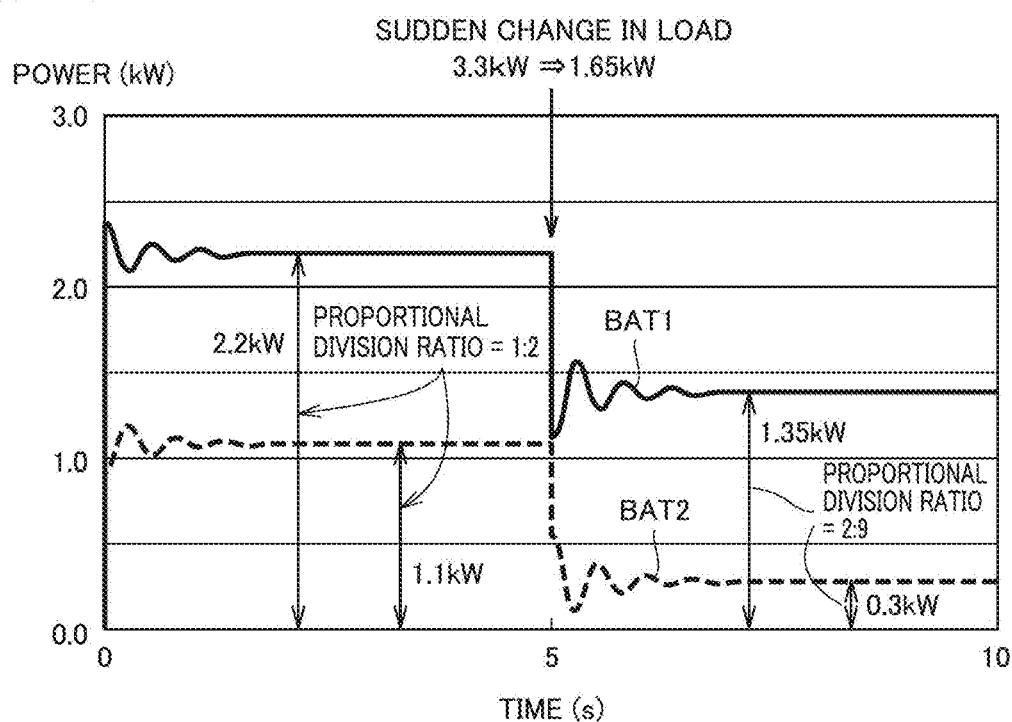
FIG. 22 is a diagram illustrating a response waveform of an effective value of AC power output from each static inverter unit when a load is suddenly changed in a stand-alone system including two storage battery power conversion devices each having conventional virtual synchronous generator control implemented.

FIG. 22 is a diagram illustrating a response waveform of the effective value of the AC power output from each of the static inverters of two power conversion devices 41 having the conventional virtual synchronous generator control implemented. The response waveform illustrated in FIG. 22 indicates the waveform of the effective value of the AC power output from each static inverter when the load is suddenly changed with the two storage battery power conversion devices 41 constituting a stand-alone system.

In FIG. 22, the inverter capacity of each power conversion device 41 is set to 4 kW, and the power consumed by the load is set to 3.3 kW. With a power target value of a first storage battery (denoted as "BAT1" in the drawing) corresponding to a first power conversion device 41 set to 2.2 kW, and a power target value of a second storage battery (denoted as "BAT2" in the drawing) corresponding to a second power conversion device 41 set to 1.1 kW, the first and second power conversion devices 41 are controlled. In such a state, it is assumed that the power consumed by the load suddenly changes to about a half (1.65 kW) around 5 seconds.

As illustrated in FIG. 22, before the sudden change in load, power close to the power target value (2.2 kW) is output from first power conversion device 41, power close to the power target value (1.1 kW) is output from second power conversion device 41, and a power ratio between the two is 2:1.

On the other hand, after the sudden change in load, the output power of first power conversion device 41 is 1.35 kW, the output power of second power conversion device 41 is 0.3 kW, and the power ratio between the two is 9:2. It can be seen that after the load suddenly changes as described above, power is output from two power conversion devices 41 at the power proportional division ratio (9:2) different from the expected ratio (2:1).

Figure 23:
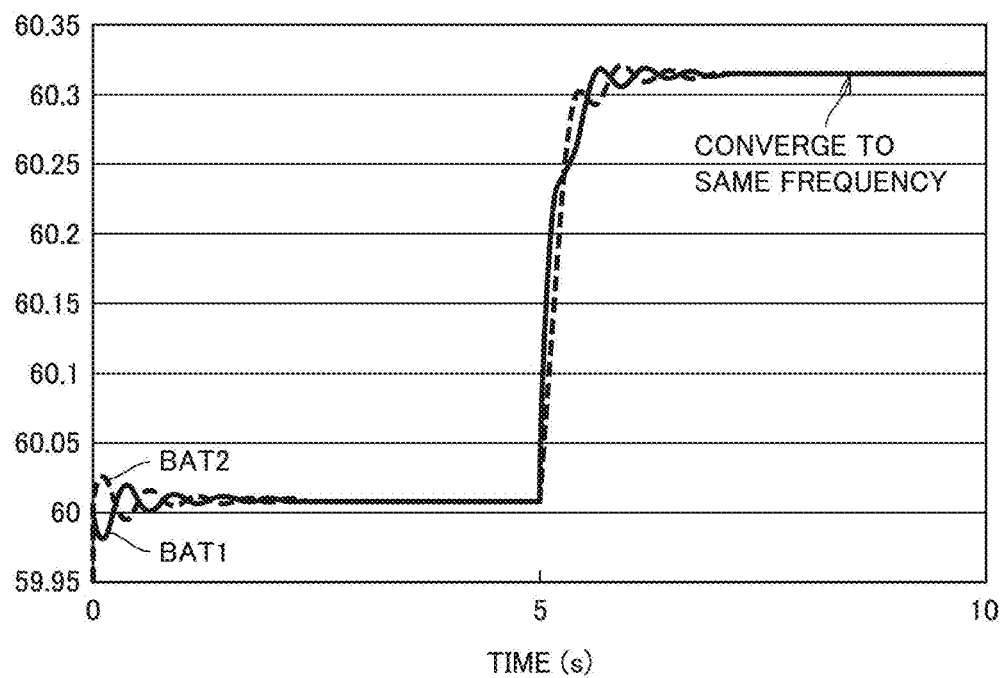
FIG. 23 is a diagram illustrating a response waveform of a frequency of a system voltage output from each static inverter unit when a load is suddenly changed in a stand-alone system including two storage battery power conversion devices each having conventional virtual synchronous generator control implemented.

FIG. 23 illustrates a response waveform of the frequency of the AC voltage output from each static inverter when two power conversion devices 41 having the conventional virtual synchronous generator control implemented are put into operation under the above-described conditions. As illustrated in FIG. 23, it can be seen that the frequencies of the AC voltages converge to substantially the same frequency by the virtual synchronous generator control even after the sudden change in load.

Figure 24:
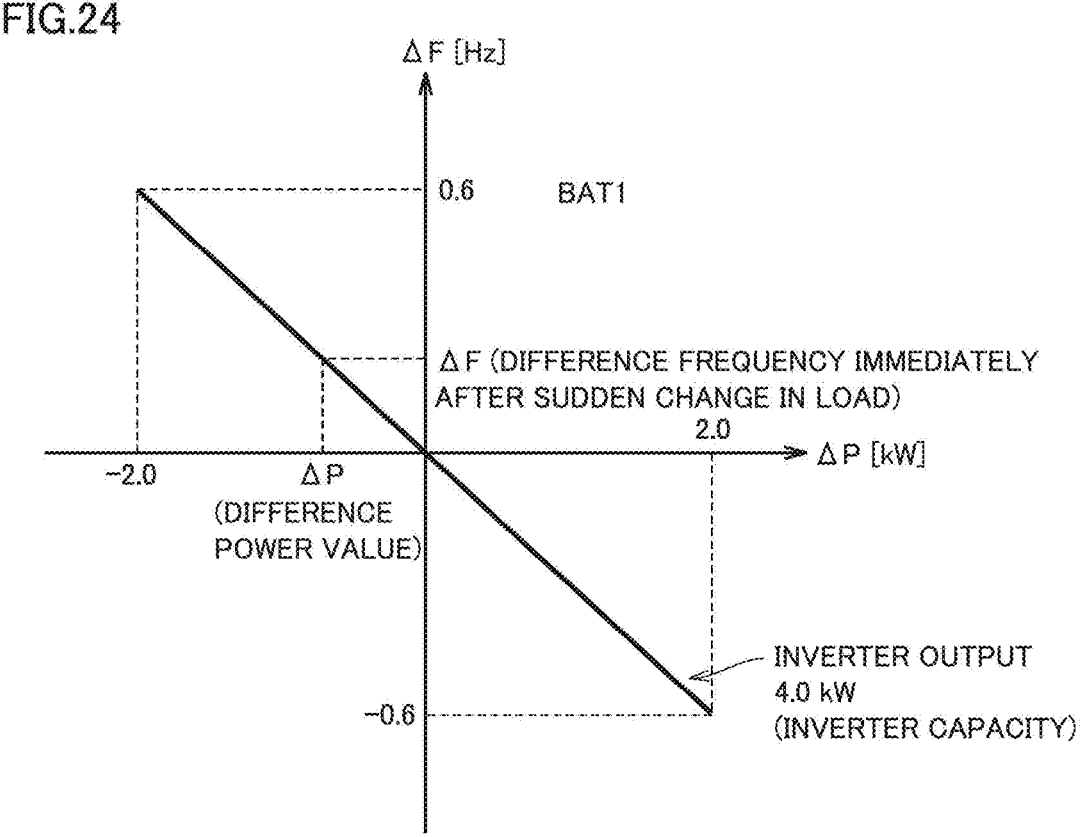
FIG. 24 is a diagram illustrating an example of a ΔP/ΔF characteristic of a first power conversion device having conventional virtual synchronous generator control implemented.
Figure 25:
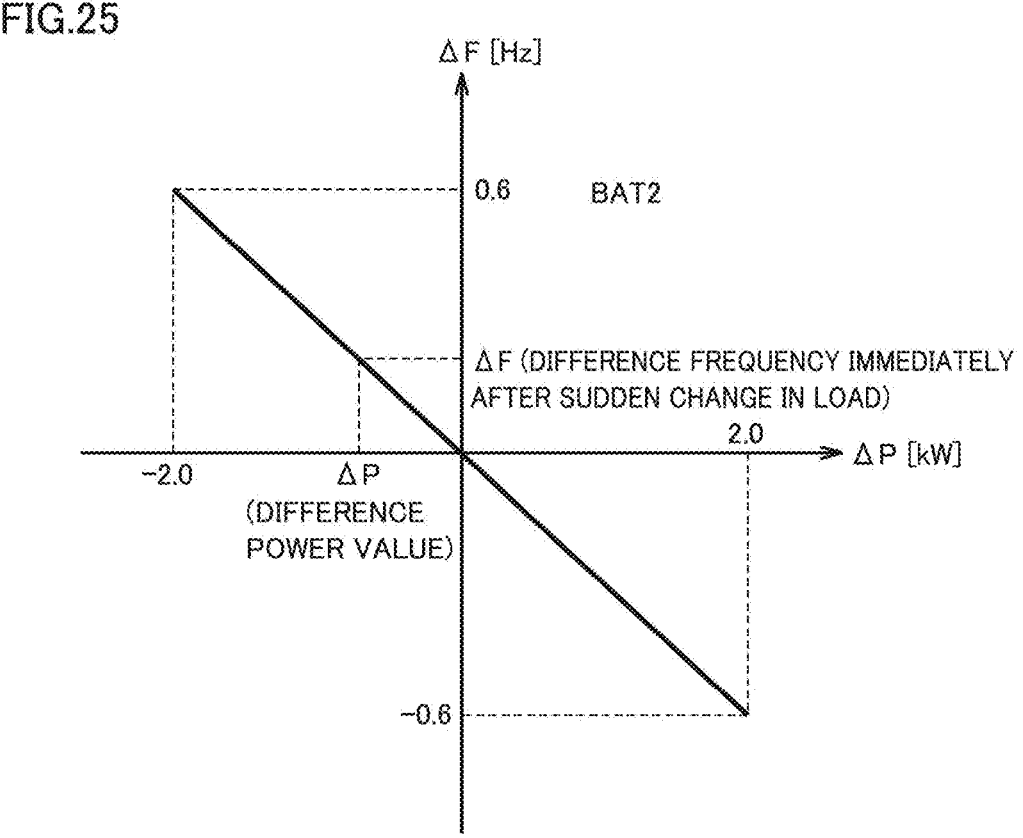
FIG. 25 is a diagram illustrating an example of a ΔP/ΔF characteristic of a second power conversion device having conventional virtual synchronous generator control implemented.

With reference to FIGS. 24 and 25, the reason why the power proportional division ratio changes when the load suddenly changes will be described below.

FIG. 24 is a diagram illustrating an example of the ΔP/ΔF characteristic of first power conversion device 41 having the conventional virtual synchronous generator control implemented. FIG. 25 is a diagram illustrating an example of the ΔP/ΔF characteristic of second power conversion device 41 having the conventional virtual synchronous generator control implemented.

Under the conventional virtual synchronous generator control, the ΔP/ΔF characteristic is not switched in accordance with the power target value and the capacity of the static inverter. In the examples of FIGS. 24 and 25, the static inverters of the two power conversion devices 41 have the same capacity (4 kW), so that it is assumed that the same ΔP/ΔF characteristic is imparted.

When the load suddenly changes as illustrated in FIG. 22, the virtual synchronous generator control implemented in each power conversion device 41 operates such that two power conversion devices 41 share excess and deficient power. At this time, as illustrated in FIG. 23, two power conversion devices 41 are controlled so as to make the frequencies of the AC voltages output from the static inverters equal to each other.

On the other hand, the difference power ΔP between the power output from each power conversion device 41 and the power target value is determined by the ΔP/ΔF characteristics illustrated in FIGS. 24 and 25. Therefore, when the ΔP/ΔF characteristics of two power conversion devices 41 are the same, the difference frequency ΔF is the same, so that the difference power ΔP also has the same value. As a result, as illustrated in FIG. 22, after the sudden change in load, power is output from two power conversion devices 41 at a proportional division ratio different from an expected power proportional division ratio.

(Virtual Synchronous Generator Control According to First Embodiment)

Figure 26:
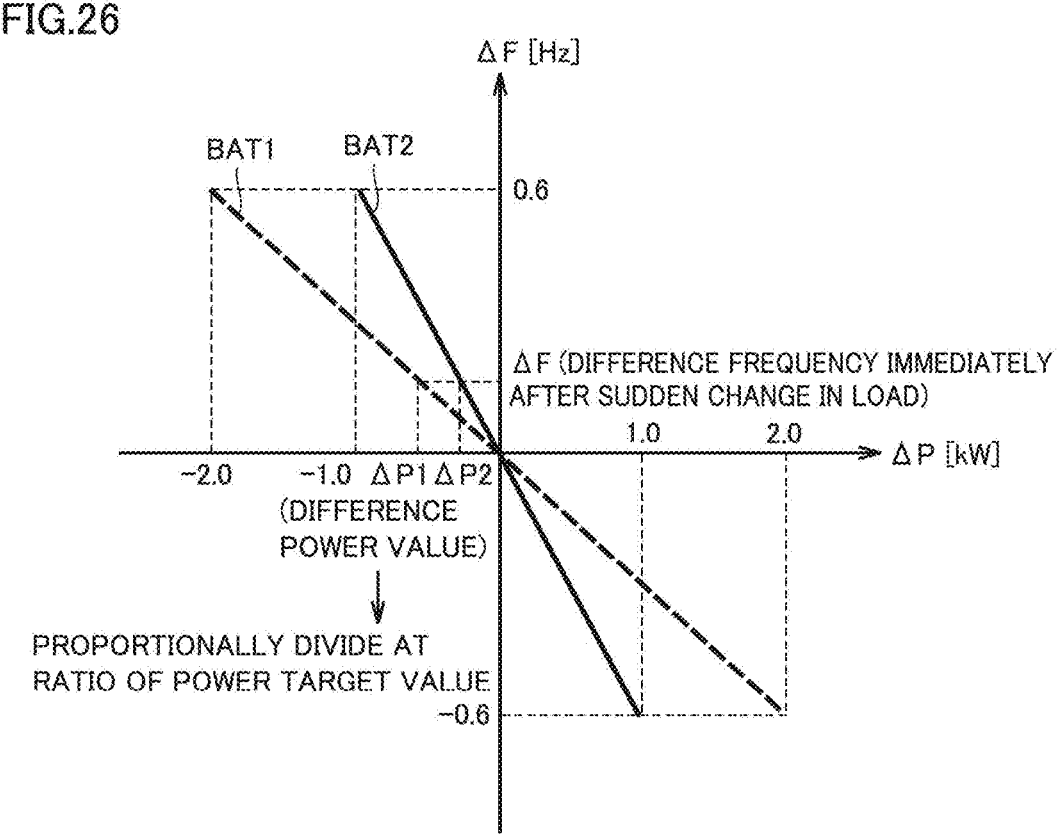
FIG. 26 is a diagram illustrating an example of a ΔP/ΔF characteristic of the second power conversion device having the virtual synchronous generator control according to the first embodiment implemented.

FIG. 26 is a diagram illustrating an example of the ΔP/ΔF characteristic of second power conversion device 41 having the virtual synchronous generator control according to the first embodiment implemented. The solid line in the drawing indicates the ΔP/ΔF characteristic of second power conversion device 41, and the dashed line indicates the ΔP/ΔF characteristic of first power conversion device 41 (FIG. 24).

As illustrated in FIG. 22, when the power target value (1.1 kW) of second power conversion device 41 is equal to half of the power target value (2.2 kW) of first power conversion device 41 (that is, the power proportional division ratio is 2:1), as illustrated in FIG. 26, the ΔP/ΔF characteristic of second power conversion device 41 is determined so as to make a ratio between the difference power ΔP (ΔP1 in the drawing) of first power conversion device 41 and the difference power ΔP (ΔP2 in the drawing) of second power conversion device 41 equal to the power target value (2:1) at the same difference frequency ΔF.

As illustrated in FIG. 26, it can be seen that, by determining the ΔP/ΔF characteristics of two power conversion devices 41, the ratio of the power shared between two power conversion devices 41 is equal to the ratio (2:1) of the power target value notified from CEMS 31 even when the load changes.

(Method for Creating ΔP/ΔF Characteristic)

Next, a method for creating the ΔP/ΔF characteristic of each power conversion device 41 in CEMS 31 will be described.

In the first embodiment, when creating the ΔP/ΔF characteristic of each power conversion device 41, CEMS 31 first creates the reference ΔP/ΔF characteristic for each power conversion device 41. In the following description, a method for creating the reference ΔP/ΔF characteristic focusing solely on the discharge of storage battery will be described.

An operation mode of storage battery 40 includes the discharge mode in which storage battery 40 is discharged, a charge mode in which storage battery 40 is charged, and a charge and discharge mode in which storage battery 40 is charged and discharged. When storage battery 40 is put into operation in the discharge mode or the charge mode, the reference ΔP/ΔF characteristic is created so as to make the difference power ΔP corresponding to ΔFmax that is the limit of the difference frequency ΔF equal to half of the capacity of the static inverter.

On the other hand, when storage battery 40 is put into operation in the charge and discharge mode (particularly, when the power target value is close to zero), the reference ΔP/ΔF characteristic is created so as to make the difference power ΔP corresponding to ΔFmax equal to the capacity of the static inverter.

Note that CEMS 31 needs to create the reference ΔP/ΔF characteristics of a plurality of managed power conversion devices 41 with the same policy. Therefore, CEMS 31 creates the reference ΔP/ΔF characteristic with the charge and discharge mode taken into account for first power conversion device 41, but does not create the reference ΔP/ΔF characteristic with the charge mode or the discharge mode taken into account for second power conversion device 41.

Figure 27:
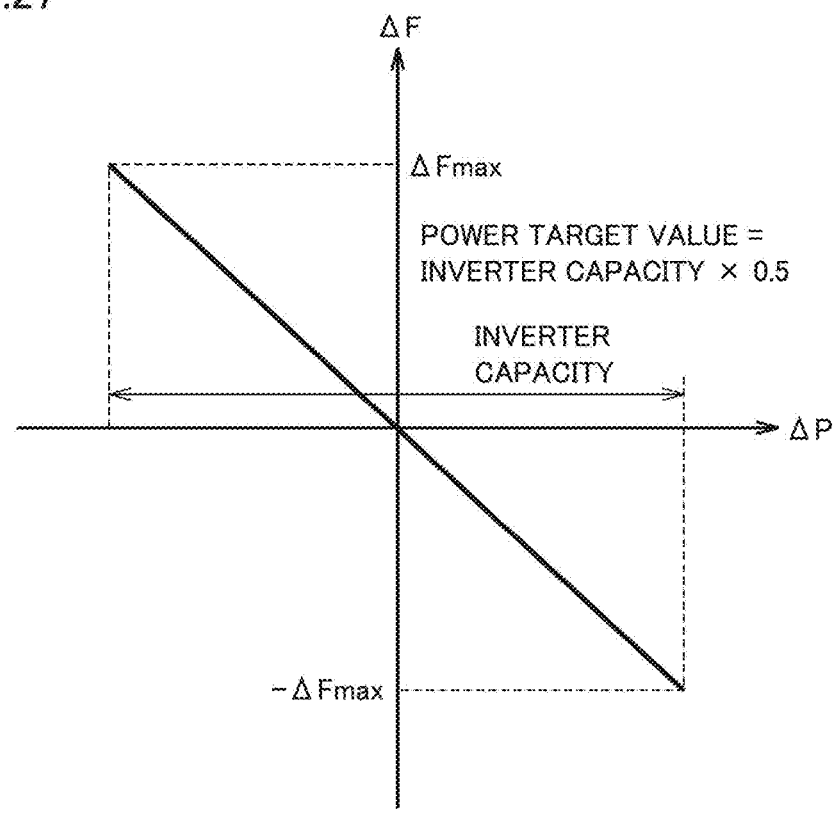
FIG. 27 is a diagram illustrating an example of a reference ΔP/ΔF characteristic of a power conversion device having the virtual synchronous generator control according to the first embodiment implemented.

FIG. 27 is a diagram illustrating an example of the reference ΔP/ΔF characteristic of power conversion device 41 having the virtual synchronous generator control according to the first embodiment implemented.

In the first embodiment, the reference ΔP/ΔF characteristic is created on the basis of information on the limit (Fref±ΔFmax) of the system frequency and information on the capacity of the static inverter notified from DSO 21.

Specifically, with only the discharge mode taken into account, the reference ΔP/ΔF characteristic is created such that, with the power target value Pref set equal to half of the capacity of the static inverter, the system frequency becomes equal to the lower limit (Fref−ΔFmax) when power conversion device 41 outputs power equal to the capacity of the static inverter, and the system frequency becomes equal to the upper limit (Fref+ΔFmax) when the output of the static inverter becomes zero.

Note that, with only the charge mode taken into account, when the reference ΔP/ΔF characteristic is created such that, with the charge power treated as a negative value, the system frequency becomes equal to the lower limit (Fref−ΔFmax) when the charge power becomes zero, and the system frequency becomes equal to the upper limit (Fref+ΔFmax) when the charge power becomes equal to the capacity of the static inverter, the same effect can be produced.

Further, with the charge and discharge mode taken into account, when the reference ΔP/ΔF characteristic is created such that, with the power target value Pref set to zero, the system frequency becomes equal to the lower limit (Fref−ΔFmax) when power equal to the capacity of the static inverter is discharged, and the system frequency becomes equal to the upper limit (Fref+ΔFmax) when power equal to the capacity of the static inverter is charged, the same effect can be produced.

Figure 28:
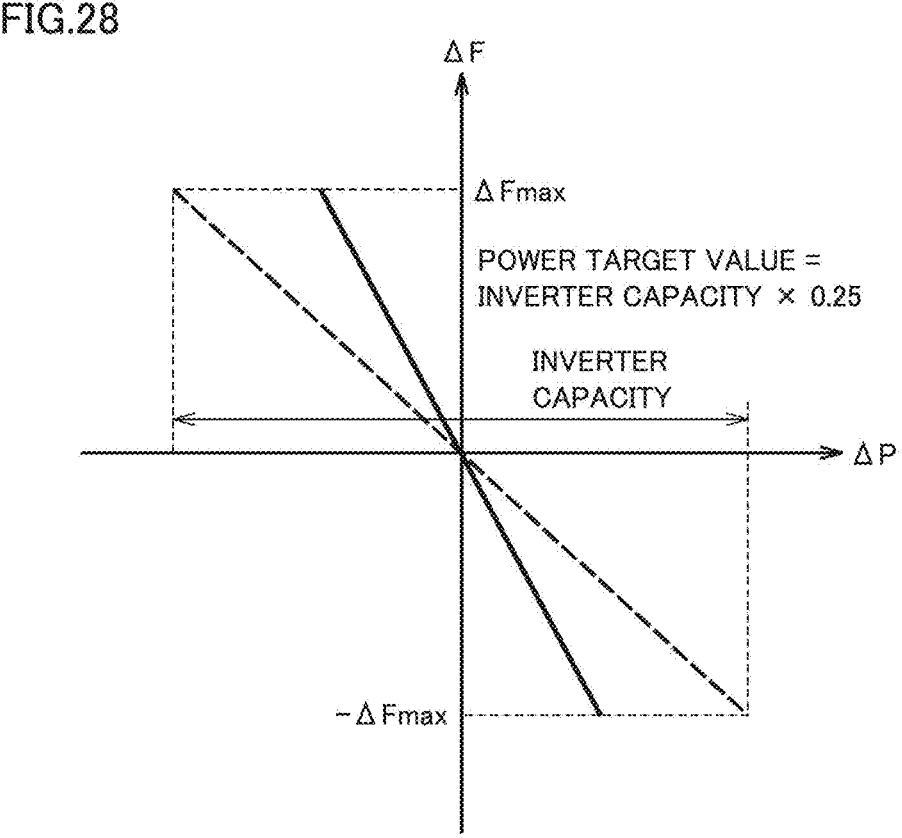
FIG. 28 is a diagram for describing an operation of creating a ΔP/ΔF characteristic of a power conversion device in a case where the power target value is different using the reference ΔP/ΔF characteristic of the power conversion device having the virtual synchronous generator control according to the first embodiment implemented.

Next, a method for creating the ΔP/ΔF characteristic of each power conversion device 41 using the reference ΔP/ΔF characteristic illustrated in FIG. 27 will be described with reference to FIG. 28.

In the following description, it is assumed that the static inverters of power conversion devices 41 have the same capacity. In FIG. 28, a method for creating the ΔP/ΔF characteristic using the reference ΔP/ΔF characteristic illustrated in FIG. 27 when the power target value is different from the power target value (half of the capacity of the static inverter) based on the reference ΔP/ΔF characteristic will be described. The dashed line in the drawing indicates the reference ΔP/ΔF characteristic (FIG. 27), and the solid line indicates the ΔP/ΔF characteristic.

When the static inverters have the same capacity, in the first embodiment, a slope of the ΔP/ΔF characteristic (solid line in the drawing) is obtained by multiplying a slope of the reference ΔP/ΔF characteristic (dashed line in the drawing) by a result obtained by dividing half (0.5 times) of the capacity of the static inverter by the power target value Pref of the power conversion device 41. For example, when the power target value Pref is 0.25 times the capacity of the static inverter, the slope of the ΔP/ΔF characteristic is obtained by multiplying the slope of the reference ΔP/ΔF characteristic by 0.5/0.25 (=2).

Next, a case where the static inverters of power conversion devices 41 have different capacities will be described. In this case, a method for creating the reference ΔP/ΔF characteristic of each power conversion device 41 is different from the above-described creation method.

When the capacity of the static inverter is different among the plurality of power conversion devices 41, a static inverter capacity as a reference is predetermined. For example, when where three static inverters have capacities of 10 kW, 8 kW, and 4 kW, 8 kW is used as a reference. It goes without saying that there is basically no problem even if any other capacity is selected as a reference. Then, a reference ΔP/ΔF characteristic of the static inverter having the reference capacity (8 kW) is created using the creation method described in FIG. 27.

Figure 29:
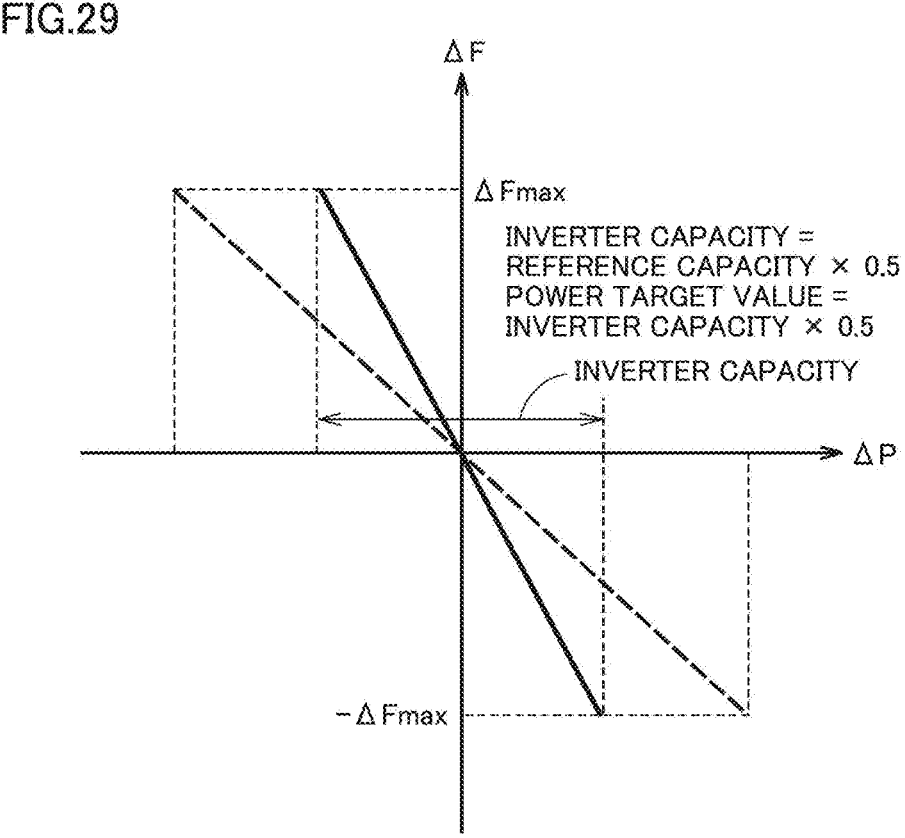
FIG. 29 is a diagram for describing an operation of creating a ΔP/ΔF characteristic of a power conversion device in a case where the capacity of the static inverter is different using the reference ΔP/ΔF characteristic of the power conversion device having the virtual synchronous generator control according to the first embodiment implemented.

Next, a reference ΔP/ΔF characteristic of the static inverter having a capacity of 4 kW is created using the reference ΔP/ΔF characteristic of the static inverter having the reference capacity (8 kW). FIG. 29 is a diagram for describing a method for creating the reference ΔP/ΔF characteristic of the static inverter having a capacity of 4 kW. The dashed line in the drawing indicates the reference ΔP/ΔF characteristic (FIG. 27) of the static inverter having the reference capacity, and the solid line indicates the reference ΔP/ΔF characteristic of the static inverter having a capacity of 4 kW.

As illustrated in FIG. 29, a slope of the reference ΔP/ΔF characteristic is obtained by multiplying a slope of the reference ΔP/ΔF characteristic for the reference capacity (8 kW) by a value obtained by dividing the reference capacity (8 kW this time) by the capacity (4 kW this time) of its own static inverter. Specifically, the slope of the reference ΔP/ΔF characteristic of the static inverter having a capacity of 4 kW is calculated by multiplying the slope of the reference ΔP/ΔF characteristic of the static inverter having a reference capacity (8 kW) by 8/4 (=2). Likewise, a slope of a straight line of a reference ΔP/ΔF characteristic of the static inverter having a capacity of 10 kW is calculated by multiplying the slope of the reference ΔP/ΔF characteristic of the static inverter having the reference capacity (8 kW) by 8/10 (=0.8).

Figure 30:
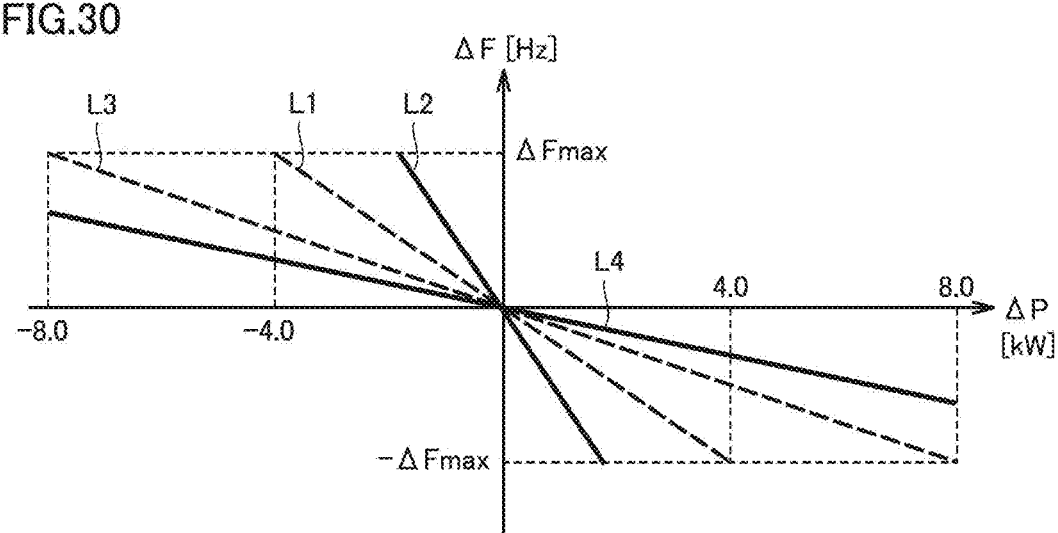
FIG. 30 is a diagram illustrating an example of ΔP/ΔF characteristics of two power conversion devices different in inverter capacity and power target value, the two power conversion devices having the virtual synchronous generator control according to the first embodiment implemented.

FIG. 30 is a diagram illustrating an example of reference ΔP/ΔF characteristics and ΔP/ΔF characteristics of two power conversion devices 41 that are different in capacity of the static inverter. In FIG. 30, a dashed line L1 indicates the reference ΔP/ΔF characteristic of the first power conversion device 41, and a solid line L2 indicates the ΔP/ΔF characteristic of the first power conversion device 41. A dashed line L3 indicates the reference ΔP/ΔF characteristic of the second power conversion device 41, and a solid line L4 indicates the ΔP/ΔF characteristic of the second power conversion device 41.

In the example of FIG. 30, for first power conversion device 41, the capacity of the static inverter is 8 kW, and the power target value is 6 kW. For second power conversion device 41, the capacity of the static inverter is 4 kW, and the power target value is 1 kW.

Figure 31:
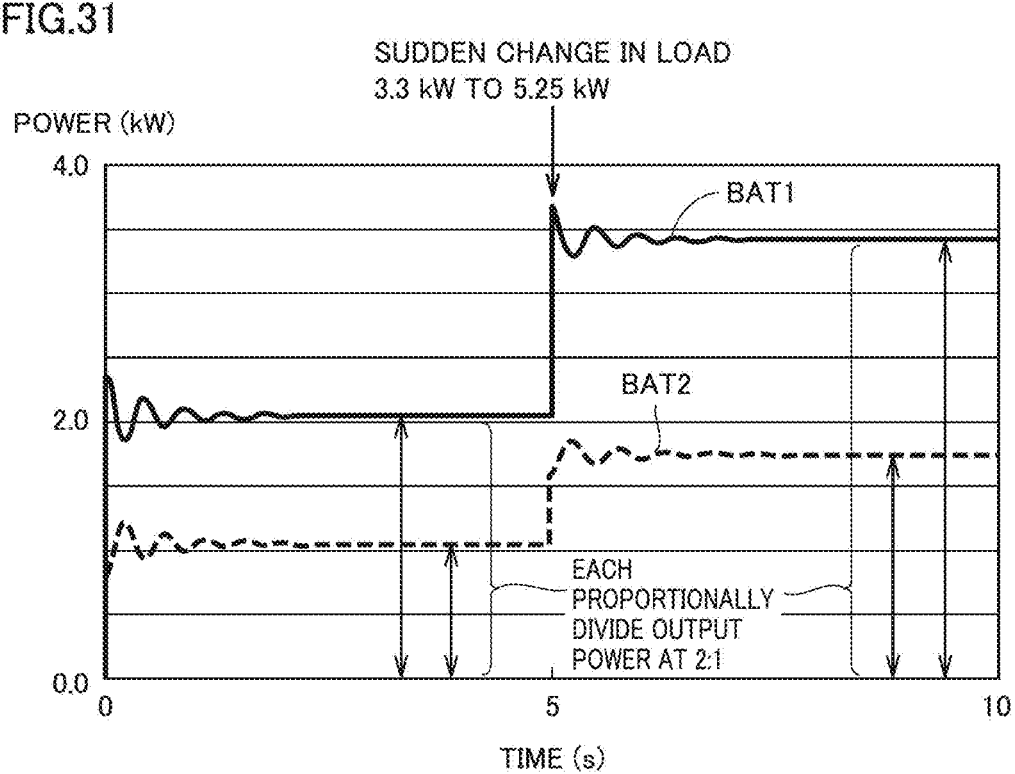
FIG. 31 is a diagram illustrating response waveforms of effective values of AC power output from two power conversion devices having the ΔP/ΔF characteristic illustrated in FIG. 30.

FIG. 31 is a diagram illustrating waveforms of effective values of AC power output from two power conversion devices 41 illustrated in FIG. 30. In the example of FIG. 31, for first power conversion device 41, the capacity of the static inverter is 8 kW, and the power target value is 2 kW. For second power conversion device 41, the capacity of the static inverter is 4 kW, and the power target value is 1 kW.

The waveforms in FIG. 31 are obtained by bringing first and second power conversion devices 41 into operation using the control parameters (Tg, Kgd, M, and Dg) generated by virtual synchronous generator control circuit 83 when the two power target values are 2 kW and 1 kW on the basis of the reference ΔP/ΔF characteristics (solid lines L1, L3 in the drawing) of two power conversion devices 41 illustrated in FIG. 30.

FIG. 31 illustrates a waveform of the effective value of the AC power output from each power conversion device 41 when the load suddenly changes from 3 kW to 5.25 kW. As illustrated in FIG. 31, the power proportional division ratio between first and second power conversion devices 41 is 2:1 both before and after the sudden change in load, showing that the operation is as expected.

As described above, when the plurality of power conversion devices 41 each including the static inverter having the virtual synchronous generator control implemented are connected to distribution system 24, the ΔP/ΔF characteristic is created for each power conversion device 41 on the basis of the capacity of the static inverter and the power target value. Then, the control parameters of virtual synchronous generator control circuit 83 (FIG. 11) are generated for each power conversion device 41 using the ΔP/ΔF characteristic.

With such a configuration, even when the power consumed by load 600 or the power generated by mega solar 26 suddenly changes, the ratio of the power output from each power conversion device 41 can be made equal to the ratio of the power target value notified from CEMS 31. Accordingly, for example, it is possible to prevent an increase in ratio of the discharge power of storage battery 40 in which the discharge power is set small due to a small SOC to the entire discharge power.

Note that, in the first embodiment, as the method for creating the ΔP/ΔF characteristic, a method by which the reference ΔP/ΔF characteristic of each power conversion device 41 is created, and the ΔP/ΔF characteristic is created, using the created reference ΔP/ΔF characteristic, in accordance with the power target value has been described, but the method for creating the ΔP/ΔF characteristic is not limited to the above. For example, the control parameters (Tg, Kgd, M, Dg) of virtual synchronous generator control circuit 83 may be directly generated on the basis of the capacity of the static inverter, the power target value, and the SOC information on storage battery 40.

(Operation of Distributed Power Supply Management Device)

With reference to FIGS. 1 to 41, how the distributed power supply management device according to the first embodiment operates will be described below in detail.

First, distribution system 24 to which the distributed power supply management device according to the first embodiment is applied will be described with reference to FIG. 1.

In the first embodiment, in distribution system 24, the plurality of SVRs 23 are connected in series between substation 20 and power conversion device 27 (alternatively, power conversion device 41*a* or town 100*a*) in order to regulate the system voltage supplied from substation 20 within a predetermined voltage range.

Power conversion device 27 operates as a current source. Power conversion device 27 is installed near power conversion device 41*a*. In the first embodiment, power conversion device 41*a* operates as a voltage source. Power conversion device 41*a* can also smooth the power generated by mega solar 26 by performing the virtual synchronous generator control.

As the load, towns 100*a* to 100*d*, factory 110, building 112, and condominium 113 exist. The load is supplied with the power supplied from substation 20, power generated by mega solar 26, and the discharge power of storage battery 40. Synchronous generator 30*a* serving as an emergency generator is installed in factory 110, and synchronous generator 30*b* serving as an emergency generator is installed in building 112.

How the distributed power supply management device operates in distribution system 24 that receives the power supplied from substation 20, the power generated by mega solar 26, and the discharge power of storage battery 40 will be described below.

Figure 32:
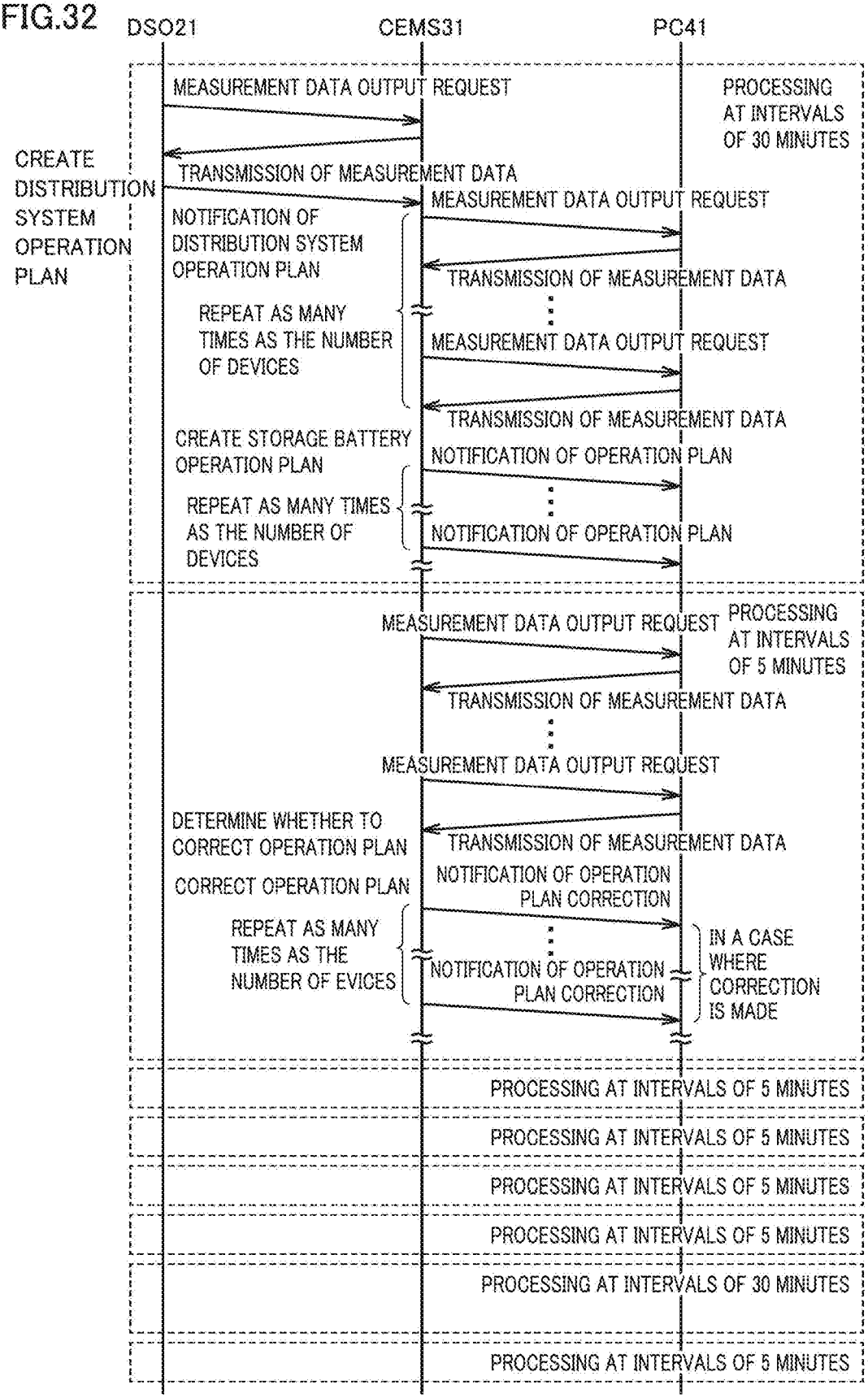
FIG. 32 is a sequence diagram of a normal operation of a distributed power supply management device, focusing on the CEMS illustrated in FIG. 1.

FIG. 32 is a sequence diagram for describing a normal operation of the distributed power supply management device, focusing on CEMS 31 illustrated in FIG. 1.

As illustrated in FIG. 32, processing in the steady state includes processing performed at intervals of 30 minutes (hereinafter, also referred to as "first processing") and processing performed at intervals of 5 minutes (hereinafter, also referred to as "second processing").

When the first processing (processing at intervals of 30 minutes) is started, DSO 21 requests CEMS 31 to output collected measurement data over communication line 25. Upon receipt of the request from DSO 21, CEMS 31 transmits, to DSO 21, the measurement data including the amount of power consumed by each consumer, the amount of power generated by mega solar 26, the amount of charge and discharge power of storage battery 40, and the SOC of storage battery 40 collected in the last 30 minutes.

Upon receipt of the measurement data, DSO 21 creates an operation plan of distribution system 24 on the basis of the measurement data and notifies CEMS 31 of the created operation plan. The operation plan of distribution system 24 includes a power supply plan from substation 20 to distribution system 24, and is necessary for creating an operation plan (charge and discharge plan) of storage battery 40. DSO 21 creates a 30-minute power supply plan for 24 hours. The 30-minute power supply plan indicates the total amount of power supplied from substation 20 to distribution system 24 for 30 minutes.

Upon receipt of the operation plan (power supply plan) from DSO 21, CEMS 31 requests power conversion device 41 to transmit measurement data. The measurement data includes the amount of charge and discharge power of storage battery 40 and the SOC information of storage battery 40 for the last 5 minutes. Upon receipt of the request from CEMS 31, power conversion device 41 notifies CEMS 31 of the measurement data.

CEMS 31 receives the measurement data from all power conversion devices 41*a* to 41*c* connected to distribution system 24. At this time, CEMS 31 also collects measurement data such as the amount of power consumed by each consumer and the amount of power generated by mega solar 26 for 30 minutes.

When the collection of the measurement data is completed, CEMS 31 creates the operation plan and control parameter of storage battery 40. The operation plan of storage battery 40 is the charge and discharge plan of storage battery 40, and includes a target value (power target value) of the amount of charge and discharge power of storage battery 40. A method for creating the operation plan and control parameter of storage battery 40 will be described later.

When the creation of the operation plan and control parameter of storage battery is completed, CEMS 31 notifies each power conversion device 41 of the operation plan and control parameter of a corresponding storage battery 40, and brings the first processing to an end.

Subsequently, CEMS 31 performs the second processing (processing at intervals of 5 minutes). CEMS 31 collects the measurement data from each power conversion device 41 at intervals of 5 minutes. CEMS 31 detects a deviation between the power target value and the actual charge and discharge power on the basis of the collected measurement data. When the deviation is greater than or equal to a predetermined threshold, CEMS 31 recalculates the operation plan (power target value) of storage battery 40 and notifies each power conversion device 41 of the recalculation result. Note that a specific recalculation method will be described later.

(Operation of CEMS 31)

Next, the operation of CEMS 31 will be described in detail with reference to FIG. 33.

Figure 33:
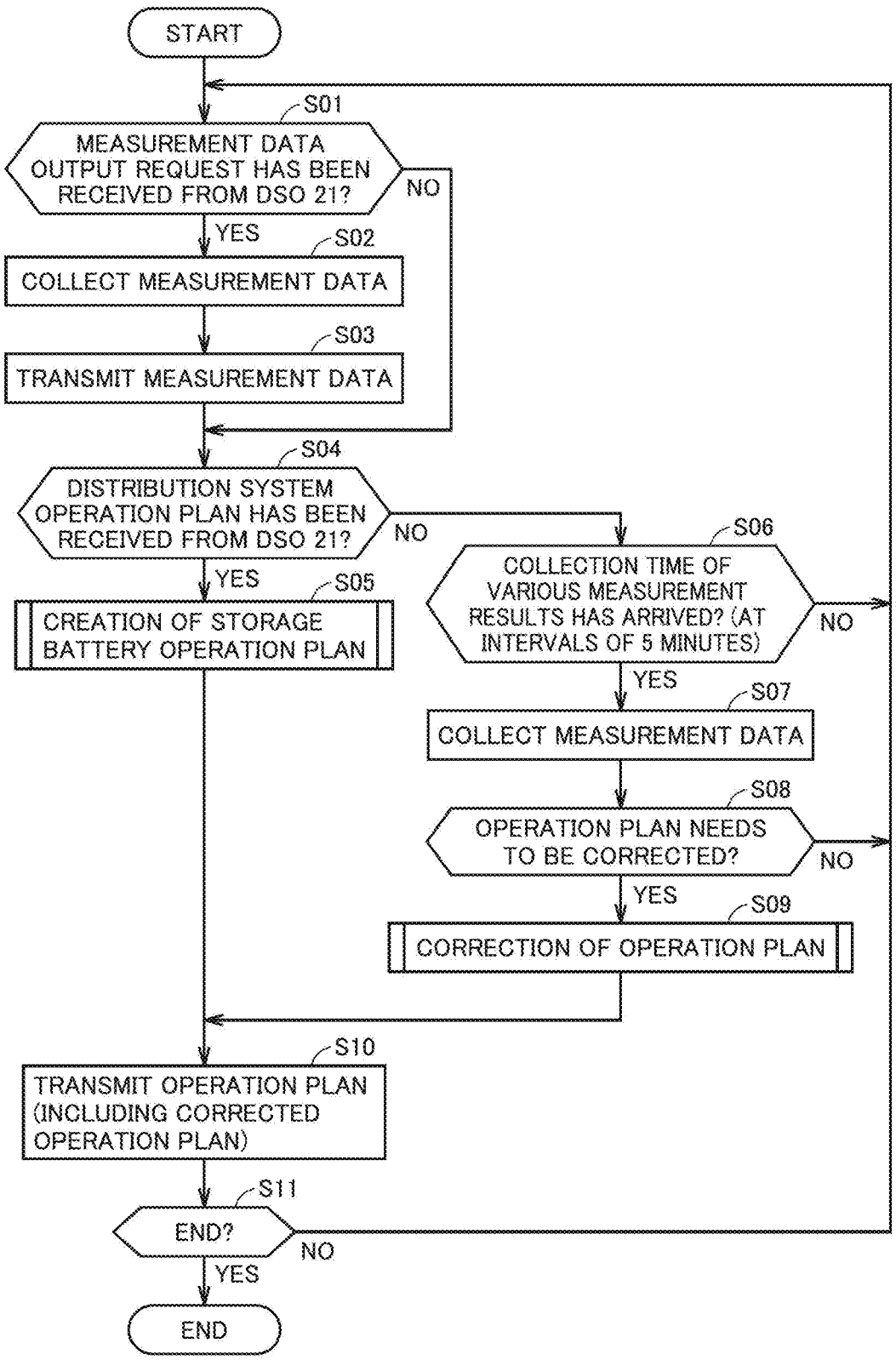
FIG. 33 is a flowchart for describing control processing of the CEMS illustrated in FIG. 1.

FIG. 33 is a flowchart of control processing of CEMS 31 illustrated in FIG. 1. As illustrated in FIG. 33, when the processing is started, CEMS 31 checks whether the output request of the measurement data has been received from DSO 21 in step (hereinafter, abbreviated as S) 01. When the output request has been received (YES in S01), CEMS 31 collects the measurement data from the plurality of power conversion devices 41 in S02. In S03, CEMS 31 notifies DSO 21 of the measurement data stored in storage circuit 12 via communication circuit 11.

On the other hand, when the output request has not been received from DSO 21 (NO in S01) or the measurement data has been transmitted to DSO 21 in S03, CEMS 31 proceeds to S04 and checks whether the operation plan (power supply plan) has been received from DSO 21. When the operation plan has been received (YES in S04), CEMS 31 proceeds to S05 and creates the operation plan (charge and discharge plan) of storage battery 40.

Figure 34:
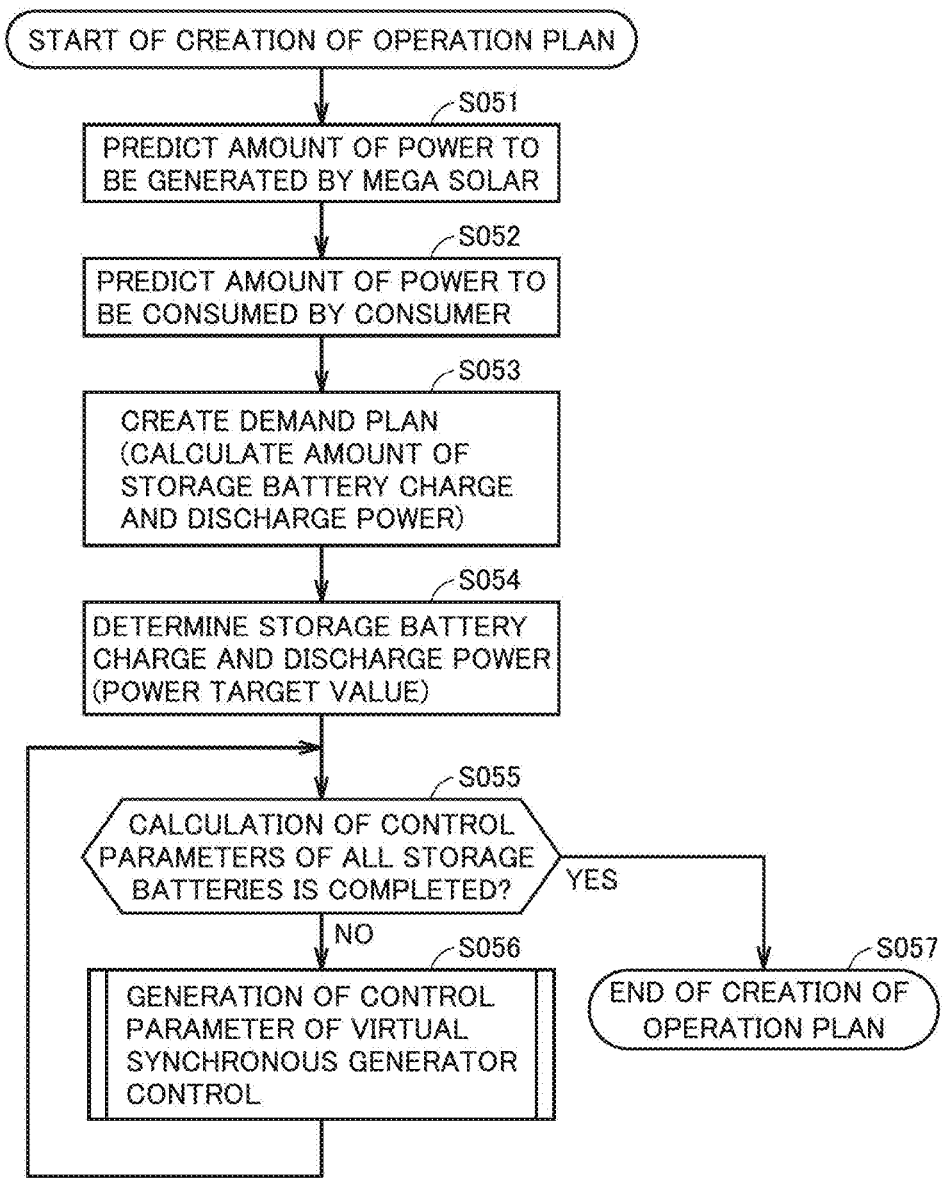
FIG. 34 is a flowchart for describing details of operation plan creation processing (S05 of FIG. 33).

FIG. 34 is a flowchart of processing of creating the operation plan of storage battery 40 (S05 of FIG. 33).

As illustrated in FIG. 34, when the processing is started, CEMS 31 predicts the amount of power generated by mega solar 26 in S051. Specifically, referring back to FIGS. 3 and 4, upon receipt of the operation plan from DSO 21, control circuit 16 (FIG. 3) instructs management circuit 146 (FIG. 4) in operation plan creation circuit 14 to create the operation plan. Upon receipt of the instruction from control circuit 16, management circuit 146 instructs power generation prediction circuit 142 to predict power to be generated by mega solar 26 via storage battery operation plan creation circuit 141.

Upon receipt of the instruction from management circuit 146, power generation prediction circuit 142 accesses a weather forecast server (not illustrated) provided on the Internet to acquire a 24-hour weather forecast from the present to 24 hours later. Power generation prediction circuit 142 predicts the amount of power to be generated for 24 hours from the present to 24 hours later using the acquired 24-hour weather forecast and data stored in a database (not illustrated) used for predicting the amount of power to be generated, the database being managed by power generation prediction circuit 142. Note that the database used for predicting the amount of power to be generated is constructed on the basis of a record of the amount of power generated by mega solar 26 collected at intervals of 30 minutes and information on recorded weather. No description will be given below of a method for constructing the database.

When the amount of power to be generated is predicted in S051, CEMS 31 predicts the amount of power to be consumed by each consumer in S052. Specifically, referring back to FIG. 4, upon receipt of the result of predicting the amount of power to be generated by mega solar 26 from power generation prediction circuit 142, management circuit 146 instructs power consumption prediction circuit 143 to predict the amount of power to be consumed by each consumer via storage battery operation plan creation circuit 141.

Upon receipt of the instruction from management circuit 146, power consumption prediction circuit 143 predicts the amount of power to be consumed by each consumer for 24 hours from the present to 24 hours later using data stored in a database (not illustrated) used for predicting the amount of power to be consumed, the database being managed by the power consumption prediction circuit 143. Note that the database used for predicting the amount of power to be consumed is constructed by processing the amount of power consumed by each consumer collected at intervals of 30 minutes on the basis of the date, the time information, and the weather information. No description will be given below of a method for constructing the database.

When the amount of power to be consumed by each consumer is predicted in S052, CEMS 31 creates a demand plan in S053. Specifically, referring back to FIG. 4, upon receipt of the result of predicting the amount of power to be consumed by each consumer from power consumption prediction circuit 143, storage battery operation plan creation circuit 141 calculates the sum of the amount of charge and discharge power of storage batteries 40a to 40c every 30 minutes on the basis of the result of predicting, by power generation prediction circuit 142, the amount of power to be generated by mega solar 26, the result of predicting, by power consumption prediction circuit 143, the amount of power to be consumed by each consumer, and the operation plan (30-minute power supply plan) notified from DSO 21.

When the demand plan has been created in S053, CEMS 31 determines the charge and discharge power (power target value) of storage batteries 40a to 40c in S054. Specifically, referring back to FIGS. 3 and 4, storage battery operation plan creation circuit 141 proportionally divides the charge and discharge power of each storage battery 40 every 30 minutes on the basis of the SOC information and storage battery capacities of storage batteries 40a to 40c collected in storage circuit 12 via communication circuit 11.

In the first embodiment, when creating the 24-hour operation plan of storage battery 40, CEMS 31 determines the charge and discharge power of each storage battery 40 so as to make the SOC of each of storage batteries 40a to 40c become zero at the same time, or to cause storage batteries 40a to 40c to be fully charged in 24 hours.

This is because of the following reason. For example, it is assumed that clouds cross over mega solar 26 for about 5 minutes, and the amount of power generated by mega solar 26 decreases from 10 MW to 4 MW. Note that it is assumed that the capacities of the static inverters of power conversion devices 41a to 41c are 8 MW, 4 MW, and 2 MW, respectively.

Here, it is assumed that power conversion devices 41b, 41c are notified of a storage battery operation plan in which the SOC of storage battery 40a becomes zero first, and storage battery 40a is stopped discharging power, so as to cause the remaining storage batteries 40b, 40c to discharge 1 MW and 0.5 MW, respectively. When the amount of power generated by mega solar 26 decreases by 6 MW due to a sudden change in solar radiation amount, storage batteries 40b, 40c can further discharge only 3 MW and 1.5 MW, respectively, under the virtual synchronous generator control, so that the shortage of 6 MW cannot be covered.

On the other hand, when storage batteries 40a to 40c are in operation, it is possible to discharge up to 14 MW (=8 MW+4 MW+2 MW), so that the power range that can be covered by the virtual synchronous generator control becomes wider. Therefore, when CEMS 31 creates the operation plan (charge and discharge plan) of storage battery 40, it is necessary to create the operation plan so as to make the SOC of each of storage batteries 40a to 40c become zero at almost the same time or to cause storage batteries 40a to 40c to be fully charged.

When the charge and discharge power (power target value) of storage batteries 40a to 40c has been determined in S054, CEMS 31 checks whether the control parameter of the virtual synchronous generator control has been generated for all storage batteries 40a to 40c in S055. When the generation of the control parameter for all storage batteries 40a to 40c is not completed (NO in S055), CEMS 31 proceeds to S056 and generates the control parameter of the virtual generator control.

Figure 35:
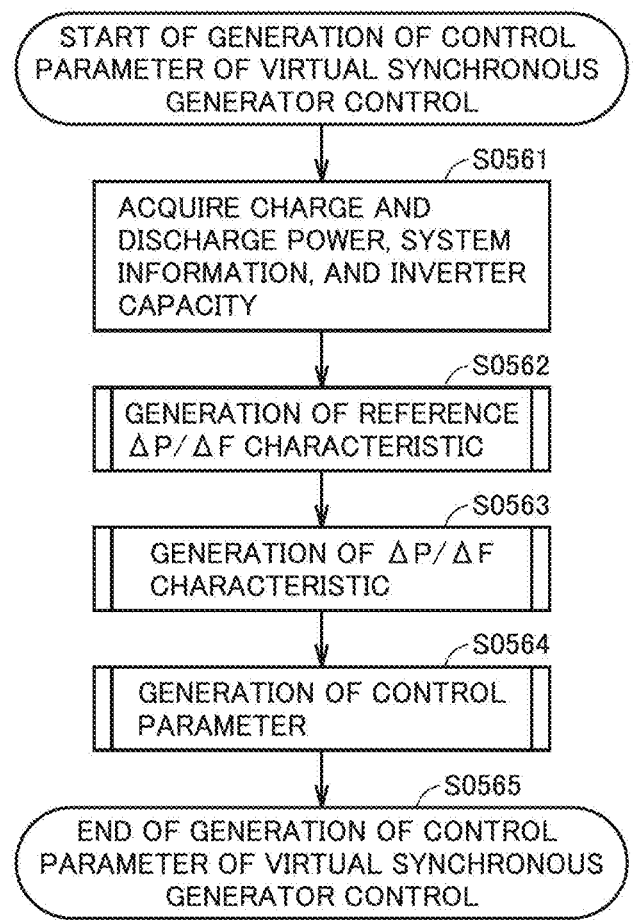
FIG. 35 is a flowchart for describing details of control parameter generation processing (S056 of FIG. 34) of a virtual synchronous generator.

FIG. 35 is a flowchart of processing of generating the control parameter of the virtual synchronous generator control (S056 of FIG. 34). The processing illustrated in FIG. 35 is performed by control parameter generation circuit 13 (FIG. 5) in CEMS 31.

As illustrated in FIG. 35, when the processing is started, control circuit 136 (FIG. 5) collects, in S0561, the power target value of storage battery 40 for the next 30 minutes, the capacity of second DC/AC converter 408 (static inverter) in power conversion device 41, and the information on distribution system 24 generated by storage battery operation plan creation circuit 141 in S054 of FIG. 34. Note that the information on distribution system 24 includes the upper and lower limits of the system frequency, the response performance of virtual synchronous generator control circuit 83 (FIG. 11), and the like. The upper limit of the system frequency is the reference frequency Fref (for example, 60 Hz)+ΔFmax, and the lower limit of the system frequency is Fref−ΔFmax.

When the information collection is completed in S0561, reference ΔP/ΔF characteristic calculation circuit 131 calculates the reference ΔP/ΔF characteristic for each power conversion device 41 in S0562. The reference ΔP/ΔF characteristic will be described below.

In order to generate the control parameter of power conversion device 41 having the virtual synchronous generator control implemented, first, the reference ΔP/ΔF characteristic of the static inverter is calculated. Note that, in the first embodiment, a configuration where the control parameter is generated for the power conversion device 41 will be described, but it is possible to generate, using the same method, a control parameter with a configuration where the virtual synchronous generator control is implemented in a power conversion device capable of regulating the output such as a wind power generation device.

Specifically, as illustrated in FIG. 27, in the discharge mode of storage battery 40, reference ΔP/ΔF characteristic calculation circuit 131 determines the reference ΔP/ΔF characteristic such that, with half of the capacity of the static inverter set as the power target value, the frequency of the AC voltage when the static inverter discharges the maximum power becomes equal to the lower limit frequency (difference frequency ΔF=−ΔFmax in FIG. 27), and the frequency of the AC voltage when the discharge power of the static inverter is zero becomes equal to the upper limit frequency (ΔF=ΔFmax in FIG. 27).

On the other hand, in the charge mode of storage battery 40, the reference ΔP/ΔF characteristic is determined such that, with half of the capacity of the static inverter set as the power target value, the frequency of the AC voltage when the static inverter gives a charge of the maximum power becomes equal to the upper limit frequency (ΔF=ΔFmax), and the frequency of the AC voltage when the charge power of static inverter is zero becomes equal to the lower limit frequency (ΔF=−ΔFmax).

Further, in the charge and discharge mode of storage battery 40, the reference ΔP/ΔF characteristic is determined such that, with the power target value of the static inverter set to zero, the frequency of the AC voltage when the static inverter discharges the maximum power becomes equal to the lower limit frequency (ΔF=−ΔFmax), and the frequency of the AC voltage when the static inverter gives a charge of the maximum power becomes equal to the upper limit frequency (ΔF=ΔFmax).

Figure 36:
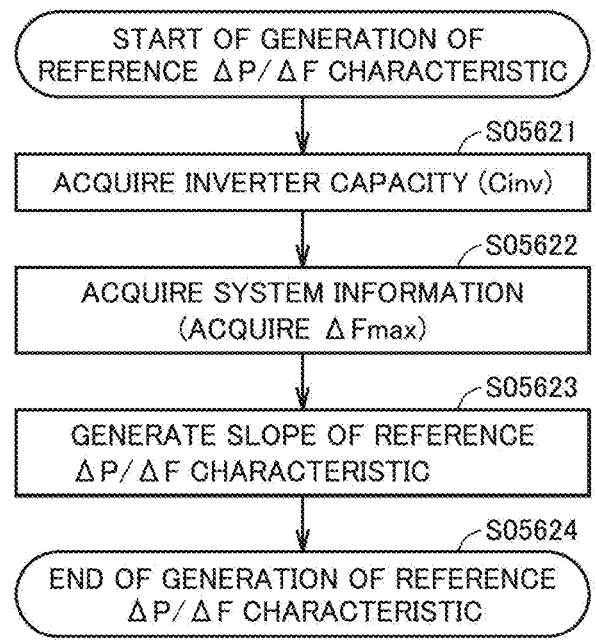
FIG. 36 is a flowchart for describing details of reference ΔP/ΔF characteristic generation processing (S0562 of FIG. 35).

FIG. 36 is a flowchart of processing of generating the reference ΔP/ΔF characteristic (S0562 of FIG. 35).

As illustrated in FIG. 36, when the processing is started, reference ΔP/ΔF characteristic calculation circuit 131 (FIG. 5) collects information on the capacity (Cinv) of a target static inverter from control circuit 136 in S05621.

When the information on the capacity of the static inverter has been collected, reference ΔP/ΔF characteristic calculation circuit 131 collects system information (ΔFmax) in S05622. Next, reference ΔP/ΔF characteristic calculation circuit 131 obtains the slope of the reference ΔP/ΔF characteristic using the inverter capacity Cinv and ΔFmax in S05623.

Specifically, when storage battery 40 is in the charge mode or the discharge mode, reference ΔP/ΔF characteristic calculation circuit 131 sets the slope of the reference ΔP/ΔF characteristic to −ΔFmax/(Cinv×0.5). On the other hand, when storage battery 40 is in the charge and discharge mode, the slope of the reference ΔP/ΔF characteristic is set to −ΔFmax/Cinv.

Note that storage battery operation plan creation circuit 141 (FIG. 4) determines which reference ΔP/ΔF characteristic in the discharge mode (or the charge mode) or the charge and discharge mode is selected on the basis of the result of the determination of the charge and discharge power of storage battery 40 in the demand plan created in S053 of FIG. 34. Specifically, when the absolute value of the determined charge and discharge power is less than a predetermined value, storage battery operation plan creation circuit 141 selects the charge and discharge mode. Note that the mode thus selected is applied to all power conversion devices 41 connected to distribution system 24.

Referring back to FIG. 35, when the reference ΔP/ΔF characteristic has been calculated in S0562, ΔP/ΔF characteristic calculation circuit 132 (FIG. 5) generates the ΔP/ΔF characteristic in S0563. Specifically, referring back to FIG. 5, reference ΔP/ΔF characteristic calculation circuit 131 outputs the slope of the generated reference ΔP/ΔF characteristic to control circuit 136 and ΔP/ΔF characteristic calculation circuit 132.

Figure 37:
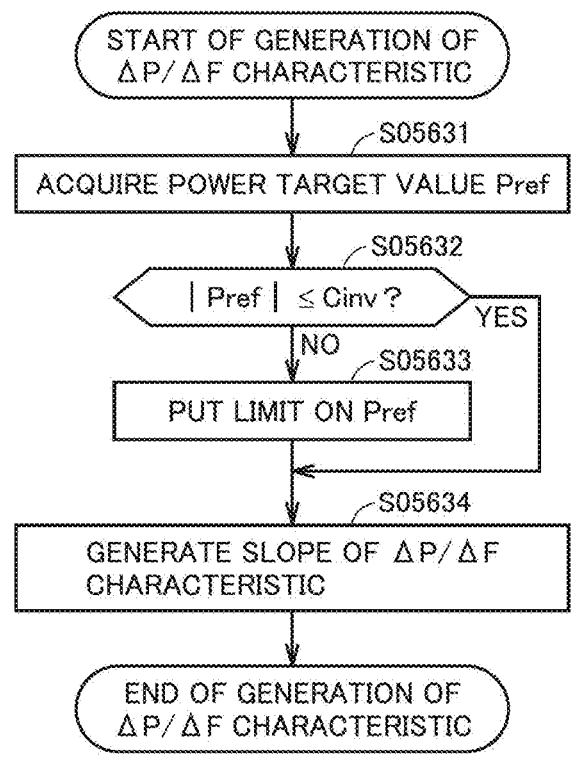
FIG. 37 is a flowchart for describing details of ΔP/ΔF characteristic generation processing (S0563 of FIG. 35).

ΔP/ΔF characteristic calculation circuit 132 calculates the ΔP/ΔF characteristic on the basis of the power target value provided from control circuit 136. FIG. 37 is a flowchart of processing of generating the ΔP/ΔF characteristic (S0563 of FIG. 35). As illustrated in FIG. 37, when the processing is started, ΔP/ΔF characteristic calculation circuit 132 collects the power target value from control circuit 136 in S05631. ΔP/ΔF characteristic calculation circuit 132 determines whether the magnitude of the collected power target value exceeds the static inverter capacity Cinv in S05632.

When the magnitude of the power target value exceeds the static inverter capacity Cinv (NO in S05632), ΔP/ΔF characteristic calculation circuit 132 limits the power target value to the static inverter capacity Cinv using the limiter in S05633.

ΔP/ΔF characteristic calculation circuit 132 obtains the slope of the ΔP/ΔF characteristic using the power target value in S05634. Specifically, when storage battery 40 is in the discharge mode or the charge mode, the slope of the ΔP/ΔF characteristic is set to the slope of the reference ΔP/ΔF characteristic×(Cinv×0.5)/the power target value. On the other hand, when storage battery 40 is in the charge and discharge mode, it is assumed that variations in power generated by renewable energy such as mega solar 26 or wind power generation are absorbed (power target value is zero), and the ΔP/ΔF characteristic depending only on the static inverter capacity, that is, the reference ΔP/ΔF characteristic obtained in S0562 of FIG. 35 is used as it is.

Figure 38:
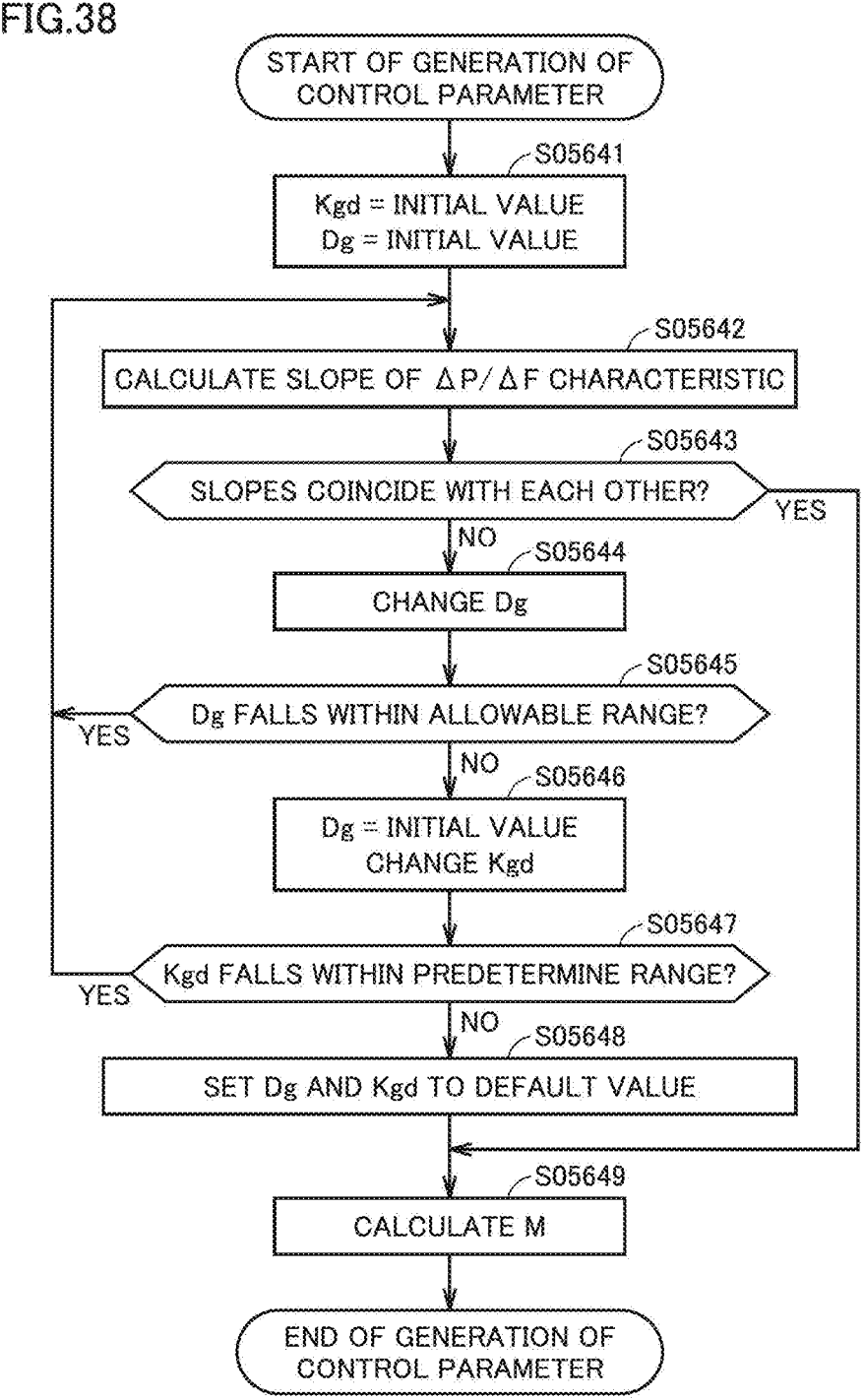
FIG. 38 is a flowchart for describing details of control parameter generation processing (S0564 of FIG. 35).

Referring back to FIG. 35, when the ΔP/ΔF characteristic has been generated in S0563, control circuit 136 generates the control parameter of the virtual synchronous generator control in S0564. With reference to FIGS. 5 and 38, a method for generating the control parameter will be described.

As illustrated in FIG. 5, control circuit 136 instructs control parameter generation circuit 133 to generate the control parameter.

Upon receipt of the instruction for generating the control parameter, control parameter generation circuit 133 generates the control parameter on the basis of the slope of the ΔP/ΔF characteristic provided from ΔP/ΔF characteristic calculation circuit 132, the system information (reference frequency Fref, ΔFmax) input from control circuit 136, the power target value Pref, and the inverter capacity Cinv. In the first embodiment, a case where virtual synchronous generator model 134 that mimics the operation of virtual synchronous generator control circuit 83 (FIG. 11) is implemented in control parameter generation circuit 13 (FIG. 3), and the control parameter is generated using this model will be described.

Note that the method for generating the control parameter is not limited to the above, and, for example, a configuration may be employed where, with the relationship between the speed adjustment rate Kgd and the system frequency illustrated in FIG. 18 stored as table data associated with each damping factor Dg and the relationship between the damping factor Dg and the system frequency illustrated in FIG. 19 stored as table data associated with each speed adjustment rate Kgd, an appropriate speed adjustment rate Kgd and an appropriate damping factor Dg are determined using such table data.

In the first embodiment, a mathematical model of the block diagrams illustrated in FIGS. 14 to 16 is used as virtual synchronous generator model 134, but the virtual synchronous generator model 134 is not limited to such a mathematical model. For example, a configuration may be employed where a transfer function of virtual synchronous generator control circuit 83 (FIG. 11) is generated from the transfer function of the governor control unit represented by the above-described expression (1) and the swing equation represented by the above-described expression (2), and the control parameter is generated from the generated transfer function.

FIG. 38 is a flowchart of processing of generating the control parameter (S0564 of FIG. 35). As illustrated in FIG. 38, when the generation of the control parameter is started, virtual synchronous generator model 134 (FIG. 5) initializes the speed adjustment rate Kgd and the damping factor Dg by setting the speed adjustment rate Kgd and the damping factor Dg to their respective predetermined initial values in S05641. In the first embodiment, only the speed adjustment rate Kgd and the damping factor Dg that determine the ΔP/ΔF characteristic are generated by virtual synchronous generator model 134.

When the speed adjustment rate Kgd and the damping factor Dg are initialized in S05641, virtual synchronous generator model 134 proceeds to S05642, and calculates the slope of the ΔP/ΔF characteristic using the speed adjustment rate Kgd and the damping factor Dg.

In S05643, virtual synchronous generator model 134 compares the slope of the ΔP/ΔF characteristic calculated in S05642 with the slope of the ΔP/ΔF characteristic generated in S0563 (FIG. 37) in FIG. 35. Specifically, virtual synchronous generator model 134 checks whether a deviation between the slopes of the two ΔP/ΔF characteristics falls within a predetermined allowable range.

When the deviation between the slopes falls within the allowable range, virtual synchronous generator model 134 determines that the slopes of the two ΔP/ΔF characteristics coincide with each other (YES in S05643), and proceeds to S05649.

On the other hand, in a case where the deviation between the slopes falls outside the allowable range, virtual synchronous generator model 134 determines that the slopes of the two ΔP/ΔF characteristics do not coincide with each other (NO in S05643). In this case, virtual synchronous generator model 134 proceeds to S05644 and changes the damping factor Dg. In the first embodiment, virtual synchronous generator model 134 adds a predetermined value to the current damping factor Dg.

After changing the damping factor Dg in S05644, virtual synchronous generator model 134 checks whether the damping factor Dg falls within a predetermined range in S05645. When damping factor Dg falls within the predetermined range (YES in S05645), virtual synchronous generator model 134 returns to S05642 and calculates the slope of the ΔP/ΔF characteristic using the changed damping factor Dg.

On the other hand, when the damping factor Dg falls outside the predetermined range (NO in S05645), virtual synchronous generator model 134 determines that an appropriate characteristic cannot be obtained with the current speed adjustment rate Kgd, and returns the damping factor Dg to the initial value and changes the speed adjustment rate Kgd in S05646. Specifically, virtual synchronous generator model 134 adds a predetermined value to the current speed adjustment rate Kgd (initial value).

After changing the speed adjustment rate Kgd in S05646, virtual synchronous generator model 134 checks whether the speed adjustment rate Kgd falls within a predetermined range in S05647. When speed adjustment rate Kgd falls outside the predetermined range (NO in S05647), virtual synchronous generator model 134 proceeds to S05648, sets the speed adjustment rate Kgd and the damping factor Dg to their respective default values prepared in advance on the assumption that an appropriate speed adjustment rate Kgd and an appropriate damping factor Dg have not been obtained, and then proceeds to S05649.

On the other hand, when the speed adjustment rate Kgd falls within the predetermined range in S05647 (YES in S05647), virtual synchronous generator model 134 returns to S05642, and calculates the slope of the ΔP/ΔF characteristic using the changed speed adjustment rate Kgd and the damping factor Dg. Virtual synchronous generator model 134 repeatedly performs the processing of S05642 to S05647 until S05654 is determined to be YES in or S05647 is determined to be NO.

When the speed adjustment rate Kgd and the damping factor Dg have been set, control parameter generation circuit 133 calculates the inertia constant M in S05649. In the first embodiment, the inertia constant M is calculated on the basis of a response time required for the virtual synchronous generator control. Specifically, the response performance of the virtual synchronous generator control is determined by the governor time constant Tg of governor control circuit 833 (FIG. 14) and the time constant M/Dg of point mass system operation circuit 837 (FIG. 14) obtained by the swing equation. In the first embodiment, the default value of the governor time constant Tg is used, and the governor time constant Tg is not generated, so that only the time constant of point mass system operation circuit 837 is controlled. The time constant of point mass system operation circuit 837 is obtained by M/Dg from the above-described expression (3). Therefore, in the first embodiment, the inertia constant M is calculated by multiplying the time constant of point mass system operation circuit 837 determined by the default value by the damping factor Dg.

Referring back to FIG. 34, when the control parameter of the virtual synchronous generator control has been generated in S056, control parameter generation circuit 13 returns to S055 and checks whether the calculation of the control parameters of all power conversion devices 41 connected to distribution system 24 is completed. When the calculation of the control parameters of all power conversion devices 41 is not calculated (NO in S055), control parameter generation circuit 13 proceeds to S056 and calculates the control parameter of next power conversion device 41. On the other hand, when the calculation of the control parameters of all power conversion devices 41 is completed (YES in S055), control parameter generation circuit 13 brings the creation of the operation plan of storage battery 40 to end.

When the creation of the operation plan of storage battery 40 is completed in S05 of FIG. 33, storage battery operation plan creation circuit 141 (FIG. 4) notifies management circuit 145 of the created operation plan (power target value). Upon receipt of the operation plan, management circuit 145 stores the received operation plan in the memory and notifies transmission data generation circuit 15 (FIG. 3) of the operation plan. Control parameter generation circuit 13 notifies transmission data generation circuit 15 of the generated control parameters.

Upon receipt of the operation plan (power target value) of storage battery 40 and the control parameters, transmission data generation circuit 15 converts the operation plan and the control parameters to a transmission format and outputs the result of the conversion to communication circuit 11 (FIG. 3). Upon receipt of the data transmitted from transmission data generation circuit 15, communication circuit 11 transmits the transmitted data to a corresponding power conversion device 41 over communication line 25.

When the transmission of the operation plans and the control parameters to all power conversion devices 41 is completed in S10 of FIG. 33, whether to stop CEMS 31 is checked in S11. When CEMS 31 is stopped (YES in S11), the processing is brought to an end. On the other hand, when CEMS 31 is not stopped (NO in S11), the processing returns to S01.

On the other hand, when the operation plan (power supply plan) has not been received from DSO 21 in S04 of FIG. 33 (NO in S04), CEMS 31 proceeds to S06 and checks whether the collection time of various measurement data has arrived. In the first embodiment, as described above, CEMS 31 collects the measurement data at intervals of 5 minutes. When the collection time of measurement data has not arrived (NO in S06), the processing returns to S01. On the other hand, when the collection time of measurement data has arrived (YES in S06), CEMS 31 collects measurement data in S07. In the first embodiment, CEMS 31 collects the amount of charge and discharge power of storage battery 40 for 5 minutes, and the current charge and discharge power and SOC information of storage battery 40 from each of power conversion devices 41*a* to 41*c* as measurement data.

After collecting the measurement data in S07, CEMS 31 checks whether or not the operation plan of storage battery 40 needs to be corrected in S08. In S07, CEMS 31 compares the current charge and discharge power with the operation plan (power target value) for each of the plurality of storage batteries 40. Specifically, CEMS 31 checks whether a power difference between the current charge and discharge power and the power target value falls outside a predetermined range and whether the SOC of storage battery 40 falls outside a predetermined allowable range. When the power difference falls outside the predetermined range and/or the SOC falls outside the allowable range in any one of the plurality of storage batteries 40, CEMS 31 reviews the operation plans of all storage batteries 40. Note that the operation plan of storage battery 40 in which the power difference falls outside the predetermined range and/or the SOC falls outside the allowable range may be reviewed.

CEMS 31 checks whether the operation plan of storage battery 40 needs to be corrected in the manner described above, and returns to S01 and continues the processing when determining that the operation plan of storage battery 40 need not be corrected (NO in S08). On the other hand, when determining that the operation plan of storage batteries 40 needs to be corrected (YES in S08), CEMS 31 proceeds to S09 and corrects the operation plans of all storage batteries 40.

Figure 39:
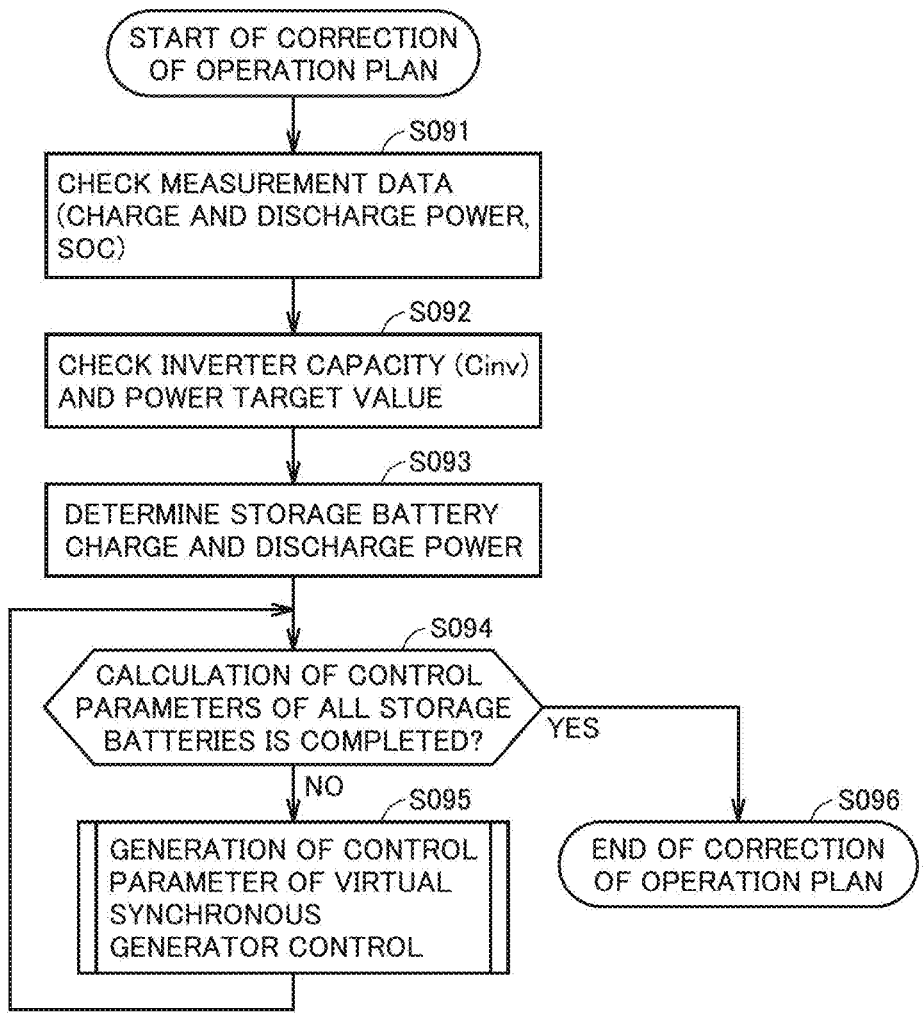
FIG. 39 is a flowchart for describing details of operation plan correction processing (S09 of FIG. 33).

FIG. 39 is a flowchart of processing of correcting the operation plan of storage battery 40 (S09 of FIG. 33). The processing illustrated in FIG. 39 is performed by operation plan creation circuit 14 (FIG. 4) in CEMS 31.

As illustrated in FIG. 39, when the processing is started, management circuit 146 (FIG. 4) instructs, in S091, storage battery operation plan correction circuit 144 (FIG. 4) to correct the operation plan, and transfers the charge and discharge power and the SOC information collected from each power conversion device 41. In S092, management circuit 146 also outputs the operation plan (power target value) of storage battery 40 stored in management circuit 145 (FIG. 4) and the capacity of the static inverter of power conversion device 41 stored in storage circuit 12 to storage battery operation plan correction circuit 144.

Storage battery operation plan correction circuit 144 reviews the operation plan of storage battery 40 on the basis of the information provided from management circuit 146. For example, it is assumed that the output power of power conversion device 41 is twice the power target value because either the predicted value of the power to be generated by mega solar 26 or the predicted value of the power to be consumed by each consumer is different from the actual value.

In such a case, it is assumed that the system frequency decreases to about the same as the lower limit (Fref−ΔFmax). When the power shortage further occurs, the system frequency becomes the lower limit, and a situation where power cannot be supplied from power conversion device 41 any more may occur.

Therefore, in the first embodiment, when a ratio between the power target value and the charge and discharge power falls outside a predetermined range, storage battery operation plan correction circuit 144 corrects the operation plan (power target value) of storage battery 40 on the basis of the measurement data collected at intervals of 5 minutes. Specifically, storage battery operation plan correction circuit 144 corrects the operation plan of storage battery 40 on the basis of the current charge and discharge power and the SOC information.

Here, the reason why the SOC is used in correction of the operation plan of storage battery 40 is that when a lithium ion battery is used as storage battery 40, storage battery 40 may fail or deteriorate rapidly due to overcharge or overdischarge. Therefore, under the normal storage battery control, when the SOC exceeds, for example, 90%, the charge mode of the storage battery is switched from a constant current charge mode to a constant voltage charge mode. In the constant voltage charge mode, the charge power cannot be increased, so that it is necessary to reduce the power target value under the virtual synchronous generator control. Likewise, even in a case of overdischarge, storage battery 40 further deteriorates, so that it is necessary to reduce the discharge power when the SOC falls below 5%, for example. Therefore, the SOC is used in creation and correction of the operation plan of storage battery 40.

Note that in a case where a lead-acid battery is used as storage battery 40, the lead-acid battery is resistant to overcharge, but tends to deteriorate due to overdischarge. Therefore, for such a lead-acid battery, for example, it is necessary to reduce the discharge power when the SOC falls below 20%. As described above, in order to suppress deterioration of the storage battery in use, the power target value is corrected using the SOC.

Specifically, storage battery operation plan correction circuit 144 creates the operation plan of storage battery 40 on the basis of the current charge and discharge power, and creates the operation plan of storage battery 40 on the basis of the current charge and discharge power and the SOC for charging when the SOC is close to the upper limit and discharging when the SOC is close to the lower limit. Specifically, when the SOC is close to the upper limit, the range of the charge power target value is narrowed down, and when the SOC is close to the lower limit, the range of the discharge power target value is narrowed down.

When the operation plan (power target value) of storage battery 40 has been corrected in S093, control parameter generation circuit 13 (FIG. 3) checks whether the calculation of the control parameters of all storage batteries 40 is completed in S094. When the calculation of the control parameters of all storage batteries 40 is completed (YES in S094), storage battery operation plan correction circuit 144 brings the processing of correcting the operation plan of storage battery 40 to an end. On the other hand, when the correction of the operation plans of all storage batteries 40 is not completed (NO in S094), control parameter generation circuit 13 generates the control parameter of the virtual synchronous generator control in S095. Note that a method for generating the control parameter of the virtual synchronous generator control is similar to the creation method used in the processing of creating the operation plan of storage battery 40 (S056 of FIG. 34 and FIG. 35), and thus no description will be given below of the method.

When the control parameter has been generated in S095, control parameter generation circuit 13 returns to S094, and checks whether the calculation of the control parameters of all power conversion devices 41 is completed. When the calculation of the control parameters of all power conversion devices 41 is not completed (NO in S094), control parameter generation circuit 13 generates the control parameter of next power conversion device 41 in S095.

On the other hand, when the calculation of the control parameters of all power conversion devices 41 is completed (YES in S094), storage battery operation plan correction circuit 144 brings the processing of correcting the operation plan of storage battery 40 to an end.

Referring back to FIG. 33, when the operation plan of storage battery 40 has been corrected in S09, storage battery operation plan creation circuit 141 notifies management circuit 145 of the corrected operation plan (power target value) in a similar manner to the creation of the operation plan.

When acquiring the operation plan of storage battery 40 from storage battery operation plan creation circuit 141, management circuit 145 stores the acquired operation plan in a memory (not illustrated) and notifies transmission data generation circuit 15 of the acquired operation plan. Likewise, control parameter generation circuit 13 notifies transmission data generation circuit 15 of the operation plan and control parameter of storage battery 40.

Upon receipt of the operation plan and control parameter of storage battery 40, transmission data generation circuit 15 convert the operation plan and control parameter to a transmission format and outputs the result of the conversion to communication circuit 11.

Upon receipt of the transmission data from transmission data generation circuit 15, communication circuit 11 transmits the transmission data to a corresponding power conversion device 41 over communication line 25 (S10 of FIG. 33).

When the transmission of the operation plan of storage battery 40 to all power conversion devices 41 is completed in S10 of FIG. 33, whether to stop CEMS 31 is checked in S11. When CEMS 31 is stopped (YES in S11), the processing is brought to an end. On the other hand, when CEMS 31 is not stopped, the processing returns to S01 and continues.

As described above, in the first embodiment, when creating the operation plan (power target value) of storage battery 40 for power conversion device 41, the control parameter of the virtual synchronous generator control implemented in the static inverter is generated on the basis of the capacity of the static inverter of each power conversion device 41 and the power target value. Accordingly, even when the power consumed by load 600 or the power generated by the energy creation equipment such as mega solar 26 fluctuates in a period until the next operation plan is notified from CEMS 31, the excess and deficient power can be shared using the same proportional division ratio as the operation plan (power target value) of storage battery 40.

Therefore, for example, in a case where the power generated by mega solar 26 decreases by 50% due to a change in solar radiation amount immediately after notifying all power conversion devices 41 of the operation plan, the shortage of power corresponding to 50% is proportionally divided on the basis of the ratio of the power target value calculated at the time of creating the operation plan. For example, when the charge and discharge power of each of storage batteries 40 has been determined such that the SOC of each of all storage batteries 40 become zero at almost the same time when the power target value is controlled in accordance with the ratio at the time of creating the operation plan, the excess and deficient power is proportionally divided on the basis of the ratio of the power target value even when the power generated by mega solar 26 decreases by 50%, and it is thus possible to perform control such that the SOC of each of all storage batteries 40 become zero at almost the same time.

In the first embodiment, the configuration where, when the control parameter of the virtual synchronous generator control is generated for the static inverter of power conversion device 41, the control parameter is calculated using the inverter capacity and the power target value has been described, but the present disclosure is not limited to such a configuration, and, for example, in a case where the ratio of the capacity of storage battery 40 to the inverter capacity is different among power conversion devices 41, for example, the capacity of storage battery 40*a* is twice the inverter capacity of power conversion device 41*a*, or the capacity of storage battery 40*b* is three times the inverter capacity of power conversion device 41*b*, the operation plan (power target value) of each storage battery 40 is generated with the capacity ratio taken into account. Alternatively, the same effect can be produced by taking the capacity ratio when generating the control parameter into account.

(Operation of Power Conversion Device 27 and Power Conversion Device 41)

With reference to FIGS. 6 to 16, 40, and 41, how mega solar power conversion device 27 and storage battery power conversion device 41 operate will be described below.

[Operation of Power Conversion Device 27]

With reference to FIG. 6, how mega solar power conversion device 27 operates will be described.

When mega solar 26 starts to generate power, the DC voltage input from mega solar 26 to first DC/DC converter 203 in power conversion device 27 increases. First control circuit 204 monitors the DC voltage measured by voltmeter 201. When the DC voltage exceeds a predetermined voltage value, first control circuit 204 causes power conversion device 27 to transition from a standby state to the normal operation.

Upon transition to the normal operation, second control circuit 209 in power conversion device 27 controls first DC/AC converter 208. How power conversion device 27 performs control during the normal operation will be described below.

Referring to FIG. 6, first control circuit 204 checks whether mega solar 26 is generating power. Specifically, first control circuit 204 checks whether the output voltage of mega solar 26 measured by voltmeter 201 exceeds the predetermined voltage. When the output voltage exceeds the predetermined voltage, first control circuit 204 notifies second control circuit 209 that mega solar 26 can generate power.

Upon receipt of the notification from first control circuit 204, second control circuit 209 checks whether power is being supplied from substation 20 to distribution system 24 (whether distribution system 24 is in a power failure) on the basis of the AC voltage of distribution system 24 measured by voltmeter 10.

When confirming that the AC voltage measured by voltmeter 210 is higher than or equal to a predetermined voltage, and distribution system 24 is not in a power failure, second control circuit 209 activates DC/AC converter 208 and instructs first control circuit 204 to start power generation of mega solar 26.

Note that, in the first embodiment, a case where the DC bus voltage of DC bus 205 is managed by first DC/AC converter 208 during the normal operation will be described. Further, in the first embodiment, power regenerated from power conversion device 27 to distribution system 24 is managed by the current control by first DC/AC converter 208, thereby operating the entire distributed power supply management device.

When mega solar 26 is instructed to start power generation by second control circuit 209, fifth control circuit 54 (FIG. 8) of first control circuit 204 instructs MPPT control circuit 51 (FIG. 8) to start maximum power point tracking control of mega solar 26.

The maximum power point tracking control will be briefly described. Under the maximum power point tracking control, whether the last command value is made greater or less than the power command value before last is managed. Then, the generated power of mega solar 26 measured this time is compared with the generated power of mega solar 26 measured last time, and when the generated power has increased, the command value is changed in the same direction (increasing direction or decreasing direction) as the last time.

Specifically, when the generated power of mega solar 26 measured this time is larger than the generated power measured last time, and the last command value is greater than the command value before last, the current command value is increased. On the other hand, when the last command value is less than the command value before last, the current command value is decreased. On the contrary, when the generated power of mega solar 26 measured this time is smaller than the generated power measured last time, and the last command value is greater than the command value before last, the current command value is decreased. On the other hand, when the last command value is less than the command value before last, the current command value is increased. Controlling the current command value in this manner causes mega solar 26 to be controlled so as to maximize the output power.

First DC/DC converter 203 operates a built-in booster circuit in accordance with a command value output from first control circuit 204 to convert the first DC voltage output from mega solar 26 into the second DC voltage (DC bus voltage of DC bus 205) and output the second DC voltage.

When the supply of the power generated by mega solar 26 from first DC/DC converter 203 is started, second control circuit 209 controls first DC/AC converter 208 to output (regenerate) the power generated by mega solar 26 to distribution system 24. Specifically, the DC bus voltage of DC bus 205 is monitored, and when the DC bus voltage exceeds the control target value, the generated power is output in synchronization with the AC voltage supplied from distribution system 24.

With reference to FIG. 9, how second control circuit 209 operates will be described.

In second control circuit 209, phase detection circuit 61 detects the zero-cross point of the waveform of the AC voltage of distribution system 24 measured by voltmeter 210 (FIG. 1).

First sine wave generation circuit 62 generates a reference sine wave synchronized with the waveform of the AC voltage of distribution system 24 on the basis of information indicating the zero-cross point detected by phase detection circuit 61 and the waveform of the AC voltage measured by voltmeter 210. First sine wave generation circuit 62 outputs the generated reference sine wave to multiplier 65.

Voltmeter 206 measures the voltage of DC bus 205 and outputs the measurement value to subtractor 63 and sixth control circuit 67 in current control circuit 60. Note that current control circuit 60 uses a control method (current control) by which power is output in synchronization with the AC system voltage. This control method is a control method applied to a general power conversion device for photovoltaic generation installed at a home.

Sixth control circuit 67 stores the target voltage of DC bus 205 and outputs the target voltage to subtractor 63.

Current control circuit 60 controls the current output from first DC/AC converter 208 so as to make the DC bus voltage measured by voltmeter 206 equal to the target voltage. The output of subtractor 63 is input to first PI control circuit 64. First PI control circuit 64 performs PI control so as to make the output of the subtractor 63 become zero. The output of first PI control circuit 64 is input to multiplier 65 and is multiplied by the reference sine wave from first sine wave generation circuit 62 to convert into a current command value.

The current command value output from multiplier 65 is input to subtractor 66. Subtractor 66 calculates a deviation between the current command value and the AC value of distribution system 24 measured by ammeter 211, and inputs the calculated deviation to second PI control circuit 68.

Second PI control circuit 68 performs PI control so as to make the deviation output from the subtractor 66 become zero. First PWM converter 69 performs PWM control on the output of second PI control circuit 68 to generate a command value of first DC/AC converter 208. First DC/AC converter 208 outputs an alternating current in accordance with the command value provided from first PWM converter 69.

Further, when the AC voltage (AC effective voltage) measured by voltmeter 210 exceeds a predetermined voltage value, or when a request for reducing the power generated by mega solar 26 is notified from CEMS 31, fifth control circuit 54 (FIG. 8) in first control circuit 204 switches the control of mega solar 26 from the MPPT control to the voltage control. Specifically, fifth control circuit 54 controls the DC voltage output from mega solar 26 such that the AC voltage (AC effective voltage) measured by voltmeter 210 falls within the predetermined voltage range. Alternatively, fifth control circuit 54 controls the output voltage of mega solar 26 such that the power generated by mega solar 26 falls within a power range notified from CEMS 31.

Note that first switching circuit 53 (FIG. 8) switches between the output of MPPT control circuit 51 and the output of voltage control circuit 52 in accordance with a switching control signal provided from fifth control circuit 54.

Sixth control circuit 67 collects the measurement results regarding DC bus 205 measured by voltmeter 206 and ammeter 207, the measurement results regarding distribution system 24 measured by voltmeter 210 and ammeter 211, the status information of first DC/DC converter 203 output from first control circuit 204, and the like, and notifies CEMS 31 and the like of the collected information via communication I/F 212.

Sixth control circuit 67 also notifies CEMS 31, via communication I/F 212, of the effective voltage of distribution system 24 measured by an effective voltage measurement unit (not illustrated) or the information on the active power and reactive power of the AC system measured by an active and reactive power measurement unit (not illustrated), and further notifies fifth control circuit 54 of the measurement results of the effective voltage, the active power, and the like of the AC system.

As described above, when the effective value of the AC system voltage exceeds the predetermined value, fifth control circuit 54 suppresses an increase in the AC system voltage by switching the control of mega solar 26 from the MPPT control to the voltage control.

[Operation of Power Conversion Device 41]

With reference to FIGS. 7, 10 to 16, 40, and 41, how storage battery power conversion device 41 operates will be described below.

In the first embodiment, since the virtual synchronous generator control is implemented in power conversion device 41, second DC/AC converter 408 operates as a voltage source by performing voltage control. That is, third control circuit 404 (FIG. 7) performs control to make the voltage of DC bus 405 constant. With reference to FIG. 10, how third control circuit 404 operates will be described below.

The voltage of DC bus 405 is measured by voltmeter 406. The measurement value of voltmeter 406 is input to charge control circuit 71, discharge control circuit 72, and seventh control circuit 74.

Charge control circuit 71 and discharge control circuit 72 control the charge power or the discharge power so as to make the voltage of DC bus 405 equal to the target voltage output from seventh control circuit 74. Specifically, when storage battery 40 is being discharged, control is performed such that the discharge power is decreased when the voltage of DC bus 405 is higher than the target voltage, and the discharge power is increased when the voltage of DC bus 405 is lower than the target voltage, thereby making the voltage of DC bus 405 coincident with the target voltage.

On the other hand, when storage battery 40 is being charged, control is performed such that the charge power is increased when the voltage of DC bus 405 is higher than the target voltage, and the charge power is decreased when the voltage of DC bus 405 is lower than the target voltage, thereby making the voltage of the DC bus 405 coincident with the target voltage.

Note that switching between the output of charge control circuit 71 and the output of discharge control circuit 72 is performed by second switching circuit 73. Seventh control circuit 74 outputs a switching control signal to second switching circuit 73 on the basis of the charge and discharge operation of storage battery 40.

With reference to FIGS. 11 to 16 and 40, how fourth control circuit 409 (FIG. 7) operates will be described below.

Figure 40:
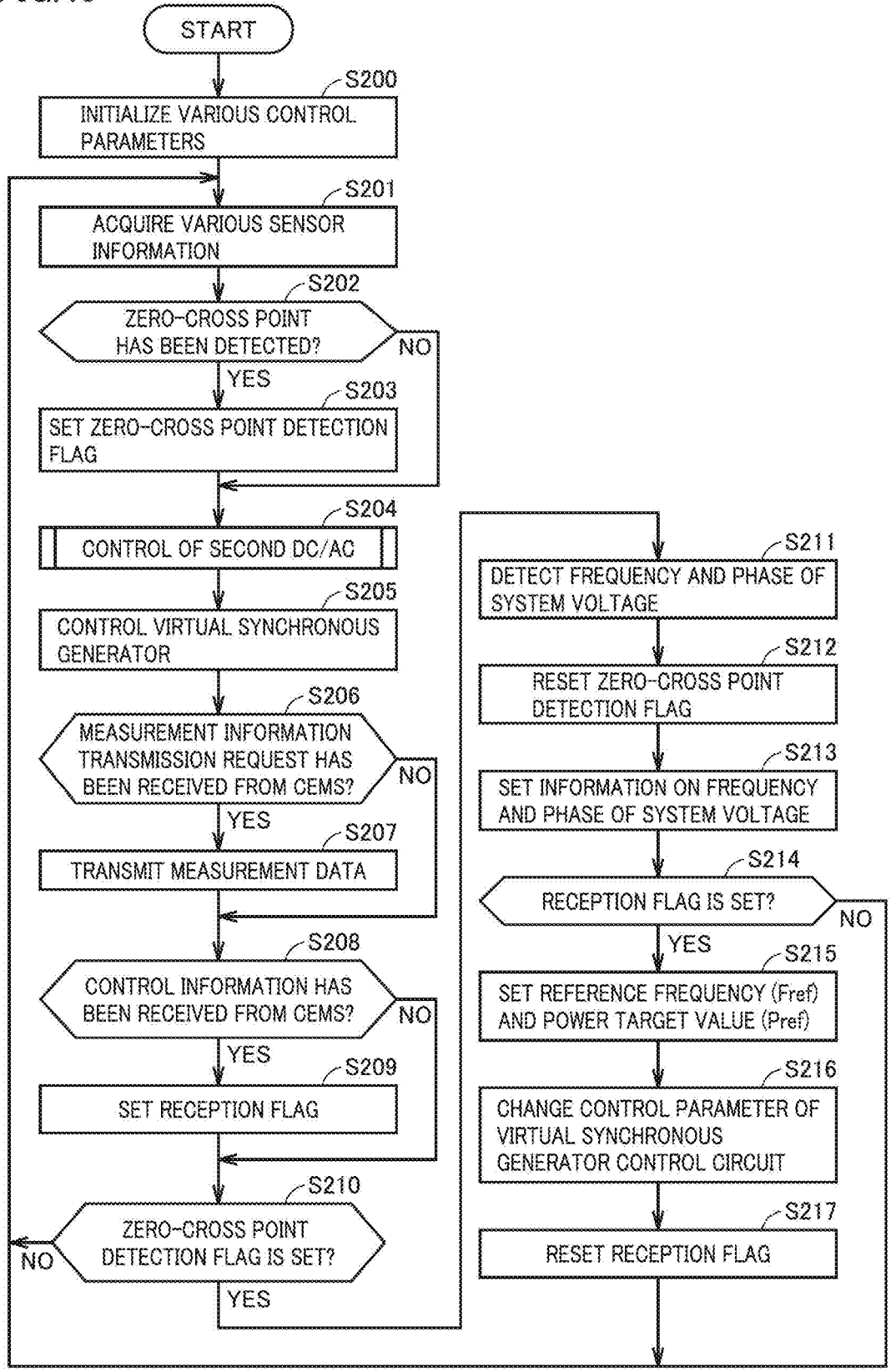
FIG. 40 is a flowchart for describing how the storage battery power conversion device operates.

FIG. 40 is a flowchart for describing how power conversion device 41 operates.

As illustrated in FIG. 40, when the processing is started, fourth control circuit 409 initializes various control parameters in S200. Subsequently, in S201, fourth control circuit 409 collects the voltage values measured by voltmeters 401, 406, 410, the current values measured by ammeters 402, 407, 411, and the status information of storage battery 40. Note that the measurement value of voltmeter 410 is an AC voltage, so that eighth control circuit 87 (FIG. 11) calculates the effective value of the AC voltage, and sets the effective value as a voltage value. The measurement value of ammeter 411 is an alternating current, so that eighth control circuit 87 calculates the effective value of the alternating current, and sets the effective value as a current value. A charge and discharge power calculation circuit (not illustrated) in seventh control circuit 74 calculates the charge and discharge power and the amount of charge and discharge power of the storage battery on the basis of the collected data.

The AC voltage of distribution system 24 measured by voltmeter 410 is input to AC frequency detection circuit 81 (FIG. 11). In S202, AC frequency detection circuit 81 detects the zero-cross point of the waveform of the AC voltage.

FIG. 12 is a block diagram illustrating a configuration of AC frequency detection circuit 81 illustrated in FIG. 11. As illustrated in FIG. 12, the measurement value of voltmeter 410 is input to phase detection circuit 810. In S202 of FIG. 40, phase detection circuit 810 detects the zero-cross point of the AC voltage. Note that, in the first embodiment, the zero-cross point indicates a point and time at which the waveform of the AC voltage measured by voltmeter 410 changes from negative to positive. Phase detection circuit 810 outputs information indicating the detected zero-cross point to frequency detection circuit 811.

Frequency detection circuit 811 calculates the period of the AC voltage on the basis of a time of the last detection of the zero-cross point by phase detection circuit 810 and a time of the current detection of the zero-cross point. Frequency detection circuit 811 calculates the frequency of the AC voltage on the basis of the calculated period.

Second sine wave generation circuit 812 outputs information on the zero-cross point detected by phase detection circuit 810 and information on the frequency of the AC voltage detected by frequency detection circuit 811 as sine wave information. The zero-cross point information and the frequency information are output to inverter current control circuit 84, inverter voltage control circuit 85, virtual synchronous generator control circuit 83, and eighth control circuit 87.

Referring back to FIG. 40, when the zero-cross point has been detected in S202 (YES in S202), phase detection circuit 810 sets a zero-cross point detection flag in S203. When the processing of S203 is finished, or when the zero-cross point is not detected in S202 (NO in S202), fourth control circuit 409 controls second DC/AC converter 408 in S204.

Figure 41:
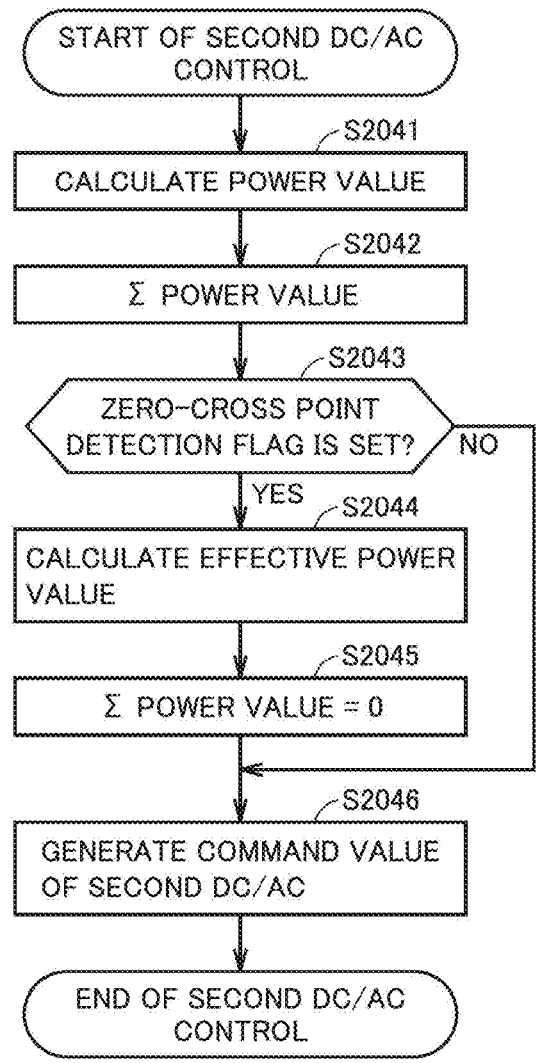
FIG. 41 is a flowchart for describing details of control processing (S204 of FIG. 40) of the second DC/AC converter.

With reference to FIGS. 11 and 41, the control of second DC/AC converter 408 will be described below.

As described above, since power conversion device 41 has the virtual synchronous generator control implemented, second DC/AC converter 408 is controlled as a voltage source. That is, second DC/AC converter 408 is voltage-controlled. Therefore, when the power supplied to distribution system 24 is insufficient, second DC/AC converter 408 is controlled to increase the output power. On the other hand, when the power supplied to distribution system 24 is excessive, second DC/AC converter 408 is controlled to decrease the output power.

FIG. 41 is a flowchart for describing details of control processing of second DC/AC converter 408.

As illustrated in FIG. 41, after calculating the power value on the basis of the measurement values of voltmeter 410 and ammeter 411 in S2041, effective power calculation circuit 82 (FIG. 11) integrates the calculated power value in S2042. When the zero-cross point detection flag is set (YES in S2043), effective power calculation circuit 82 proceeds to S2044, stores the integral value of the effective power value for one period of the AC voltage in a storage circuit (not illustrated) in eighth control circuit 87, and zero-initializes the integral value in S2045.

When the processing of S2045 is finished or when the zero-cross point detection flag is not set (NO in S2043), inverter voltage control circuit 85 generates a command value of second DC/AC converter 408 in S2046.

When the command value is generated in S2046, virtual synchronous generator control circuit 83 (FIG. 11) performs the virtual synchronous generator control. In the first embodiment, one period of the AC voltage is set as a control period. The control period may be an integral multiple of one period of the AC voltage or a predetermined period such as a period of 1 second.

FIG. 14 is a block diagram illustrating a configuration of virtual synchronous generator control circuit 83.

When determining that the control timing has arrived, eighth control circuit 87 (FIG. 11) instructs virtual synchronous generator control circuit 83 to generate information on the frequency and the phase used for voltage control. In the first embodiment, the frequency and the phase of the sine wave generated by third sine wave generation circuit 851 (FIG. 13) in inverter voltage control circuit 85 are updated at the zero-cross point. Therefore, in the first embodiment, the control period corresponds to a period of the zero-cross point detected by AC frequency detection circuit 81.

As illustrated in FIG. 14, in virtual synchronous generator control circuit 83, subtractor 832 subtracts the reference frequency Fref (for example, 60 Hz) input from eighth control circuit 87 from the actual measurement value of the frequency of the AC voltage input from AC frequency detection circuit 81 (FIG. 11), and outputs the result of the subtraction to governor control circuit 833. FIG. 15 is a block diagram illustrating a detailed configuration of governor control circuit 833 illustrated in FIG. 14.

As illustrated in FIG. 15, in governor control circuit 833, multiplier 91 multiplies the output of subtractor 832 (FIG. 14) by the control parameter (−1/Kgd) notified from eighth control circuit 87. Multiplier 91 inputs the result of the multiplication to first-order lag system model 92.

Note that, regarding the speed adjustment rate Kgd and the governor time constant Tg used in governor control circuit 833, the speed adjustment rate Kgd and the governor time constant Tg notified from CEMS 31 are set in a register (not illustrated) via eighth control circuit 87 and used.

As described above, first-order lag system model 92 performs an operation to mimic the first-order lag system $(1/(1+s \times Tg))$ using the time constant Tg notified from eighth control circuit 87, and outputs the result of the operation to limiter circuit 93.

Limiter circuit 93 puts a limit on the input data. Specifically, limiter circuit 93 puts a limit on the output power of second DC/AC converter 408 so as to prevent the output power from exceeding the power capacity of second DC/AC converter 408.

Referring back to FIG. 14, adder 835 adds up the output of governor control circuit 833 and the power target value Pref output from eighth control circuit 87. Note that the power target value Pref notified from CEMS 31 is output from eighth control circuit 87.

Subtractor 836 subtracts the actual value of the effective power output from effective power calculation circuit 82 (FIG. 11) from the output of adder 835, and outputs the result of the subtraction to point mass system operation circuit 837. FIG. 16 is a block diagram illustrating a detailed configuration of point mass system operation circuit 837 illustrated in FIG. 15.

As illustrated in FIG. 16, subtractor 101 subtracts the output of multiplier 103 from the output of subtractor 836 (FIG. 14), and outputs the value obtained by the subtraction to integrator 102.

Integrator 102 divides the result of the subtraction from subtractor 101 by the inertia constant M output from eighth control circuit 87, and integrates the result of the division. The output αω of integrator 102 corresponds to a difference value relative to the angular velocity (2×π×60 Hz) of the frequency of the AC voltage. The output Δω of integrator 102 is input to multiplier 103 and divider 104.

Multiplier 103 multiplies the output Δω of integrator 102 by the damping factor Dg provided from eighth control circuit 87, and outputs the result of the multiplication to subtractor 101.

Divider 104 converts the output Δω of integrator 102 into a difference value Δf corresponding to a difference from the reference frequency Fref (60 Hz) by dividing output Δω by 2×π. Adder 105 adds up the output Δf of divider 104 and the reference frequency Fref (60 Hz) to generate a frequency (Fref+Δf) for performing voltage control in inverter voltage control circuit 85 (FIG. 11).

Note that, regarding the inertia constant M and the damping factor Dg used in point mass system operation circuit 837, the inertia constant M and the damping factor Dg generated and notified by CEMS 31 are set in a register (not illustrated) via eighth control circuit 87, and the inertia constant M and the damping factor Dg set in the register are used.

The frequency information (Fref+Δf) output from adder 105 is input to phase calculation circuit 106. How phase calculation circuit 106 operates will be described below.

In the first embodiment, the frequency information output from adder 105 (FIG. 16) is integrated by phase calculation circuit 106 and output as phase information used when inverter voltage control circuit 85 performs voltage control.

The phase information and the frequency information output from point mass system operation circuit 837 (FIG. 16) are input to third sine wave generation circuit 851 (FIG. 13) in inverter voltage control circuit 85 via second sine wave generation circuit 812 (FIG. 12) in AC frequency detection circuit 81. Third sine wave generation circuit 851 generates the target value of the AC voltage output from power conversion device 41 on the basis of the input information.

Referring back to FIG. 40, when the processing of the virtual synchronous generator control is brought to an end in S205, fourth control circuit 409 checks whether a transmission request of the measurement data has received from CEMS 31 in S206. Upon receipt of the transmission request from CEMS 31 (YES in S206), eighth control circuit 87 (FIG. 11) notifies CEMS 31 of the measurement data via communication I/F 412 (FIG. 7) in S207.

On the other hand, after the measurement data is notified in S207 or when there is no transmission request from CEMS 31 (NO in S206), eighth control circuit 87 proceeds to S208 and checks whether the control information has been received from CEMS 31.

When the control information has been received from CEMS 31 (YES in S208), eighth control circuit 87 sets a control information reception flag in S209. When the processing of S209 is finished, or when the control information has not been received from CEMS 31 (NO in S208), eighth control circuit 87 checks whether or not the zero-cross point detection flag is set in S210. When the zero-cross point detection flag is not set (NO in S210), the processing returns to S201.

On the other hand, when the zero-cross point detection flag is set (YES in S210), second sine wave generation circuit 812 (FIG. 12) takes the frequency and phase information on the system voltage in S211, and resets the zero-cross point detection flag in S212.

When the zero-cross point detection flag is reset in S212, second sine wave generation circuit 812 updates, to the information taken in S211, the frequency and phase information on the system voltage (zero-cross point time information in the first embodiment) in S213.

Upon completion of the processing of S213, eighth control circuit 87 checks whether the control information has been received from CEMS 31 (whether the control information reception flag is set) in S214. When the reception flag is not set (NO in S214), the processing returns to S201.

On the other hand, when the reception flag is set (YES in S214), eighth control circuit 87 replaces each of the frequency target value (reference frequency Fref) and the power target value Pref with the received data in S215. Eighth control circuit 87 updates the control parameter of the virtual synchronous generator control to the control parameter (the speed adjustment rate Kgd, the damping factor Dg, and the inertia constant M) received in S216.

When the update of the control parameter is completed in S216, eighth control circuit 87 clears (resets) a register (not illustrated) in which the reception flag is set, and returns to S201.

As described above, the distributed power supply management device according to the first embodiment allows, even when the demand balance largely changes immediately after notifying each of power conversion devices 41a to 41c of the operation plan (power target value) of a corresponding one of storage batteries 40a to 40c created by CEMS 31, the proportional division ratio of the output power of power conversion devices 41a to 41c to be nearly equal to the ratio of the power target value at the time of creating the operation plan. Accordingly, in a case where the operation plan (discharge plan) is created so as to make the SOC of each of storage batteries 40a to 40c become zero at almost the same time after several hours, or in a case where the operation plan (charge plan) is created so as to cause storage batteries 40a to 40c to be fully charged at almost the same time, even when the power consumed by load 600 or the power generated by mega solar 26 largely changes from the power expected at the time of creating the operation plan, it is possible to make the SOC of each of storage batteries 40a to 40c become zero at almost the same time or cause storage batteries 40a to 40c to be fully charged at almost the same time although it is deviated from the expected time, and it is therefore possible to comply with the expected operation plan.

Further, in the conventional virtual synchronous generator control technology, since power conversion devices 41a to 41c equally share the excess and deficient power, the power proportional division ratio for power conversion device 41 having a relatively small power target value becomes high, and the SOC of a corresponding storage battery 40 becomes zero prior to the other storage batteries 40 in some cases. On the other hand, according to the first embodiment, since the excess and deficient power can be proportionally divided at the ratio of the power target value set in the operation plan, the power proportional division ratio for storage battery 40 having a low SOC (that is, the power target value is small) can be kept low.

Second Embodiment

In the first embodiment, the configuration where CEMS 31 generates the control parameter of the virtual synchronous generator control implemented in power conversion device 41 and transmits the control parameter to power conversion device 41 has been described. In a second embodiment, a configuration where CEMS 31 transmits a parameter necessary for generating the control parameter to power conversion device 41, and power conversion device 41 generates the control parameter using the received parameter will be described.

CEMS 31 in the second embodiment 2 differs from CEMS 31 in the first embodiment only in the configuration of control parameter generation circuit 13 (FIG. 5). A distributed power supply management device according to the second embodiment will be described below, focusing on an operation of a portion different from the first embodiment.

Figure 42:
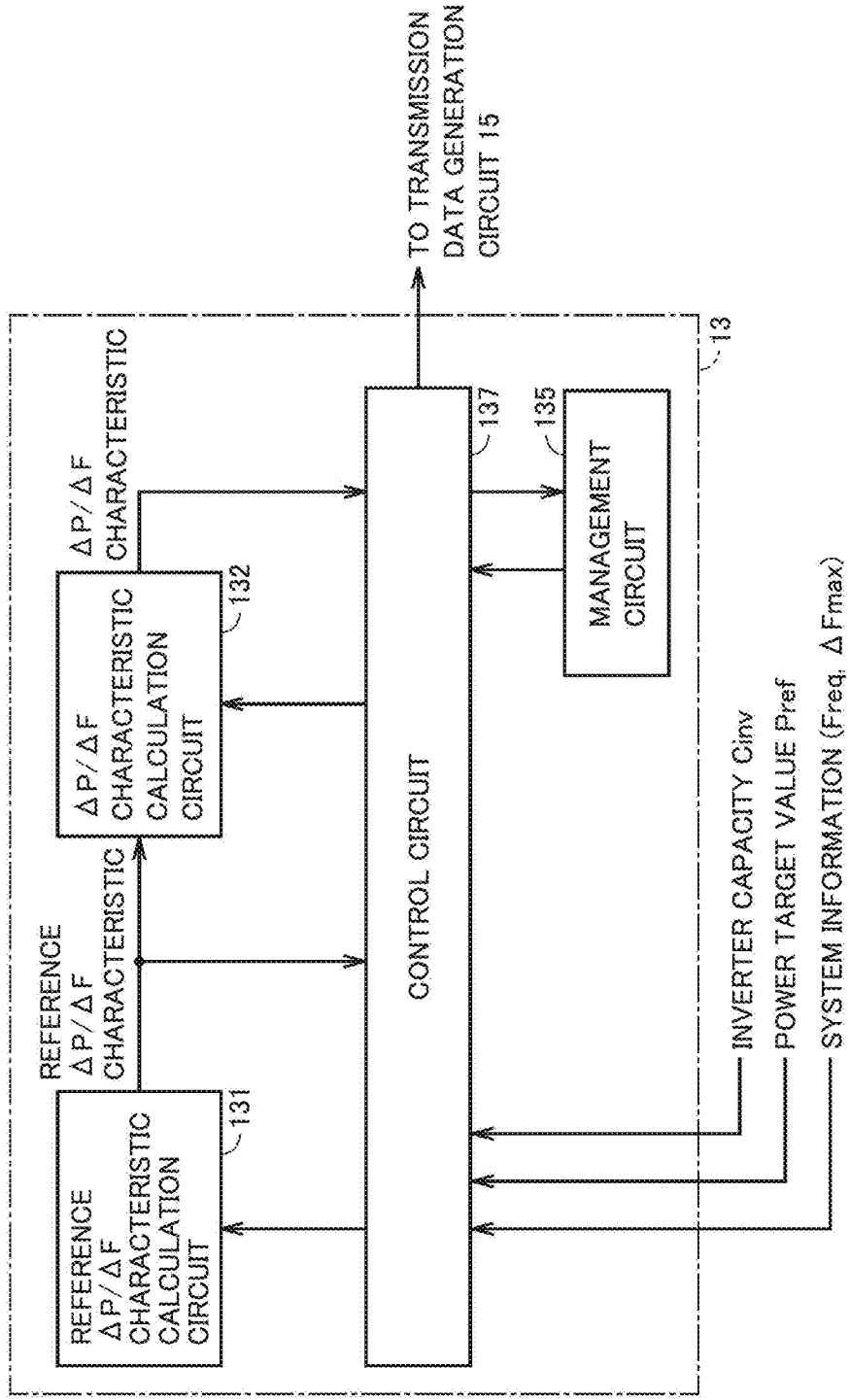
FIG. 42 is a block diagram of a control parameter generation circuit in a CEMS according to a second embodiment.

FIG. 42 is a block diagram illustrating a configuration of control parameter generation circuit 13 according to the second embodiment. Control parameter generation circuit 13 illustrated in FIG. 42 is obtained by removing control parameter generation circuit 133 and virtual synchronous generator model 134 from control parameter generation circuit 13 illustrated in FIG. 5 and replacing control circuit 136 with a control circuit 137.

In the second embodiment, CEMS 31 generates the slope of the ΔP/ΔF characteristic, and transmits the generated slope of the ΔP/ΔF characteristic, the power target value Pref, the system information (limit value (Fref±ΔFmax) of the system frequency), the response performance of the virtual synchronous generator control, and the like to power conversion device 41. Power conversion device 41 generates the control parameter using the data received from CEMS 31 and the capacity of its own static inverter.

In the second embodiment, a configuration where CEMS 31 generates the ΔP/ΔF characteristic will be described, but the present disclosure is not limited to such a configuration, and a configuration where CEMS 31 transmits all information necessary for generating the control parameter or intermediately generated data to power conversion device 41, and power conversion device 41 generates the control parameter using the received data may be employed. This allows a reduction in amount of data transmitted from CEMS 31 to power conversion device 41.

As illustrated in FIG. 42, control parameter generation circuit 13 according to the second embodiment includes reference ΔP/ΔF characteristic calculation circuit 131, ΔP/ΔF characteristic calculation circuit 132, management circuit 135, and control circuit 137.

Reference ΔP/ΔF characteristic calculation circuit 131 calculates the reference ΔP/ΔF characteristic on the basis of information on the capacities of the static inverters (second DC/AC converters 408) of power conversion devices 41a to 41c.

ΔP/ΔF characteristic calculation circuit 132 calculates the ΔP/ΔF characteristic on the basis of the reference ΔP/ΔF characteristic and the power target value Pref created by operation plan creation circuit 14 (FIG. 5).

Management circuit 135 stores, in a memory (not illustrated), and manages information such as the slope of the ΔP/ΔF characteristic output from ΔP/ΔF characteristic calculation circuit 132 and the power target value Pref.

Control circuit 137 manages how reference ΔP/ΔF characteristic calculation circuit 131, ΔP/ΔF characteristic calculation circuit 132, and management circuit 135 operate.

How CEMS 31 according to the second embodiment operates will be described below. The operation of CEMS 31 according to the second embodiment is different from the operation of CEMS 31 according to the first embodiment only in the processing of generating the control parameter of the virtual synchronous generator control (S056 of FIG. 34 and FIG. 35). The operation of a different portion will be described below.

Figure 43:
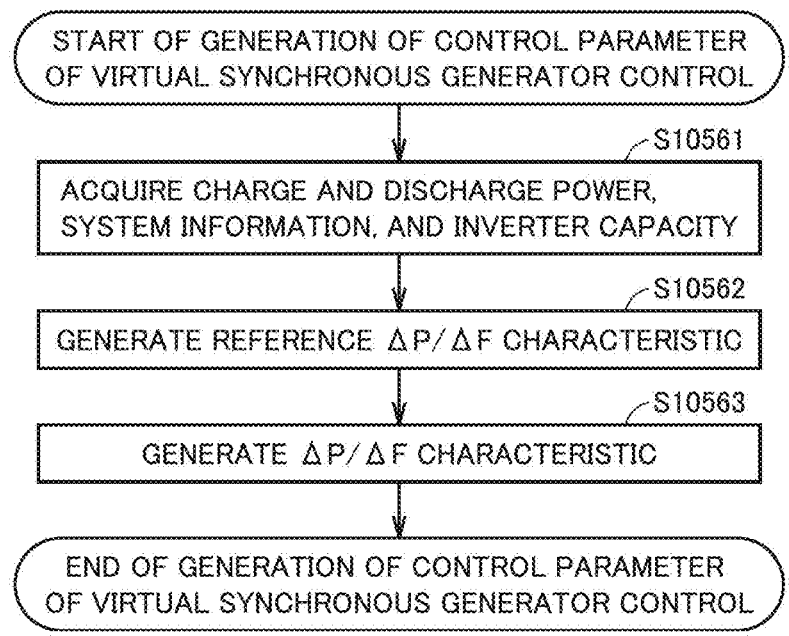
FIG. 43 is a flowchart for describing details of virtual synchronous generator control parameter generation processing (S056 of FIG. 34) according to the second embodiment.

FIG. 43 is a flowchart of the processing of generating the control parameter of the virtual synchronous generator control (S056 of FIG. 34). The processing illustrated in FIG. 43 is performed by control parameter generation circuit 13 (FIG. 42) in CEMS 31.

As illustrated in FIG. 43, when the processing is started, first, control circuit 137 collects, in S10561, the power target value Pref calculated from the amount of charge and discharge power of storage battery 40 for the next 30 minutes created in S054 of FIG. 34, the inverter capacity Cinv of second DC/AC converter 408 in power conversion device 41, and information on distribution system 24 (limit of the system frequency (Fref±ΔFmax), the response performance of the virtual synchronous generator control). In the second embodiment, in S054 of FIG. 34, storage battery operation plan creation circuit 141 (FIG. 4) creates the power target value Pref of each power conversion device 41.

When the information is collected in S10561, reference ΔP/ΔF characteristic calculation circuit 131 (FIG. 42) calculates reference ΔP/ΔF characteristic in S10562. The method for creating reference ΔP/ΔF characteristic is the same as the method described in the first embodiment. That is, in the discharge mode or the charge mode of storage battery 40, the reference ΔP/ΔF characteristic is created such that, with half of the inverter capacity serving as the reference set as the power target value (positive in a case of discharging, and negative in a case of charging), the frequency of the AC voltage when the static inverter discharges the maximum power (when the charge power is zero in a case of charging) becomes equal to the lower limit frequency (Fref−ΔFmax), and such that the frequency of the AC voltage when the discharge power of the static inverter is zero (when the maximum power is charged in a case of charging) becomes equal to the upper limit frequency (Fref+ΔFmax).

On the other hand, in the charge and discharge mode of storage battery 40, the reference ΔP/ΔF characteristic is created such that, with half of the inverter capacity serving as the reference set as the power target value, the frequency of the AC voltage when the static inverter gives a charge of the maximum power becomes equal to the upper limit frequency, and the frequency of the AC voltage when the charge power of the static inverter becomes zero becomes equal to the lower limit frequency.

After calculating the reference ΔP/ΔF characteristic in S10562, ΔP/ΔF characteristic calculation circuit 132 creates the ΔP/ΔF characteristic in S10563. Specifically, as illustrated in FIG. 42, after creating the reference ΔP/ΔF characteristic, reference ΔP/ΔF characteristic calculation circuit 131 outputs the slope of the generated reference ΔP/ΔF characteristic to control circuit 137 and ΔP/ΔF characteristic calculation circuit 132.

ΔP/ΔF characteristic calculation circuit 132 calculates the ΔP/ΔF characteristic on the basis of the power target value Pref notified from control circuit 137. Specifically, when the power target value Pref collected from control circuit 137 exceeds the inverter capacity Cinv, ΔP/ΔF characteristic calculation circuit 132 limits the power target value Pref to the inverter capacity Cinv. Then, in the discharge mode or the charge mode of storage battery 40, ΔP/ΔF characteristic calculation circuit 132 calculates the slope of the ΔP/ΔF characteristic such that the slope of the ΔP/ΔF characteristic=the slope of the reference ΔP/ΔF characteristic×(Cinv×0.5)/Pref.

When the slope of the ΔP/ΔF characteristic is calculated, control circuit 137 outputs the slope of the ΔP/ΔF characteristic, the power target value Pref, and the system information (Fref±ΔFmax, response performance of the virtual synchronous generator control, and the like) to management circuit 135. Management circuit 135 stores the input information in a storage unit (not illustrated) for each power conversion device 41. The subsequent operation is the same as the operation in the first embodiment, and thus no description will be given below of the operation.

How power conversion device 41 according to the second embodiment operates will be described below.

Figure 44:
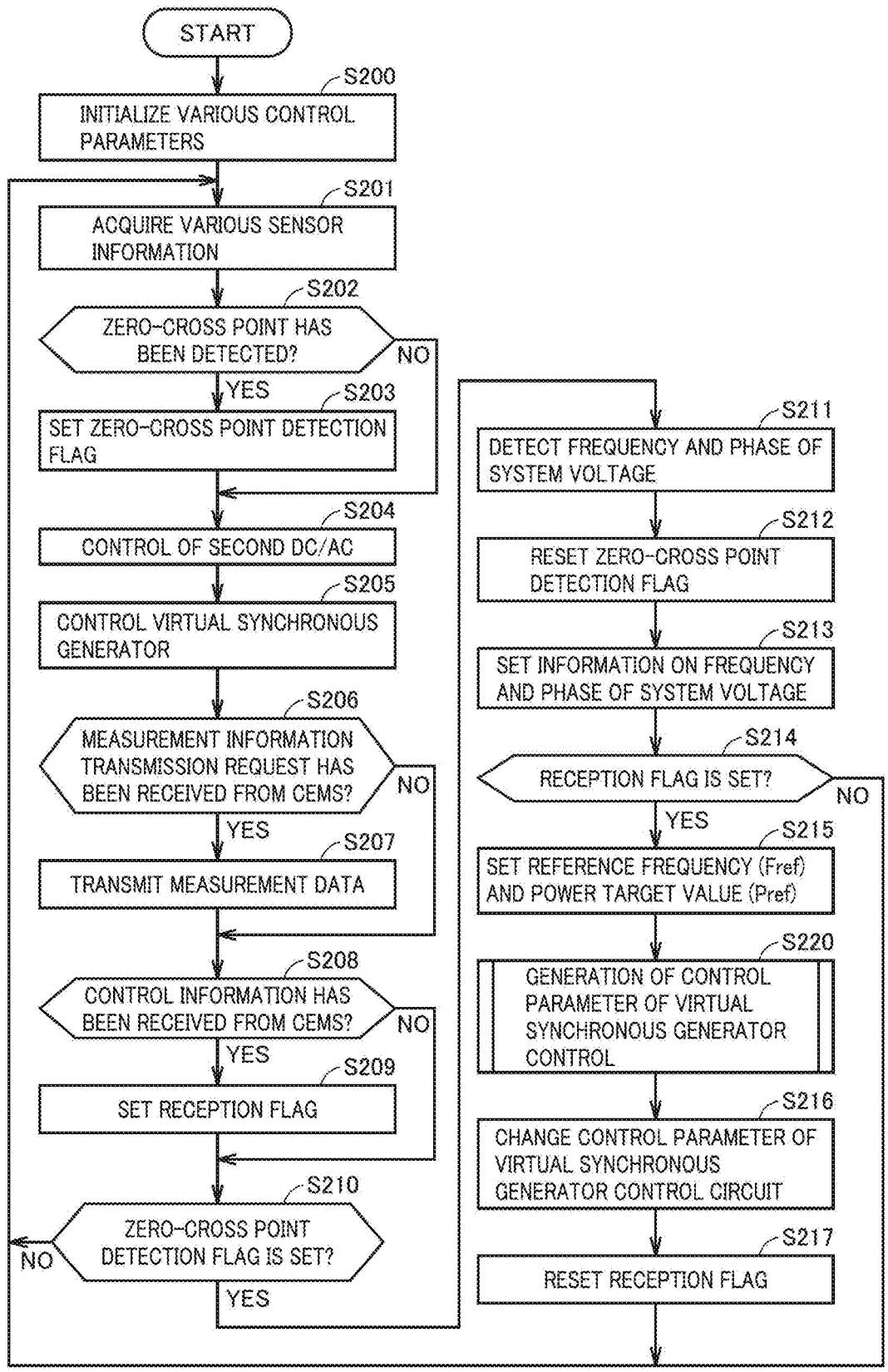
FIG. 44 is a flowchart for describing how a storage battery power conversion device according to the second embodiment operates.

FIG. 44 is a flowchart focusing on the operation of fourth control circuit 409 (FIG. 11).

As illustrated in FIG. 44, when power conversion device 41 is put into operation, as in the first embodiment, fourth control circuit 409 initializes various control parameters and sets the various control parameters to predetermined initial values in S200.

After initializing the various control parameters, fourth control circuit 409 collects the measurement values of voltmeters 401, 406, 410 and ammeter 402, 407, 411 and the status information (such as SOC) of storage battery 40 in S201. In the second embodiment, fourth control circuit 409 calculates the charge and discharge power of storage battery 40, and the amount of charge and discharge power of storage battery 40 on the basis of the collected data.

Next, in S202, fourth control circuit 409 detects the zero-cross point of the AC voltage. When the zero-cross point is detected (YES in S202), the processing proceeds to S203, and the zero-cross point detection flag is set. Note that the zero-cross point indicates a point and time at which the waveform of the AC voltage measured by voltmeter 410 changes from negative to positive as in the first embodiment. AC frequency detection circuit 81 (FIG. 11) calculates the period of the AC voltage on the basis of time information on the last detection of the zero-cross point by phase detection circuit 810 (FIG. 12) and time information on the current detection of the zero-cross point, and calculates the frequency of the AC voltage on the basis of the result of the calculation.

Second sine wave generation circuit 812 (FIG. 12) outputs information on the zero-cross point detected by phase detection circuit 810 and information on the frequency of the AC voltage detected by frequency detection circuit 811 as sine wave information.

When the processing of S203 is finished or when the zero-cross point is not detected in S202 (NO in S202), fourth control circuit 409 controls second DC/AC converter 408 in S204. As in the first embodiment, fourth control circuit 409 controls second DC/AC converter 408 as a voltage source. Therefore, fourth control circuit 409 increases the output power of second DC/AC converter 408 when the power supplied to distribution system 24 is insufficient, and decreases the output power of second DC/AC converter 408 when the power supplied to distribution system 24 is excessive.

Effective power calculation circuit 82 (FIG. 11) calculates the effective power value on the basis of the measurement values of voltmeter 410 and ammeter 411, and integrates the calculated effective power value. When the zero-cross point detection flag is set, effective power calculation circuit 82 stores the integral value of the effective power for one period of the AC voltage in the storage circuit in eighth control circuit 87, and zero-initializes the integral value. After calculating the effective power, inverter voltage control circuit 85 generates the command value for controlling second DC/AC converter 408.

When the command value is generated in S204, fourth control circuit 409 performs the virtual synchronous generator control in S205. As in the first embodiment, one period of the AC voltage is set as a control period. When determining that the control timing has arrived, eighth control circuit 87 (FIG. 11) instructs virtual synchronous generator control circuit 83 (FIG. 11) to generate information on the frequency and the phase used for voltage control. In the second embodiment, as in the first embodiment, the frequency and the phase of the AC voltage generated by third sine wave generation circuit 851 (FIG. 13) in inverter voltage control circuit 85 are updated at the zero-cross point.

In the virtual synchronous generator control circuit (FIG. 14), subtractor 832 calculates a deviation between the value of the frequency of the AC voltage actually measured by AC frequency detection circuit 81 (FIG. 11) and the reference frequency Fref output from eighth control circuit 87, and outputs the calculated deviation to governor control circuit 833.

Governor control circuit 833 (FIG. 15) causes multiplier 91 to multiply the deviation output from subtractor 832 by the control parameter (−1/Kgd) notified from eighth control circuit 87, and outputs the result of the multiplication to first-order lag system model 92. Note that, regarding the speed adjustment rate Kgd and the governor time constant Tg used by governor control circuit 833, the speed adjustment rate Kgd and the governor time constant Tg generated by eighth control circuit 87 on the basis of the information notified from CEMS 31 and set in a register (not illustrated) are used.

As described in the first embodiment, first-order lag system model 92 performs an operation to mimic the first-order lag system (1/(1+s×Tg)) using the time constant Tg notified from eighth control circuit 87, and outputs the result of the operation to limiter circuit 93. Limiter circuit 93 puts a limit on the output power of second DC/AC converter 408 so as to prevent the output power from exceeding the power capacity of second DC/AC converter 408.

Adder 835 (FIG. 14) adds up the output of governor control circuit 833 and the power target value Pref output from eighth control circuit 87. Note that the power target value Pref is notified from CEMS 31. Subtractor 836 calculates a deviation between the output of adder 835 and the value of the effective power actually measured by effective power calculation circuit 82 (FIG. 11), and outputs the calculated deviation to point mass system operation circuit 837.

In point mass system operation circuit 837 (FIG. 16), subtractor 101 calculates a deviation between the output of subtractor 836 (FIG. 14) and the output of multiplier 103, and outputs the calculated deviation to integrator 102. Integrator 102 divides the output of subtractor 101 by the inertia constant M output from eighth control circuit 87 and integrates the result of the division. The output Δω of integrator 102 (a difference value corresponding to a difference from the angular velocity of the frequency of the AC voltage) is input to multiplier 103 and divider 104. Multiplier 103 multiplies the output Δω of integrator 102 by damping factor Dg output from eighth control circuit 87, and outputs the result of the multiplication to subtractor 101. Divider 104 divides the output Δω of integrator 102 by 2×π to convert Δω into Δf (a difference value corresponding to a difference from the frequency of the AC voltage). Adder 105 adds up the output of divider 104 and the reference frequency Fref (60 Hz) of the AC voltage to generate a frequency used for voltage control in inverter voltage control circuit 85. Note that, regarding the inertia constant M and the damping factor Dg used in point mass system operation circuit 837, the inertia constant M and the damping factor Dg generated by eighth control circuit 87 using the information notified from CEMS 31 and set in a register (not illustrated) are used. The frequency information output from adder 105 is output to phase calculation circuit 106. Phase calculation circuit 106 integrates the frequency information output from adder 105 to generate phase information used for voltage control in inverter voltage control circuit 85.

The phase information and the frequency information output from point mass system operation circuit 837 are input to third sine wave generation circuit 851 (FIG. 13) in inverter voltage control circuit 85 via second sine wave generation circuit 812 (FIG. 12) in AC frequency detection circuit 81. Third sine wave generation circuit 851 generates the target value of the AC voltage output from power conversion device 41.

Referring back to FIG. 44, when the virtual synchronous generator control is finished in S205, fourth control circuit 409 checks whether the transmission request of the measurement data has been received from CEMS 31 in S206. When the transmission request has been received from CEMS 31 (YES in S206), fourth control circuit 409 proceeds to S207 and notifies CEMS 31 of the measurement data via communication I/F 412.

After the measurement data is transmitted in S207 or when the transmission request from CEMS 31 has not been received (NO in S206), fourth control circuit 409 checks whether the control information has been received from CEMS 31 in S208. When the control information has been received (YES in S208), fourth control circuit 409 sets the reception flag of the control information. After the reception flag is set in S209 or when the control information has not been received from CEMS 31 (NO in S208), fourth control circuit 409 checks whether the zero-cross point detection flag is set in S210. When the zero-cross point detection flag is not set (NO in S210), the processing returns to S201.

On the other hand, when the zero-cross point detection flag is set (YES in S210), fourth control circuit 409 proceeds to S211, causes second sine wave generation circuit 812 to take the frequency and phase information of the AC voltage, and resets the zero-cross point detection flag in S212.

After resetting the zero-cross point detection flag in S212, fourth control circuit 409 updates, in S213, the frequency and phase information of the AC voltage to the frequency and phase taken by second sine wave generation circuit 812 in S211.

After updating the frequency and phase information of the AC voltage in S213, fourth control circuit 409 checks whether the control information has been received from CEMS 31 (whether the reception flag is set) in S214. When the reception flag is not set (NO in S214), the processing returns to S201. On the other hand, when the reception flag is set (YES in S214), fourth control circuit 409 replaces the frequency target value (reference frequency Fref) and the power target value Pref with the received data in S215.

Upon receipt of information for generating the control parameter in S216, eighth control circuit 87 generates the control parameter of the virtual synchronous generator control. Specifically, the control parameter is generated on the basis of the slope of the ΔP/ΔF characteristic generated by CEMS 31, the system information (the reference frequency Fref, the power target value Pref, ΔFmax, and the like), and its own inverter capacity. In the second embodiment, eighth control circuit 87 stores the relationship between the damping factor Dg and the system frequency illustrated in FIG. 19 as table data for each of a plurality of speed adjustment rates Kgd. Eighth control circuit 87 consults the table data on the basis of the information of ΔFmax to retrieve a combination of the speed adjustment rate Kgd and the damping factor Dg that coincides with the slope of the ΔP/ΔF characteristic.

Note that the method for generating the control parameter of the virtual synchronous generator control implemented in power conversion device 41 is not limited to the above-described method. For example, as in the first embodiment, a method such as incorporating its own virtual synchronous generator control model or incorporating a mathematical expression representing the virtual synchronous generator control may be used.

After generating the speed adjustment rate Kgd and the damping factor Dg, eighth control circuit 87 calculates the inertia constant M from the time constant information of the point mass system operation circuit. As described in the first embodiment, in the method for calculating the inertia constant M, the inertia constant M is calculated so as to make the time constant notified from CEMS 31 equal to (M/Dg) using the above-described expression (3).

After generating the control parameter in S220 of FIG. 44, eighth control circuit 87 changes (updates) the control parameter in S216. After changing (updating) the control parameter, eighth control circuit 87 clears (resets) the register (not illustrated) in which the reception flag is set, and returns to S201.

As described above, according to the second embodiment, in the configuration where the plurality of power conversion devices 41 each having the virtual synchronous generator control implemented are installed in distribution system 24, even when the power consumed by load 600 or the power generated by mega solar 26 fluctuates, the plurality of power conversion devices 41 can share the excess and deficient power in accordance with the proportional division ratio of the operation plan (power target value) created by CEMS 31.

Further, in the second embodiment, since a part of the function implemented in CEMS 31 is implemented in power conversion device 41, the processing load on CEMS 31 can be reduced. For example, in a case where the virtual synchronous generator control is implemented in a household storage battery installed by a general consumer, in the first embodiment, it is necessary for CEMS 31 to generate control parameters of the virtual synchronous generator control for hundreds to thousands of household storage batteries. On the other hand, according to the second embodiment, the processing load on the CEMS 31 can be reduced by implementing a part of the function of the virtual synchronous generator control in the household storage battery.

Further, in a case where the virtual synchronous generator control circuits mounted on the plurality of power conversion devices 41 or household storage batteries are difference in configuration, it is required that, for the configuration where CEMS 31 generates the control parameter, CEMS 31 have a plurality of types of the virtual synchronous generator models illustrated in FIG. 5 or a plurality of types of the table data described in the second embodiment. Further, the number of control parameters to be generated may be different for each virtual synchronous generator control circuit. Even in such a case, the processing of CEMS 31 can be simplified with a configuration where each of power conversion devices 41 and household storage batteries generates the control parameter.

Further, in the first and second embodiments, when creating the operation plan (power target value) for power conversion device 41, the control parameter is generated on the basis of the capacity of the static inverter of each power conversion device 41 and the power target value, and it is therefore possible to share, even in a case where the power consumed by load 600 or the power generated by mega solar 26 fluctuates in a period until the next operation plan is notified from CEMS 31, the excess and deficient power at the same proportional division ratio as the operation plan (power target value).

As a result, for example, even when the solar radiation amount changes immediately after the notification of the operation plan, and the power generated by mega solar 26 decreases by 50%, the shortage of power corresponding to 50% is shared on the basis of the ratio of the power target value calculated at the time of creating the operation plan. Therefore, for example, at the time of creating the operation plan, when the power target values of the plurality of storage batteries 40 are calculated so as to make the SOC become zero at almost the same time, the shortage of power corresponding to 50% is proportionally divided on the basis of the ratio of the power target value, so that the SOC can be controlled to become zero at almost the same time.

In the first and second embodiments, the configuration where the virtual synchronous generator control is implemented in power conversion device 41 for storage battery 40 has been described, but the present disclosure is not limited to this configuration, and it goes without saying that a configuration where the virtual synchronous generator control is implemented in energy creation equipment such as a wind power generator produces the same effect. In particular, in the wind power generator, a generator has an inertial force to rotate a motor with a propeller, and it goes without saying that the same effect is produced.

Further, in the first and second embodiments, the configuration where a plurality of large-capacity storage batteries such as storage battery 40 are installed in distribution system 24 has been described, but the virtual synchronous generator control may be implemented in a power conversion device of a household storage battery or a power conversion device for an electric vehicle, and control similar to the control performed by CEMS 31 may be performed. In this case, there may be hundreds of power conversion devices connected to distribution system 24. Furthermore, a configuration where a large-capacity (for example, several hundred kW to several MW as a storage battery capacity) storage battery such as storage battery 40 and a household storage battery (several kW) are installed can produce the same effect.

Further, in the first and second embodiments, power conversion device 41 for storage battery 40 has been described, but the present invention is not limited to such a configuration, and a configuration where the virtual synchronous generator control is implemented in a power conversion device that controls a static inverter as a voltage source (for example, a solar cell (including a household solar cell) and a system that supplies power generated by a wind power generator and a fuel cell to distribution system 24 can also produce the same effect by using the above-described method to generate the control parameter of the virtual synchronous generator control.

Furthermore, it is also possible to use a storage battery installed in a vehicle such as an electric vehicle (EV), a plug-in hybrid electric vehicle (PHEV), or a fuel cell vehicle (FCV).

Note that, in the first and second embodiments, for the sake of simplicity of the description, the operation in a case of the single-phase AC or using power conversion device 41 having the inverter capacity of several kW in the description of FIGS. 21 to 31 has been described, but the present disclosure is not limited to such a configuration.

Further, in the first and second embodiments, the configuration where the distributed power supply management device is applied to the distribution system has been described, but the present disclosure is not limited to such a configuration, and a configuration where the distributed power supply management device is applied to a transmission system or a stand-alone microgrid also produces the same effect.

Furthermore, in the first and second embodiments, the three-phase AC has been given as an example, but a single-phase AC or a single-phase three-wire AC may be used. Furthermore, even a configuration where a power conversion device (three-phase AC) for a system storage battery and a household storage battery system (single-phase AC) both exist can also produce the same effect with a configuration where the control parameter of the virtual synchronous generator control is generated using the above-described method.

Note that, in the first and second embodiments, the configuration where, when the control parameter of the virtual synchronous generator control is generated for the static inverter in power conversion device 41, the control parameter is generated using the capacity of the static inverter and the power target value has been described, but the present disclosure is not limited to such a configuration. In the first embodiment, a configuration where, when ratios of the capacity of the storage battery to the capacity of the static inverter are different from each other, for example, the capacity of storage battery 40a is twice the capacity of the static inverter in power conversion device 41a, and the capacity of storage battery 40b is three times the capacity of the static inverter in power conversion device 41b, the operation plan (power target value) is generated with the capacity ratios taken into account, or the ratios are taken into account when generating the control parameter can produce the same effect.

In the second embodiment, the configuration where the system information and the slope information of the ΔP/ΔF characteristic are transmitted in addition to the power target value so as to allow the control parameter to be generated in power conversion device 41, but the information to be transmitted is not limited to such information, and a configuration where information that allows the control parameter to be generated in power conversion device 41 is transmitted from CEMS 31 can produce the same effect.

In the first and second embodiments, the configuration where the virtual synchronous generator model (FIG. 5) is incorporated and the configuration where the relationship between the damping factor Dg and the system frequency (FIG. 19) is stored as table data with the relationship associated with each of the plurality of speed adjustment rates Kgd, a combination of the speed adjustment rate Kgd and the damping factor Dg that approximately coincides with the slope of the ΔP/ΔF characteristic is retrieved on the basis of the ΔFmax information, or the relationship between the speed adjustment rate Kgd and the system frequency (FIG. 18) is stored as table data with the relationship associated with each of the plurality of damping factors Dg, and a combination of the speed adjustment rate Kgd and the damping factor Dg that approximately coincides with the slope of the ΔP/ΔF characteristic is retrieved on the basis of the ΔFmax information have been described, but the present disclosure is not limited to such configurations. For example, it goes without saying that another method such as incorporating the virtual synchronous generator control circuit as a mathematical model may be employed.

Furthermore, in the first and second embodiments, the configuration where the ΔP/ΔF characteristic is calculated when the control parameter is generated has been described, but the present disclosure is not limited to such a configuration, and, for example, a configuration where a distribution system model (digital twin) of substation and below is implemented in CEMS 31, and the control parameter is generated so as to allow optimal operation in an expected use case using the distribution system model may be employed. Furthermore, a configuration where AI is implemented in the above-described configuration and the control parameter is generated using the AI may be employed.

Note that, in the first and second embodiments, the configuration where communications between CEMS 31 and DSO 21 are performed at intervals of 30 minutes, and communications between CEMS 31 and power conversion device 41 are performed at intervals of 5 minutes has been given above, but the present disclosure is not limited to such a configuration. For example, communications between CEMS 31 and power conversion device 41 may be performed at intervals of 1 minute.

Further, in the first and second exemplary embodiments, the governor model in governor control circuit 833 (FIG. 14) is modeled as the first-order lag system, but the present disclosure is not limited to such a configuration, and a configuration where the governor model is built as a second-order lag system, a low pass filter (LPF), or the like may be employed.

Furthermore, in the first and second embodiments, point mass system operation circuit 837 (FIG. 14) is modeled by the integrator and the feedback loop, but the present disclosure is not limited to such a configuration, and it goes without saying that the point mass system operation circuit may be modeled as, for example, a first-order lag system, a second-order lag system, or an LPF. Furthermore, in the first and second embodiments, for the sake of simplicity of the description, the VQ control widely used in the virtual synchronous generator control has not been described above, but even a configuration where the present disclosure is applied to a power conversion device having the VQ control implemented as the virtual synchronous generator control can produce the same effect. Furthermore, the configuration of point mass system operation circuit 837 (FIG. 14) is not limited to the circuit illustrated in FIG. 16.

Description of Modification

In the first and second embodiments, the case where the control circuits in power conversion device 27 and power conversion device 41 have the configurations illustrated in FIGS. 6 to 16, and CEMS 31 has the hardware configuration illustrated in FIGS. 3 to 5 has been described for easy understanding of the description, but a similar control function can be implemented even with a configuration where a function of each block or some blocks is implemented by software running on a central processing unit (CPU). Alternatively, a similar control function can be implemented by function division of software and hardware of at least some blocks.

Note that, for the above-described embodiments and modification, the configurations described in the embodiments are originally intended to form, with neither mismatch nor discrepancy, any desired combination including combinations not mentioned herein.

It should be understood that the embodiments disclosed herein are illustrative in all respects and not restrictive. The scope of the present disclosure is defined by the claims rather than the above description, and the present disclosure is intended to include the claims, equivalents of the claims, and all modifications within the scope.

REFERENCE SIGNS LIST

11: communication circuit, 12: storage circuit, 13: control parameter generation circuit, 14: operation plan creation circuit, 15: transmission data generation circuit, 16: control circuit, 20: substation, 21: distribution automation system (DSO) 22, 201, 206, 210, 401, 406, 410: voltmeter, 23: step voltage regulator (SVR), 24: distribution system, 25: communication line, 26: mega solar, 27: mega solar power conversion device, 28: switch, 29: impedance, 30a, 30b: synchronous generator, 31: CEMS, 40, 40a to 40c: system storage battery, 41, 41a to 40c: storage battery power conversion device, 51: MPPT control circuit, 52: voltage control circuit, 53: first switching circuit, 54: fifth control circuit, 61: phase detection circuit, 62: first sine wave generation circuit, 63, 66, 101, 832, 836, 852: subtractor, 64: first PI control circuit, 65, 91, 103: multiplier, 67: sixth control circuit, 68: second PI control circuit, 69: first PWM converter, 71: charge control circuit, 72: discharge control circuit, 73: second switching circuit, 74: seventh control circuit, 81: AC frequency detection circuit, 82: effective power calculation circuit, 83: virtual synchronous generator control circuit, 84: inverter current control circuit, 85: inverter voltage control circuit, 86: third switching circuit, 87: eighth control circuit, 92: first-order lag system model, 93: limiter circuit, 102: integrator, 104: divider, 105, 835: adder, 106: phase calculation circuit, 100a to 100d: town, 110: factory, 112: building, 113: condominium, 141: storage battery operation plan creation circuit, 142: power generation prediction circuit, 143: power consumption prediction circuit, 144: storage battery operation plan correction circuit, 135, 145, 146: management circuit, 131: reference ΔP/ΔF characteristic calculation circuit, 132: ΔP/ΔF characteristic calculation circuit, 133: control parameter generation circuit, 134: virtual synchronous generator model, 136: control circuit, 202, 207, 211, 402, 407, 411: ammeter, 203: first DC/DC converter, 204: first control circuit, 205, 405: DC bus, 208: first DC/AC converter, 209: second control circuit, 212, 412: communication I/F, 403: second DC/DC converter, 404: second control circuit, 408: second DC/AC converter, 409: fourth control circuit, 810: phase detection circuit, 811: frequency detection circuit, 812: second sine wave generation circuit, 833: governor control circuit, 837: point mass system operation circuit, 851: third sine wave generation circuit, 853: third PI control circuit, 854: second PWM converter, 600: load

The invention claimed is:

1. A distributed power supply management device that manages a plurality of distributed power supplies connected to a distribution system, each of the plurality of distributed power supplies including a static inverter in which virtual synchronous generator control is implemented, the distributed power supply management device comprising:
a communication circuit to communicate with the plurality of distributed power supplies;
an operation plan creation circuit to create a power target value of each of the plurality of distributed power supplies on a basis of information received by the communication circuit and capacities of the plurality of distributed power supplies; and
a control parameter generation circuit to generate a control parameter for the virtual synchronous generator control in each of the distributed power supplies or information necessary for generating the control parameter, wherein
the communication circuit is configured to receive measurement information of each of the distributed power supplies, and to transmit a control command to each of the distributed power supplies, and
the control parameter generation circuit
generates the control parameter or the information necessary for generating the control parameter on a basis of the information received by the communication circuit, the capacities of the plurality of distributed power supplies, and the power target value of each of the distributed power supplies, and
outputs the control parameter generated or the information necessary for generating the control parameter as the control command to each of the distributed power supplies via the communication circuit.

2. The distributed power supply management device according to claim 1, wherein the control parameter generation circuit generates the control parameter on a basis of information indicating a capacity of the static inverter of each of the distributed power supplies and the power target value of each of the distributed power supplies generated by the operation plan creation circuit.

3. The distributed power supply management device according to claim 1, wherein the control parameter generation circuit generates the control parameter on a basis of the power target value of each of the distributed power supplies generated by the operation plan creation circuit and information for managing the distribution system.

4. The distributed power supply management device according to claim 1, wherein
the control parameter generation circuit
generates a reference ΔP/ΔF characteristic indicating a relationship between (i) a difference frequency that is a deviation between a reference frequency and a system frequency and (ii) difference power that is a deviation between the power target value and output power of the static inverter when half of a capacity of the static inverter is set as the power target value, and
generates a ΔP/ΔF characteristic of each of the distributed power supplies using a ratio between the power target value generated by the operation plan creation circuit and the half of the capacity of the static inverter on a basis of the reference ΔP/ΔF characteristic generated.

5. The distributed power supply management device according to claim 4, wherein the control parameter generation circuit calculates a slope of the ΔP/ΔF characteristic of each of the distributed power supplies on a basis of (i) a slope of the reference ΔP/ΔF characteristic and (ii) the ratio between the power target value generated by the operation plan creation circuit and the half of the capacity of the static inverter.

6. The distributed power supply management device according to claim 5, wherein the control parameter generation circuit calculates a maximum value of the difference frequency corresponding to a maximum value of the difference power for the ΔP/ΔF characteristic of each of the distributed power supplies, and generates the control parameter on a basis of the maximum value of the difference frequency.

7. The distributed power supply management device according to claim 4, wherein the communication circuit notifies each of the distributed power supplies of (i) the power target value generated by the operation plan creation circuit and (ii) information indicating the ΔP/ΔF characteristic of each of the distributed power supplies generated by the control parameter generation circuit or information being used when the ΔP/ΔF characteristic is generated.

8. The distributed power supply management device according to claim 1, wherein each of the distributed power supplies includes a control circuit to perform the virtual synchronous generator control, the control circuit includes a governor control circuit to mimic a governor function of a synchronous generator and a point mass system operation circuit to mimic a swing equation of the synchronous generator, and the control parameter generation circuit generates, as the control parameter, at least one of a gain of the governor control circuit or a damping factor of the point mass system operation circuit.

9. The distributed power supply management device according to claim 8, wherein the communication circuit notifies each of the distributed power supplies of (i) at least one of the gain of the governor control circuit or the damping factor of the point mass system operation circuit, and (ii) the power target value generated by the operation plan creation circuit.

* * * * *